US008048976B2

(12) United States Patent
McPhee

(10) Patent No.: US 8,048,976 B2
(45) Date of Patent: *Nov. 1, 2011

(54) POLYFARNESENES

(75) Inventor: Derek James McPhee, Fairfield, CA (US)

(73) Assignee: Amyris, Inc., Emeryville, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/552,278

(22) Filed: Sep. 1, 2009

(65) Prior Publication Data

US 2010/0056743 A1  Mar. 4, 2010

Related U.S. Application Data

(60) Provisional application No. 61/094,059, filed on Sep. 4, 2008, provisional application No. 61/220,587, filed on Jun. 26, 2009, provisional application No. 61/220,588, filed on Jun. 26, 2009.

(51) Int. Cl.
C08F 236/22 (2006.01)
C08F 36/00 (2006.01)
C08F 36/22 (2006.01)

(52) U.S. Cl. ............ 526/340.3; 526/335; 526/336; 526/339; 526/340; 526/348.3

(58) Field of Classification Search .................. None
See application file for complete search history.

(56) References Cited

U.S. PATENT DOCUMENTS

| 4,102,876 A | * | 7/1978 | Brenner et al. | 525/331.8 |
| 4,173,695 A | * | 11/1979 | Brenner et al. | 525/331.8 |
| 4,221,887 A | * | 9/1980 | Brenner et al. | 524/210 |
| 4,388,220 A | * | 6/1983 | Hartshorn et al. | 502/120 |
| 5,112,882 A | * | 5/1992 | Babu et al. | 522/158 |
| 5,209,971 A | | 5/1993 | Babu et al. | |
| 5,698,751 A | | 12/1997 | Ishida et al. | |
| 7,655,739 B1 | * | 2/2010 | McPhee et al. | 526/72 |
| 7,759,444 B1 | * | 7/2010 | McPhee | 526/335 |
| 7,868,114 B1 | * | 1/2011 | McPhee | 526/340.3 |
| 7,868,115 B1 | * | 1/2011 | McPhee | 526/340.3 |
| 2005/0020788 A1 | * | 1/2005 | Wass | 526/124.3 |
| 2010/0056714 A1 | * | 3/2010 | McPhee | 524/579 |

FOREIGN PATENT DOCUMENTS

EP 0007758 2/1980
FR 1450512 A * 8/1966

OTHER PUBLICATIONS

Human translation of FR 1450512 A (1966).*
Monakov et al., The Reactivity of Isoprene and Its Copolymerization with Straight-chain Tetraene, Prom.-et. Sint. Kauch., 1979, 4; Chem. Abstr. 1979, 91, 176428p.
Newmark et al., $^{13}$C-NMR Spectra of cis-Polymyrcene and cis-Polyfarnesene, J. of Polymer Sci.: Part A: Polymer Chemistry, 1988, vol. 26, p. 71-77.

* cited by examiner

Primary Examiner — Alicia Chevalier
Assistant Examiner — Frank D Ducheneaux
(74) Attorney, Agent, or Firm — Jones Day; Kam Law

(57) ABSTRACT

Provided herein are polyfarnesenes such as farnesene homopolymers derived from a farnesene and farnesene interpolymers derived from a farnesene and at least a vinyl monomer; and the processes of making and using the polyfarnesenes. The farnesene homopolymer can be prepared by polymerizing the farnesene in the presence of a catalyst. In some embodiments, the farnesene is prepared from a sugar by using a microorganism.

26 Claims, 40 Drawing Sheets

POLYFARNESENES

PRIOR RELATED APPLICATIONS

This application claims the benefit of U.S. Provisional Patent Application No. 61/094,059, filed Sep. 4, 2008; U.S. Provisional Application No. 61/220,587, filed Jun. 26, 2009; and U.S. Provisional Application No. 61/220,588, filed Jun. 26, 2009, all of which are incorporated herein by reference in their entirety.

FIELD OF THE INVENTION

This invention provides polyfarnesenes such as farnesene homopolymers derived from a farnesene and farnesene interpolymers derived from a farnesene and at least a vinyl monomer; and the processes of making and using the polyfarnesenes disclosed herein.

BACKGROUND OF THE INVENTION

Terpenes or isoprenoid compounds are a large and varied class of organic molecules that can be produced by a wide variety of plants, such as conifers, and by some insects, such as swallowtail butterflies. Some isoprenoid compounds can also be made from organic compounds such as sugars by microorganisms, including bioengineered microorganisms. Because terpenes or isoprenoid compounds can be obtained from various renewable sources, they are ideal monomers for making eco-friendly and renewable polymers.

Terpene polymers derived from terpenes or isoprenoid compounds are useful polymeric materials. For example, polyisoprene, polypinene and polylimonene have been used in various applications such as in the manufacture of paper coatings, adhesives, rubber compounds, and other industrial products. Most existing terpene polymers are generally derived from $C_5$ and $C_{10}$ terpenes, for example, isoprene, limonene, myrcene, 3-carene, ocimene, and pinene. These terpene monomers can be polymerized or co-polymerized with other comonomers to form the corresponding terpene homopolymers or copolymers. However, the polymers or copolymers of terpenes or isoprenoid compounds having at least 15 carbon atoms are less well known or non-existent. Because of their long chain length, isoprenoid compounds, such as farnesene, farnesol, nerolidol, valencene, humulene, germacrene, and elemene, may provide polymers or copolymers with unique physical, chemical and biological properties.

There is a need for more environmentally friendly and/or renewable polymers, for instance, polymers derived from isoprenoid compounds that can be obtained from natural sources. Further, there is also a need for novel polymers that have unique physical, chemical and biological properties.

SUMMARY OF THE INVENTION

The aforementioned needs are met by various aspects disclosed herein. In one aspect, provided herein is a polyfarnesene comprising one or more units having formula (I), (II), (III), (IV) or a combination thereof:

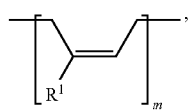  (I)

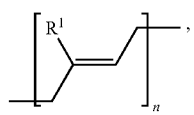  (II)

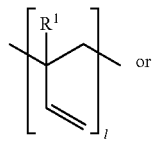  or  (III)

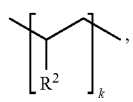  (IV)

wherein $R^1$ has formula (XI):

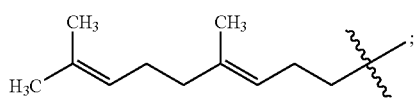  (XI)

and $R^2$ has formula (XII):

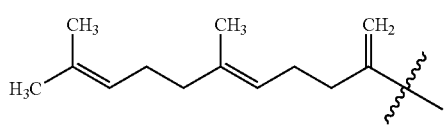  (XII)

wherein each of m, n, l and k is an integer from 1 to 100,000; and wherein the amount of formula (I) is at most about 80 wt. %, based on the total weight of the polyfarnesene.

In another aspect, provided herein is a polyfarnesene comprising one or more units having formula (V), (VI), (VII), (VIII) or a combination thereof:

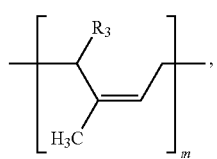  (V)

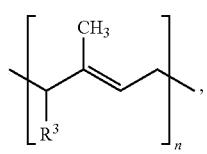  (VI)

-continued

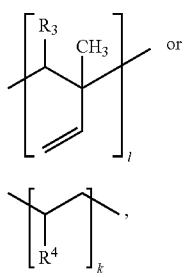
(VII)

$$\left[\begin{array}{c} R^4 \end{array}\right]_k$$
(VIII)

wherein $R^3$ has formula (XIII):

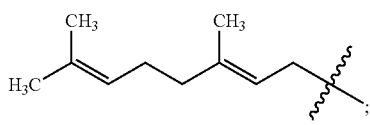
(XIII)

and $R^4$ has formula (XIV):

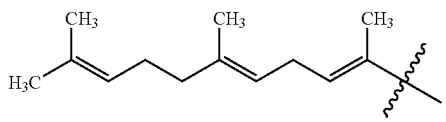
(XIV)

wherein each of m, n, l and k is an integer from 1 to 100,000.

In some embodiments, the polyfarnesene disclosed herein further comprises one or more units having formula (IX):

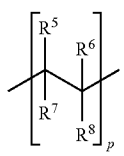
(IX)

wherein p is an integer from 1 to 100,000; and each of $R^5$, $R^6$, $R^7$ and $R^8$ is independently H, alkyl, cycloalkyl, aryl, alkenyl, cycloalkenyl, alkynyl, heterocyclyl, alkoxy, aryloxy, carboxy, alkoxycarbonyl, aminocarbonyl, alkylaminocarbonyl, dialkylaminocarbonyl, acyloxy, nitrile or halo.

In certain embodiments, the polyfarnesene disclosed herein is a random interpolymer. In other embodiments, the polyfarnesene disclosed herein is a block interpolymer having one or more first blocks and one or more second blocks, wherein each of the one or more first blocks comprises the one or more units having formula (I), (II), (III), (IV) or a combination thereof and wherein each of the one or more second blocks comprises the unit having formula (IX). In further embodiments, the polyfarnesene disclosed herein is a block interpolymer having one or more first blocks and one or more second blocks, wherein each of the one or more first blocks comprises the one or more units having formula (V), (VI), (VII), (VIII) or a combination thereof and wherein each of the one or more second blocks comprises the unit having formula (IX).

In certain embodiments, the block interpolymer disclosed herein comprises one first block and two second blocks wherein the first block is between the two second blocks. In other embodiments, $R^5$ of formula (IX) is aryl; and each of $R^6$, $R^7$ and $R^8$ of formula (IX) is H. In still further embodiments, $R^5$ of formula (IX) is phenyl.

In some embodiments, the amount of formula (III) in the polyfarnesene disclosed herein is at least about 20 wt. %, based on the total weight of the polyfarnesene. In other embodiments, the total amount of formulae (V) and (VI) in the polyfarnesene disclosed herein is from about 1 wt. % to about 99 wt. %, based on the total weight of the polyfarnesene. In further embodiments, the amount of formula (VII) in the polyfarnesene disclosed herein is from about 1 wt. % to about 99 wt. %, based on the total weight of the polyfarnesene.

In certain embodiments, the sum of m, n and l of the polyfarnesene disclosed herein is greater than about 300, greater than about 500 or greater than about 1000. In other embodiments, the number-average molecular weight ($M_n$) of the polyfarnesene disclosed herein is greater than about 100,000 daltons, greater than 500,000 daltons, greater than 1,000,000 daltons, greater than 1,500,000 daltons or greater than 2,000,000 daltons. In further embodiments, the polyfarnesene disclosed herein has at least one glass transition temperature ($T_g$) of less than $-55°$ C., less than $-60°$ C. or less than $-65°$ C.

In another aspect, provided herein is a polyfarnesene prepared by polymerizing a β-farnesene in the presence of a catalyst, wherein the amount of the cis-1,4-microstructure in the polyfarnesene is at most about 80 wt. %, based on the total weight of the polyfarnesene. In some embodiments, the β-farnesene is copolymerized with a vinyl monomer to form a farnesene copolymer. In further embodiments, the β-farnesene is prepared by a microorganism. In further embodiments, the β-farnesene is derived from a simple sugar.

In another aspect, provided herein is a polyfarnesene prepared by polymerizing an α-farnesene in the presence of a catalyst, wherein the amount of the cis-1,4-microstructure in the polyfarnesene is from about 1 wt. % to about 99 wt. %, based on the total weight of the polyfarnesene. In some embodiments, the α-farnesene is copolymerized with a vinyl monomer to form a farnesene copolymer. In further embodiments, the α-farnesene is prepared by a microorganism. In further embodiments, the α-farnesene is derived from a simple sugar.

In certain embodiments, the vinyl monomer is styrene. In other embodiments, the polyfarnesene is a block copolymer.

In another aspect, provided herein is a saturated polyfarnesene prepared by (a) polymerizing a farnesene in the presence of a catalyst to form a polyfarnesene; and (b) hydrogenating at least a portion of the double bonds in the polyfarnesene in the presence of a hydrogenation reagent. In some embodiments, the farnesene is copolymerized with a vinyl monomer to form a farnesene copolymer. In other embodiments, the vinyl monomer is styrene. In further embodiments, the polyfarnesene is a block copolymer. In still further embodiments, the farnesene is α-farnesene or β-farnesene or a combination thereof.

In some embodiments, the catalyst disclosed herein comprises an organolithium reagent. In other embodiments, the catalyst further comprises a polar modifier such as 1,2-bis (dimethylamino)ethane. In further embodiments, the organolithium reagent is n-butyl lithium or sec-butyl lithium.

In certain embodiments, the hydrogenation reagent is hydrogen in the presence of a hydrogenation catalyst. In other embodiments, the hydrogenation catalyst is 10% Pd/C.

Additional aspects of the invention and characteristics and properties of various embodiments of the invention become apparent with the following description.

DETAILED DESCRIPTION OF THE INVENTION

General Definitions

Figure 1:
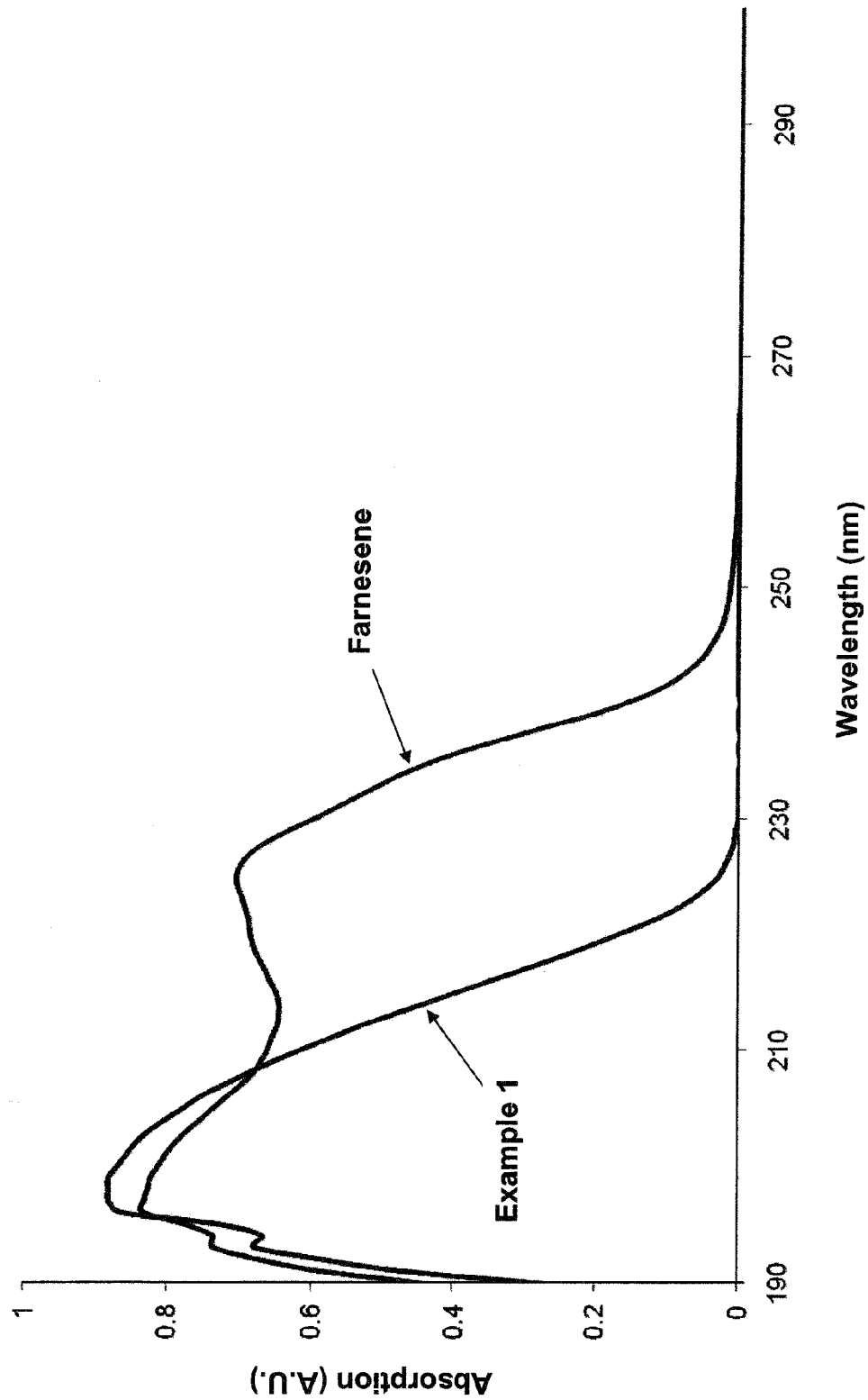
FIG. 1 depicts Ultraviolet-Visible (UV-Vis) spectra of Example 1 and β-farnesene.

"Polymer" refers to a polymeric compound prepared by polymerizing monomers, whether of the same or a different type. The generic term "polymer" embraces the terms "homopolymer," "copolymer," "terpolymer" as well as "interpolymer."

"Interpolymer" refers to a polymer prepared by the polymerization of at least two different types of monomers. The generic term "interpolymer" includes the term "copolymer" (which generally refers to a polymer prepared from two different monomers) as well as the term "terpolymer" (which generally refers to a polymer prepared from three different types of monomers). It also encompasses polymers made by polymerizing four or more types of monomers.

"Organyl" refers to any organic substituent group, regardless of functional type, having one free valence at a carbon atom, e.g., $CH_3CH_2$—, $ClCH_2$—, $CH_3C(=O)$—, 4-pyridylmethyl.

"Hydrocarbyl" refers to any univalent group formed by removing a hydrogen atom from a hydrocarbon, such as alkyl (e.g., ethyl), cycloalkyl (e.g., cyclohexyl) and aryl (e g., phenyl).

"Heterocyclyl" refers to any univalent group formed by removing a hydrogen atom from any ring atom of a heterocyclic compound.

"Alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, ($C_1$-$C_8$)alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

"Cycloalkyl" or "cycloalkyl group" refers to a univalent group derived from a cycloalkane by removal of a hydrogen atom from a non-aromatic, monocyclic or polycyclic ring comprising carbon and hydrogen atoms. Examples of cycloalkyl groups include, but are not limited to, ($C_3$-$C_7$) cycloalkyl groups, such as cyclopropyl, cyclobutyl, cyclopentyl, cyclohexyl, and cycloheptyl, and saturated cyclic and bicyclic terpenes and ($C_3$-$C_7$)cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

"Aryl" or "aryl group" refers to an organic radical derived from a monocyclic or polycyclic aromatic hydrocarbon by removing a hydrogen atom. Non-limiting examples of the aryl group include phenyl, naphthyl, benzyl, or tolanyl group, sexiphenylene, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

"Isoprenoid" and "isoprenoid compound" are used interchangeably herein and refer to a compound derivable from isopentenyl diphosphate.

"Substituted" as used to describe a compound or chemical moiety refers to that at least one hydrogen atom of that compound or chemical moiety is replaced with a second chemical moiety. The second chemical moiety can be any desired substituent that does not adversely affect the desired activity of the compound. Examples of substituents are those found in the exemplary compounds and embodiments disclosed herein, as well as halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; —CO$_2$CH$_3$; —CONH$_2$; —OCH$_2$CONH$_2$; —NH$_2$; —SO$_2$NH$_2$; —OCHF$_2$; —CF$_3$; —OCF$_3$; —NH(alkyl); —N(alkyl)$_2$; —NH(aryl); —N(alkyl) (aryl); —N(aryl)$_2$; —CHO; —CO(alkyl); —CO(aryl); —CO$_2$(alkyl); and —CO$_2$(aryl); and such moieties can also be optionally substituted by a fused-ring structure or bridge, for example —OCH$_2$O—. These substituents can optionally be further substituted with a substituent selected from such groups. All chemical groups disclosed herein can be substituted, unless it is specified otherwise.

"Organolithium reagent" refers to an organometallic compound with a direct bond between a carbon and a lithium atom. Some non-limiting examples of organolithium reagents include vinyllithium, aryllithium (e.g., phenyllithium), and alkyllithium (e.g., n-butyl lithium, sec-butyl lithium, tert-butyl lithium, methyllithium, isopropyllithium or other alkyllithium reagents having 1 to 20 carbon atoms).

A composition that is "substantially free" of a compound means that the composition contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the compound, based on the total volume of the composition.

A polymer that is "substantially linear" means that the polymer contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the branched, star-shaped or other regular or irregular structures, based on the total volume of the composition.

A polymer that is "substantially branched" means that the polymer contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the linear, star-shaped or other regular or irregular structures, based on the total volume of the composition.

A polymer that is "substantially star-shaped" means that the polymer contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the branched, linear or other regular or irregular structures, based on the total volume of the composition.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

The compositions disclosed herein generally comprise a polyfarnesene and optionally a tackifier. In other embodiments, the compositions disclosed herein do not comprise a tackifier. In further embodiments, the compositions disclosed herein comprise a tackifier.

In some embodiments, the polyfarnesene is a farnesene homopolymer, a farnesene interpolymer or a combination thereof. In certain embodiments, the polyfarnesene is a farnesene homopolymer comprising units derived from at least one farnesene such as α-farnesene, β-farnesene or a combination thereof. In other embodiments, the polyfarnesene is a farnesene interpolymer comprising units derived from at least one farnesene and units derived from at least one copolymerizable vinyl monomer. In further embodiments, the farnesene interpolymer is derived from styrene and at least one farnesene. In still further embodiments, the farnesene interpolymer is a random, block or alternating interpolymer. In still further embodiments, the farnesene interpolymer is a di-block, tri-block or other multi-block interpolymer.

In some embodiments, the farnesene homopolymer is prepared by polymerizing β-farnesene in the presence of any catalyst suitable for polymerizing olefins such as ethylene, styrene or isoprene. In other embodiments, the farnesene homopolymer comprises one or more units having formula (I), (II), (III), (IV), a stereoisomer thereof or a combination thereof:

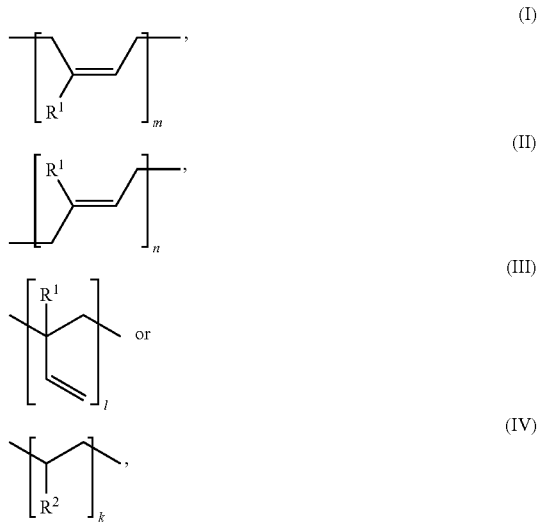

wherein $R^1$ has formula (XI):

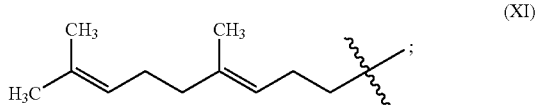

and $R^2$ has formula (XII):

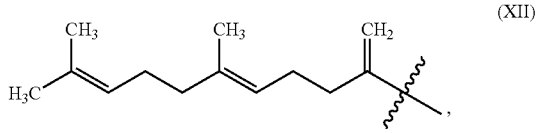

wherein each of m, n, l and k is independently an integer from 1 to about 5,000, from 1 to about 10,000, from 1 to about 50,000, from 1 to about 100,000, from 1 to about 200,000, from 1 to about 500,000, from 2 to about 10,000, from 2 to about 50,000, from 2 to about 100,000, from 2 to about 200,000, or from 2 to about 500,000. In some embodiments, each of m, n, l and k is independently an integer from 1 to 100,000. In other embodiments, each of m, n, l and k is independently an integer from 2 to 100,000.

In certain embodiments, the farnesene homopolymer comprises at least one unit having formula (I) wherein m is greater than about 300, greater than about 500 or greater than about 1000. In other embodiments, the farnesene homopolymer comprises at least one unit having formula (II) wherein n is greater than about 300, greater than about 500 or greater than about 1000. In further embodiments, the farnesene homopolymer comprises at least one unit having formula (III) wherein l is greater than about 300, greater than about 500 or greater than about 1000. In still further embodiments, the farnesene homopolymer comprises at least one unit having formula (IV) wherein k is greater than about 300, greater than about 500 or greater than about 1000.

In some embodiments, the farnesene homopolymer comprises at least one unit having formula (I) and at least one unit having formula (II), wherein the sum of m and n is greater than about 300, greater than about 500 or greater than about 1000. In other embodiments, the farnesene homopolymer comprises at least one unit having formula (I) and at least one unit having formula (III), wherein the sum of m and l is greater than about 300, greater than about 500 or greater than about 1000. In other embodiments, the farnesene homopolymer comprises at least one unit having formula (II) and at least one unit having formula (III), wherein the sum of n and l is greater than about 300, greater than about 500 or greater than about 1000. In still further embodiments, the farnesene homopolymer comprises at least one unit having formula (I), at least one unit having formula (II) and at least one unit having formula (III), wherein the sum of m, n and l is greater than about 300, greater than about 500 or greater than about 1000. In still further embodiments, the farnesene homopolymer comprises at least one unit having formula (I), at least one unit having formula (II), at least one unit having formula (III) and at least one unit having formula (IV), wherein the sum of m, n, l and k is greater than about 300, greater than about 500 or greater than about 1000. In still further embodiments, the one or more units having formula (I), (II), (III) or (IV) in the farnesene homopolymer disclosed herein can be in any order.

In certain embodiments, the farnesene homopolymer is prepared by polymerizing α-farnesene in the presence of any catalyst suitable for polymerizing olefins. In other embodiments, the farnesene homopolymer comprises one or more units having formula (V), (VI), (VII), (VIII), a stereoisomer thereof or a combination thereof:

wherein $R^3$ has formula (XIII):

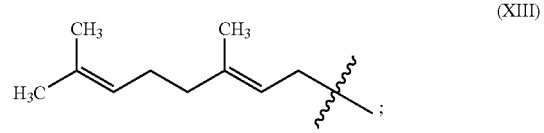

and $R^4$ has formula (XIV):

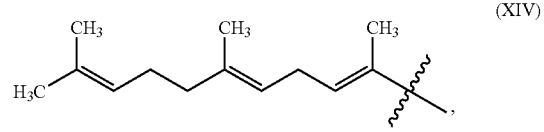

wherein each of m, n, l and k is independently an integer from 1 to about 5,000, from 1 to about 10,000, from 1 to about 50,000, from 1 to about 100,000, from 1 to about 200,000, from 1 to about 500,000, from 2 to about 10,000, from 2 to about 50,000, from 2 to about 100,000, from 2 to about 200,000, or from 2 to about 500,000. In some embodiments, each of m, n, l and k is independently an integer from 1 to 100,000. In other embodiments, each of m, n, l and k is independently an integer from 2 to 100,000.

In certain embodiments, the farnesene homopolymer comprises at least one unit having formula (V) wherein m is greater than about 300, greater than about 500 or greater than about 1000. In other embodiments, the farnesene homopolymer comprises at least one unit having formula (VI) wherein n is greater than about 300, greater than about 500 or greater than about 1000. In further embodiments, the farnesene homopolymer comprises at least one unit having formula (VII) wherein 1 is greater than about 300, greater than about 500 or greater than about 1000. In still further embodiments, the farnesene homopolymer comprises at least one unit having formula (VIII) wherein k is greater than about 300, greater than about 500 or greater than about 1000.

In some embodiments, the farnesene homopolymer comprises at least one unit having formula (V) and at least one unit having formula (VI), wherein the sum of m and n is greater than about 300, greater than about 500 or greater than about 1000. In other embodiments, the farnesene homopolymer comprises at least one unit having formula (V) and at least one unit having formula (VII), wherein the sum of m and l is greater than about 300, greater than about 500 or greater than about 1000. In other embodiments, the farnesene homopolymer comprises at least one unit having formula (VI) and at least one unit having formula (VII), wherein the sum of n and l is greater than about 300, greater than about 500 or greater than about 1000. In still further embodiments, the farnesene homopolymer comprises at least one unit having formula (V), at least one unit having formula (VI) and at least one unit having formula (VII), wherein the sum of m, n and l is greater than about 300, greater than about 500 or greater than about 1000. In still further embodiments, the farnesene homopolymer comprises at least one unit having formula (V), at least one unit having formula (VI), at least one unit having formula (VII) and at least one unit having formula (VIII), wherein the sum of m, n, l and k is greater than about 300, greater than about 500 or greater than about 1000. In still further embodiments, the one or more units having formula (V), (VI), (VII) or (VIII) in the farnesene homopolymer disclosed herein can be in any order.

In some embodiments, the farnesene homopolymer is prepared by polymerizing a mixture of α-farnesene and β-farnesene in the presence of any catalyst suitable for polymerizing olefins. In other embodiments, the farnesene homopolymer comprises one or more units having formula (I), (II), (III), (IV), (V), (VI), (VII) or (VIII) disclosed herein, a stereoisomer thereof or a combination thereof. In further embodiments, the one or more units having formula (I), (II), (III), (IV), (V), (VI), (VII) or (VIII) in the farnesene homopolymer disclosed herein can be in any order.

In some embodiments, the farnesene homopolymer comprises two or more units having two different formulae selected from formulae (I), (II), (III), (IV), (V), (VI), (VII), (VIII), stereoisomers thereof and combinations thereof. In other embodiments, such farnesene homopolymer can be represented by the following formula: $A_xB_y$ wherein each of x and y is at least 1, and wherein each of A and B independently has formula (I), (II), (III), (IV), (V), (VI), (VII) or (VIII) and A and B are different. In further embodiment, each of x and y is independently greater than 1, such as 2, 3, 4, 5, 6, 7, 8, 9, 10, 15, 20, 25, 30, 35, 40, or higher. In some embodiment, the As and Bs are linked in a substantially linear fashion, as opposed to a substantially branched or substantially star-shaped fashion. In other embodiments, the As and Bs are randomly distributed along the farnesene homopolymer chain. In other embodiments, the As and Bs are in two "segments" to provide a farnesene homopolymer having a segmented structure, for example, AA--A-BB---B. In other embodiments, the As and Bs are alternatively distributed along the farnesene homopolymer chain to provide a farnesene homopolymer having an alternative structure, for example, A-B, A-B-A, A-B-A-B, A-B-A-B-A or the like.

In some embodiments, the farnesene homopolymer comprises three or more units having three different formulae selected from formulae (I), (II), (III), (IV), (V), (VI), (VII), (VIII), stereoisomers thereof and combinations thereof. In other embodiments, such farnesene homopolymer can be represented by the following formula: $A_xB_yC_z$ wherein each of x, y and z is at least 1, and wherein each of A, B and C independently has formula (I), (II), (III), (IV), (V), (VI), (VII) or (VIII) and A, B and C are different. In further embodiment, each of x, y and z is independently greater than 1, such as 2, 3, 4, 5, 6, 7, 8, 9, 10, 15, 20, 25, 30, 35, 40, or higher. In some embodiment, the As, Bs and Cs are linked in a substantially linear fashion, as opposed to a substantially branched or substantially star-shaped fashion. In other embodiments, the As, Bs and Cs are randomly distributed along the farnesene homopolymer chain. In other embodiments, the As, Bs and Cs are in three "segments" to provide a farnesene homopolymer having a segmented structure, for example, AA--A-BB--B-CC--C. In other embodiments, the As, Bs and Cs are alternatively distributed along the farnesene homopolymer chain to provide a farnesene homopolymer having an alternative structure, for example, A-B-C-A-B, A-B-C-A-B-C or the like.

In certain embodiments, the polyfarnesene is a farnesene interpolymer. In other embodiments, the farnesene interpolymer is prepared by polymerizing at least one farnesene and at least one vinyl monomer in the presence of any catalyst suitable for polymerizing olefins and vinyl monomers. In further embodiments, the farnesene interpolymer disclosed herein comprises (a) one or more units having at least one of formulae (I), (II), (III) and (IV) disclosed herein; and (b) one or more units having formula

(IX)

wherein p is an integer from 1 to about 5,000, from 1 to about 10,000, from 1 to about 50,000, from 1 to about 100,000, from 1 to about 200,000, from 1 to about 500,000, from 2 to about 10,000, from 2 to about 50,000, from 2 to about 100,000, from 2 to about 200,000, or from 2 to about 500,000; and each of $R^5$, $R^6$, $R^7$ and $R^8$ is independently H, an organyl group, or a functional group. In some embodiments, each of $R^5$, $R^6$, $R^7$ and $R^8$ is not a monovalent hydrocarbon group containing 4-8 carbon atoms. In some embodiments, each of $R^5$, $R^6$, $R^7$ and $R^8$ is not an alkyl group containing 4-8 carbon atoms.

In some embodiments, the farnesene interpolymer disclosed herein comprises (a) one or more units having at least one of formulae (V), (VI), (VII) and (VIII) disclosed herein; and (b) one or more units having formula (IX) disclosed herein. In other embodiments, the farnesene interpolymer disclosed herein comprises (a) one or more units having at least one of formulae (I), (II), (III), (IV), (V), (VI), (VII) and (VIII) disclosed herein; and (b) one or more units having formula (IX) disclosed herein.

In some embodiments, the farnesene interpolymer disclosed herein is a random interpolymer. In other embodiments, the farnesene interpolymer disclosed herein is a random interpolymer wherein the vinyl monomer units and the farnesene units are randomly distributed. In further embodiments, the farnesene interpolymer disclosed herein is a random interpolymer wherein the vinyl monomer units and the farnesene units are randomly distributed and wherein two or more of formulae (I), (II), (III), (IV), (V), (VI), (VII), (VIII) and (XI) in the farnesene units are distributed randomly, alternatively or in blocks.

In some embodiments, the farnesene interpolymer disclosed herein is an alternating interpolymer. In other embodiments, the farnesene interpolymer disclosed herein is an alternating interpolymer wherein the vinyl monomer units and the farnesene units are alternatively distributed. In further embodiments, the farnesene interpolymer disclosed herein is an alternating interpolymer wherein the vinyl monomer units and the farnesene units are alternatively distributed and wherein two or more of formulae (I), (II), (III), (IV), (V), (VI), (VII), (VIII) and (XI) in the farnesene units are distributed randomly, alternatively or in blocks.

In certain embodiments, the farnesene interpolymer is a block interpolymer having one or more first blocks comprising the one or more units having formula (I), (II), (III), (IV) or a combination thereof and one or more second blocks comprising the one or more units having formula (IX). In further embodiments, the farnesene interpolymer is a block interpolymer having one or more first blocks comprising the one or more units having formula (V), (VI), (VII), (VIII) or a combination thereof and one or more second blocks comprising the one or more units having formula (IX). In still further embodiments, there are one first block and two second blocks and wherein the first block is between the two second blocks. In still further embodiments, each of the second blocks comprises units derived from styrene. In some embodiments, the farnesene block interpolymer is a polystyrene-polyfarnesene di-block polyfarnesene, polystyrene-polyfarnesene-polystyrene tri-block polyfarnesene or a combination thereof.

In some embodiments, the farnesene interpolymer can be represented by the following formula: $P_xQ_y$, wherein each of x and y is at least 1, and wherein P has formula (IX) and Q has formula (I), (II), (III), (IV), (V), (VI), (VII) or (VIII). In further embodiment, each of x and y is independently greater than 1, such as 2, 3, 4, 5, 6, 7, 8, 9, 10, 15, 20, 25, 30, 35, 40, or higher. In some embodiment, the Ps and Qs are linked in a substantially linear fashion, as opposed to a substantially branched or substantially star-shaped fashion. In other embodiments, the Ps and Qs are randomly distributed along the farnesene interpolymer chain. In other embodiments, the Ps and Qs are in two or more blocks or segments to provide a farnesene interpolymer having a block structure, for example, PP--P-QQ---Q or PP--P-QQ---Q-P---PP. In other embodiments, the Ps and Qs are alternatively distributed along the farnesene interpolymer chain to provide a farnesene interpolymer having an alternative structure, for example, P-Q, P-Q-P, P-Q-P-Q, P-Q-P-Q-P or the like. In some embodiments, each Q has formula $A_xB_y$ or $A_xB_yC_z$ as disclosed herein.

In certain embodiments, the amount of formula (I) in the polyfarnesene disclosed herein is at most about 85 wt. %, at most about 80 wt. %, at most about 70 wt. %, at most about 60 wt. %, or at most about 50 wt. %, based on the total weight of the polyfarnesene. In other embodiments, the amount of formula (III) in the polyfarnesene disclosed herein is at least about 10 wt. %, at least about 15 wt. %, at least about 20 wt. %, at least about 25 wt. %, at least about 30 wt. %, at least about 40 wt. %, at least about 50 wt. %, at least about 60 wt. %, at least about 70 wt. %, at least about 80 wt. %, at least about 90 wt. %, at least about 95 wt. %, or at least about 99 wt. %, based on the total weight of the polyfarnesene. In further embodiments, the amount of formula (II) in the polyfarnesene disclosed herein is from about 1 wt. % to about 99 wt. %, from about 5 wt. % to about 99 wt. %, from about 10 wt. % to about 99 wt. %, or from about 15 wt. % to about 99 wt. %, based on the total weight of the polyfarnesene. In still further embodiments, the amount of formula (IV) in the polyfarnesene disclosed herein is at most about 0.1 wt. %, at most about 0.5 wt. %, at most about 1 wt. %, at most about 2 wt. %, or at most about 3 wt. %, based on the total weight of the polyfarnesene. In some embodiments, the polyfarnesene disclosed herein is substantially free of formula (I), (II), (III) or (IV).

In certain embodiments, the amount of formula (V), (VI), (VII) or (VIII) in the polyfarnesene disclosed herein is at most about 1 wt. %, at most about 5 wt. %, at most about 10 wt. %, at most about 20 wt. %, at most about 30 wt. %, at most about 40 wt. %, at most about 50 wt. %, at most about 60 wt. %, at most about 70 wt. %, at most about 80 wt. %, or at most about 90 wt. %, based on the total weight of the polyfarnesene. In other embodiments, the amount of formula (V), (VI), (VII) or (VIII) in the polyfarnesene disclosed herein is at least about 1 wt. %, at least about 2 wt. %, at least about 3 wt. %, at least about 5 wt. %, at least about 10 wt. %, at least about 20 wt. %, at least about 30 wt. %, at least about 40 wt. %, at least about 50 wt. %, at least about 60 wt. %, based on the total weight of the polyfarnesene. In further embodiments, the amount of formula (V), (VI), (VII) or (VIII) in the polyfarnesene disclosed herein is from about 1 wt. % to about 99 wt. %, from about 5 wt. % to about 99 wt. %, from about 10 wt. % to about 99 wt. %, or from about 15 wt. % to about 99 wt. %, based on the total weight of the polyfarnesene. In some embodiments, the polyfarnesene disclosed herein is substantially free of formula (V), (VI), (VII) or (VIII).

In other embodiments, the sum of m and n disclosed herein is greater than about 250, greater than about 300, greater than about 500, greater than about 750, greater than about 1000, or greater than about 2000. In further embodiments, the sum of m and l disclosed herein is greater than about 250, greater than about 300, greater than about 500, greater than about 750, greater than about 1000, or greater than about 2000. In certain embodiments, the sum of m, n and l disclosed herein is greater than about 250, greater than about 300, greater than about 500, greater than about 750, greater than about 1000, or greater than about 2000. In some embodiments, the sum of m, n, l and k disclosed herein is greater than about 250, greater than about 300, greater than about 500, greater than about 750, greater than about 1000, or greater than about 2000.

In certain embodiments, the number-average molecular weight ($M_n$), weight-average molecular weight ($M_w$), or viscosity-average molecular weight ($M_z$) of the polyfarnesene disclosed herein is greater than about 60,000 daltons, greater than about 100,000 daltons, greater than 200,000 daltons, greater than 300,000 daltons, greater than about 500,000 daltons, greater than 750,000 daltons, greater than 1,000,000 daltons, greater than 1,500,000 daltons, or greater than 2,000,000 daltons. In other embodiments, the $M_n$, $M_w$ or $M_z$ of the polyfarnesene disclosed herein is less than about 10,000,000 daltons, less than 5,000,000 daltons, less than 1,000,000 daltons, less than about 750,000 daltons, or less than 500,000 daltons.

In some embodiments, the polyfarnesene has at least a glass transition temperature ($T_g$) of less than −55° C., less than −60° C., less than −65° C., less than −70° C., or less than −75° C., as measured according to ASTM D7426-08 titled "*Standard Test Method for Assignment of the DSC Procedure for Determining $T_g$ of a Polymer or an Elastomeric Compound*," which is incorporated herein by reference.

In some embodiments, the amount of formula (I) is at most about 80 wt. %, based on the total weight of the polyfarnesene. In other embodiments, the sum of m, n and l is greater than about 300. In further embodiments, at least a portion of the double bonds in one or more of formulae (I), (II), (III), (IV), (IX), (XI), (XII) and stereoisomers thereof is hydrogenated.

In some embodiments, the polyfarnesene is a farnesene interpolymer. In further embodiments, the farnesene interpolymer disclosed herein comprises one or more units derived from a farnesene in an amount of at least about 5 mole percent, at least about 10 mole percent, at least about 15 mole percent, at least about 20 mole percent, at least about 30 mole percent, at least about 40 mole percent, at least about 50 mole percent, at least about 60 mole percent, at least about 70 mole percent, at least about 80 mole percent, or at least about 90 mole percent of the whole farnesene interpolymer. In still further embodiments, the farnesene interpolymer disclosed herein comprises one or more units derived from the vinyl monomer in an amount of at least about 5 mole percent, at least about 10 mole percent, at least about 15 mole percent, at least about 20 mole percent, at least about 30 mole percent, at least about 40 mole percent, at least about 50 mole percent, at least about 60 mole percent, at least about 70 mole percent, at least about 80 mole percent, or at least about 90 mole percent of the whole farnesene interpolymer.

In certain embodiments, the polyfarnesene comprises one or more polymer molecules having formula (X'):

 (X'), wherein n is an integer from 1 to about 5,000, from 1 to about 10,000, from 1 to about 50,000, from 1 to about 100,000, from 1 to about 200,000, or from 1 to about 500,000; m is an integer from 0 to about 5,000, from 0 to about 10,000, from 0 to about 50,000, from 0 to about 100,000, from 0 to about 200,000, or from 0 to about 500,000; X is derived from a farnesene; and Y is derived from a vinyl monomer.

In some embodiments, X has one or more of formulae (I')-(VIII'):

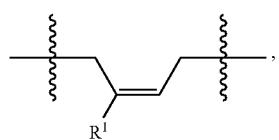 (I')

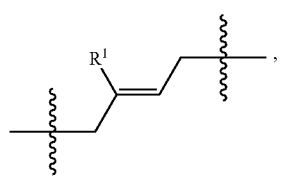 (II')

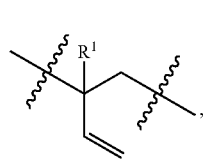 (III')

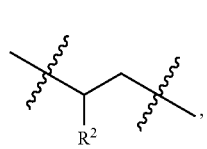 (IV')

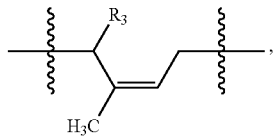 (V')

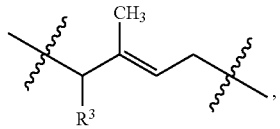 (VI')

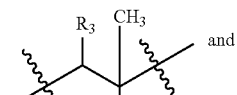 (VII')

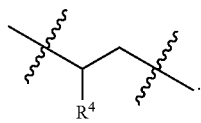 (VIII')

In certain embodiments, Y has formula (IX'):

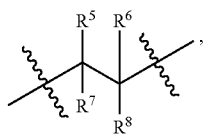 (IX')

where $R^1$, $R^2$, $R^3$, $R^4$ are as defined herein and each of $R^5$, $R^6$, $R^7$ and $R^8$ is independently H, an organyl group or a functional group.

In general, the polyfarnesene comprising a mixture of polymer molecules, each of which has formula (X') wherein each of n and m independently has a specific value. The average and distribution of the n or m values disclosed herein depend on various factors such as the molar ratio of the starting materials, the reaction time and temperature, the presence or absence of a chain terminating agent, the amount of an initiator if there is any, and the polymerization conditions. The farnesene interpolymer of Formula (X') may include unreacted comonomers, although the concentrations of the comonomer would generally be small if not extremely small or undetectable. The extent of polymerization, as specified with n and m values, can affect the properties of the resulting polymer. In some embodiments, n is an integer from 1 to about 5,000, from 1 to about 10,000, from 1 to about 50,000, from 1 to about 100,000, from 1 to about 200,000, or from 1 to about 500,000; and m is an integer from 0 to about 5,000, from 0 to about 10,000, from 0 to about 50,000, from 0 to about 100,000, from 0 to about 200,000, or from 0 to about 500,000. In other embodiments, n is independently from about 1 to about 5000, from about 1 to about 2500, from about 1 to about 1000, from about 1 to about 500, from about 1 to about 100 or from about 1 to about 50; and m is from about 0 to about 5000, from about 0 to about 2500, from about 0 to about 1000, from about 0 to about 500, from about 0 to about 100 or from about 0 to about 50. A person of ordinary skill in the art will recognize that additional ranges of average n and m values are contemplated and are within the present disclosure.

In some embodiments, formula (X') comprises two end groups as shown by the following formula:

*-[X]<sub>n</sub>-[Y]<sub>m</sub>-* where each of the asterisks (*) in the formula represents an end group which may or may not vary between different polymer molecules of the polyfarnesene depending on many factors such as the molar ratio of the starting materials, the presence or absence of a chain terminating agent, and the state of the particular polymerization process at the end of the polymerization step.

In some embodiments, Xs and Ys of formula (X') are linked in a substantially linear fashion. In other embodiments, Xs and Ys of formula (X') are linked in substantially branched fashion. In further embodiments, Xs and Ys of formula (X') are linked in substantially star-shaped fashion. In still further embodiments, each of Xs and Ys independently forms at least a block along the polymer chain so as to provide a di-block, tri-block or multi-block farnesene interpolymer having at least one X block and at least one Y block. In still further embodiments, Xs and Ys are randomly distributed along the polymer chain so as to provide a random farnesene interpolymer. In still further embodiments, Xs and Ys are alternatively distributed along the polymer chain so as to provide an alternating farnesene interpolymer.

In some embodiments, the amount of the farnesene in the farnesene interpolymer disclosed herein is greater than about 1.5 mole %, greater than about 2.0 mole %, greater than about 2.5 mole %, greater than about 5 mole %, greater than about 10 mole %, greater than about 15 mole %, or greater than about 20 mole %, based on the total amount of the farnesene interpolymer. In other embodiments, the amount of the farnesene in the farnesene interpolymer disclosed herein is less than about 90 mole %, less than about 80 mole %, less than about 70 mole %, less than about 60 mole %, less than about 50 mole %, less than about 40 mole %, or less than about 30 mole %, based on the total amount of the farnesene interpolymer.

In some embodiments, the amount of the vinyl monomer in the farnesene interpolymer disclosed herein is greater than about 1.5 mole %, greater than about 2.0 mole %, greater than about 2.5 mole %, greater than about 5 mole %, greater than about 10 mole %, greater than about 15 mole %, or greater than about 20 mole %, based on the total amount of the farnesene interpolymer. In other embodiments, the amount of the vinyl monomer in the farnesene interpolymer disclosed herein is less than about 90 mole %, less than about 80 mole %, less than about 70 mole %, less than about 60 mole %, less than about 50 mole %, less than about 40 mole %, or less than about 30 mole %, based on the total amount of the farnesene interpolymer.

In certain embodiments, the mole percent ratio of the farnesene to the vinyl monomer (i.e., the mole percent ratio of X to Y) in the farnesene interpolymer disclosed herein is from about 1:5 to about 100:1. In other embodiments, the mole percent ratio of X to Y is from about 1:4 to about 100:1; from about 1:3.5 to about 100:1, from about 1:3 to about 100:1, from about 1:2.5 to about 100:1, or from about 1:2 to about 100:1. In some embodiments, m is 1 or greater, the mole percent ratio of X to Y is from about 1:4 to about 100:1

In certain embodiments, the amount of formula (I') in the polyfranesene disclosed herein is at most about 85 wt. %, at most about 80 wt. %, at most about 70 wt. %, at most about 60 wt. %, or at most about 50 wt. %, based on the total weight of the polyfarnesene. In other embodiments, the amount of formula (III') in the polyfarnesene disclosed herein is at least about 10 wt. %, at least about 15 wt. %, at least about 20 wt. %, at least about 25 wt. %, at least about 30 wt. %, at least about 40 wt. %, at least about 50 wt. %, at least about 60 wt. %, at least about 70 wt. %, at least about 75 wt. %, at least about 80 wt. %, at least about 85 wt. %, at least about 90 wt. %, at least about 95 wt. %, or at least about 99 wt. %, based on the total weight of the polyfarnesene. In further embodiments, the amount of formula (II') in the polyfarnesene disclosed herein is from about 1 wt. % to about 99 wt. %, from about 5 wt. % to about 99 wt. %, from about 10 wt. % to about 99 wt. %, or from about 15 wt. % to about 99 wt. %, based on the total weight of the polyfarnesene. In still further embodiments, the amount of formula (IV') in the polyfarnesene disclosed herein is at most about 0.1 wt. %, at most about 0.5 wt. %, at most about 1 wt. %, at most about 2 wt. %, or at most about 3 wt. %, based on the total weight of the polyfarnesene. In some embodiments, the polyfarnesene disclosed herein is substantially free of formula (I'), (II'), (III') or (IV').

In certain embodiments, the amount of formula (V'), (VI'), (VII') or (VIII') in the polyfarnesene disclosed herein is at most about 1 wt. %, at most about 5 wt. %, at most about 10 wt. %, at most about 20 wt. %, at most about 30 wt. %, at most about 40 wt. %, at most about 50 wt. %, at most about 60 wt. %, at most about 70 wt. %, at most about 80 wt. %, or at most about 90 wt. %, based on the total weight of the polyfarnesene. In other embodiments, the amount of formula (V'), (VI'), (VII') or (VIII') in the polyfarnesene disclosed herein is at least about 1 wt. %, at least about 2 wt. %, at least about 3 wt. %, at least about 5 wt. %, at least about 10 wt. %, at least about 20 wt. %, at least about 30 wt. %, at least about 40 wt. %, at least about 50 wt. %, at least about 60 wt. %, based on the total weight of the polyfarnesene. In further embodiments, the amount of formula (V'), (VI'), (VII') or (VIII') in the polyfarnesene disclosed herein is from about 1 wt. % to about 99 wt. %, from about 5 wt. % to about 99 wt. %, from about 10 wt. % to about 99 wt. %, or from about 15 wt. % to about 99 wt. %, based on the total weight of the polyfarnesene. In some embodiments, the polyfarnesene disclosed herein is substantially free of formula (V'), (VI'), (VII') or (VIII').

Any compound containing a vinyl group, i.e., —CH═CH$_2$, that is copolymerizable with farnesene can be used as a vinyl monomer for making the farnesene interpolymer disclosed herein. Useful vinyl monomers disclosed herein include ethylene, i.e., CH$_2$═CH$_2$. In certain embodiments, the vinyl monomer has formula (XV):

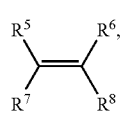

(XV)

where each of $R^5$, $R^6$, $R^7$ and $R^8$ is independently H, an organyl group or a functional group.

In some embodiments, at least one of $R^5$, $R^6$, $R^7$ and $R^8$ of formula (IX), (IX') or (XV) is an organyl group. In further embodiments, the organyl group is hydrocarbyl, substituted hydrocarbyl, heterocyclyl or substituted heterocyclyl. In certain embodiments, each of $R^5$, $R^6$, $R^7$ and $R^8$ of formula (IX), (IX') or (XV) is independently H, alkyl, cycloalkyl, aryl, alkenyl, cycloalkenyl, alkynyl, heterocyclyl, alkoxy, aryloxy, carboxy, alkoxycarbonyl, aminocarbonyl, alkylaminocarbonyl, dialkylaminocarbonyl, acyloxy, nitrile or halo. In other embodiments, each of $R^5$, $R^6$, $R^7$ and $R^8$ of formula (IX), (IX') or (XV) is independently H, alkyl, cycloalkyl, aryl, cycloalkenyl, alkynyl, heterocyclyl, alkoxy, aryloxy, carboxy, alkoxycarbonyl, aminocarbonyl, alkylaminocarbonyl, dialkylaminocarbonyl, acyloxy, nitrile or halo. In certain embodiments, $R^5$ of formula (IX), (IX') or (XV) is aryl; and each of $R^6$, $R^7$ and $R^8$ is H. In further embodiments, $R^5$ of formula (IX), (IX') or (XV) is phenyl; and each of $R^6$, $R^7$ and $R^8$ is H.

In certain embodiments, at least one of $R^5$, $R^6$, $R^7$ and $R^8$ of formula (IX), (IX') or (XV) is H. In other embodiments, each of $R^5$, $R^6$, $R^7$ and $R^8$ of formula (IX), (IX') or (XV) is H. In further embodiments, $R^5$ of formula (IX), (IX') or (XV) is hydrocarbyl; and each of $R^6$, $R^7$ and $R^8$ is H. In still further embodiments, the hydrocarbyl is alkyl, cycloalkyl or aryl. In still further embodiments, none of $R^5$, $R^6$, $R^7$ and $R^8$ of formula (IX), (IX') or (XV) is or comprises alkenyl, cycloalkenyl or alkynyl. In still further embodiments, none of $R^5$, $R^6$, $R^7$ and $R^8$ of formula (IX), (IX') or (XV) is or comprises a hydrocarbyl, substituted hydrocarbyl, heterocyclyl or substituted heterocyclyl.

In certain embodiments, at least one of $R^5$, $R^6$, $R^7$ and $R^8$ of formula (IX), (IX') or (XV) is a functional group containing halo, O, N, S, P or a combination thereof. Some non-limiting examples of suitable functional groups include hydroxy, alkoxy, aryloxy, amino, nitro, thiol, thioether, imine, cyano, amido, phosphonato (—P(=O)(O-alkyl)$_2$, —P(=O)(O-aryl)$_2$, or —P(=O)(O-alkyl))O-aryl), phosphinato (—P(=O)(O-alkyl)alkyl, —P(=O)(O-aryl)alkyl, —P(=O)(O-alkyl)aryl, or —P(=O)(O-aryl)aryl), carboxyl, thiocarbonyl, sulfonyl (—S(=O)$_2$alkyl, or —S(=O)$_2$aryl), sulfonamide (—SO$_2$NH$_2$, —SO$_2$NH(alkyl), —SO$_2$NH(aryl), —SO$_2$N(alkyl)$_2$, —SO$_2$N(aryl)$_2$, or —SO$_2$N(aryl)(alkyl)), ketone, aldehyde, ester, oxo, amino (primary, secondary or tertiary), —CO$_2$CH$_3$, —CONH$_2$, —OCH$_2$CONH$_2$, —NH$_2$, —OCHF$_2$, —OCF$_3$, —NH(alkyl), —N(alkyl)$_2$, —NH(aryl), —N(alkyl)(aryl), —N(aryl)$_2$, —CHO, —CO(alkyl), —CO(aryl), —CO$_2$(alkyl), or —CO$_2$(aryl). In some embodiments, the functional group is or comprises alkoxy, aryloxy, carboxy, alkoxycarbonyl, aminocarbonyl, alkylaminocarbonyl, dialkylaminocarbonyl, acyloxy, nitrile or halo. In other embodiments, none of $R^5$, $R^6$, $R^7$ and $R^8$ of formula (IX), (IX') or (XV) is or comprises a functional group. In other embodiments, none of $R^5$, $R^6$, $R^7$ and $R^8$ of formula (IX), (IX') or (XV) is or comprises alkoxy, aryloxy, carboxy, alkoxycarbonyl, aminocarbonyl, alkylaminocarbonyl, dialkylaminocarbonyl, acyloxy, nitrile or halo.

In some embodiments, the vinyl monomer is a substituted or unsubstituted olefin such as ethylene or styrene, vinyl halide, vinyl ether, acrylonitrile, acrylic ester, methacrylic ester, acrylamide, methacrylamide or a combination thereof. In other embodiments, the vinyl monomer is ethylene, an α-olefin or a combination thereof. Some non-limiting examples of suitable α-olefins include styrene, propylene, 1-butene, 1-hexene, 1-octene, 4-methyl-1-pentene, norbornene, 1-decene, 1,5-hexadiene and combinations thereof.

In some embodiments, the vinyl monomer is an aryl such as styrene, α-methyl styrene, or di-vinyl benzene. Additional examples include the functionalized vinyl aryls such as those disclosed by U.S. Pat. No. 7,041,761 which is incorporated herein by reference.

In some embodiments, the farnesene interpolymers disclosed herein are derived from at least one farnesene and at least one olefin monomer. An olefin refers to an unsaturated hydrocarbon-based compound with at least one carbon-carbon double bond. In certain embodiments, the olefin is a conjugated diene. Depending on the selection of catalysts, any olefin may be used in embodiments of the invention. Some non-limiting examples of suitable olefins include $C_{2-20}$ aliphatic and $C_{8-20}$ aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_{1-20}$ hydrocarbyl or cyclohydrocarbyl groups. Other non-limiting examples of suitable olefins include mixtures of such olefins as well as mixtures of such olefins with $C_{4-40}$ diolefin compounds.

Some non-limiting examples of suitable olefin or α-olefin monomers include styrene, ethylene, propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_{4-40}$ dienes, including but not limited to 1,3-butadiene, 1,3-pentadiene, 1,4-hexadiene, 1,5-hexadiene, 1,7-octadiene, 1,9-decadiene, other $C_{4-40}$ α-olefins, and the like. In certain embodiments, the olefin monomer is propylene, 1-butene, 1-pentene, 1-hexene, 1-octene or a combination thereof.

The farnesene interpolymers disclosed herein may derived from a farnesene and styrene. The farnesene interpolymers may further comprise at least one $C_{2-20}$ olefin, at least one $C_{4-18}$ diolefin, at least one alkenylbenzene or a combination thereof. Suitable unsaturated comonomers useful for polymerizing with farnesene include, for example, ethylenically unsaturated monomers, polyenes such as conjugated or non-conjugated dienes, alkenylbenzenes, and the like. Examples of such comonomers include ethylene, $C_{2-20}$ olefins such as propylene, isobutylene, 1-butene, 1-hexene, 1-pentene, 4-methyl-1-pentene, 1-heptene, 1-octene, 1-nonene, 1-decene, and the like. Other suitable monomers include styrene, halo- or alkyl-substituted styrenes, vinylbenzocyclobutane, 1,4-hexadiene, 1,7-octadiene, and cycloalkenes such as cyclopentene, cyclohexene and cyclooctene.

Some suitable non-conjugated diene monomers can be a straight chain, branched chain or cyclic hydrocarbon diene having from 6 to 15 carbon atoms. Some non-limiting examples of suitable non-conjugated dienes include straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclodidecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). In certain embodiments, the diene is 5-ethylidene-2-norbornene (ENB) or 1,4-hexadiene (HD). In other embodiments, the farnesene interpolymers are not derived from a polyene such as dienes, trienes, tetraenes and the like.

In some embodiments, the farnesene interpolymers are interpolymers of farnesene, styrene, and a $C_{2-20}$ olefin. Some non-limiting examples of suitable olefins include ethylene, propylene, isobutylene, 1-butene, 1-pentene, 1-hexene, 4-methyl-1-pentene, and 1-octene. In some embodiments, the farnesene interpolymers disclosed herein are not derived from ethylene. In some embodiments, the farnesene interpolymers disclosed herein are not derived from one or more $C_{2-20}$ olefins.

In certain embodiments, the vinyl monomer does not comprise a terpene. In other embodiments, the vinyl monomer does not comprise a terpene selected from isoprene, dipentene, α-pinene, β-pinene, terpinolene, limonene (dipentene), terpinene, thujene, sabinene, 3-carene, camphene, cadinene, caryophyllene, myrcene, ocimene, cedrene, bisalbone, bisalbone, bisalbone, zingiberene, humulene, citronellol, linalool, geraniol, nerol, ipsenol, terpineol, D-terpineol-(4), dihydrocarveol, nerolidol, farnesol, eudesmol, citral, D-citronellal, carvone, D-pulegone, piperitone, carvenone, bisabolene, selinene, santalene, vitamin A, abietic acid or a combination thereof. In further embodiments, the vinyl monomer does not comprise an isoprene.

The farnesene interpolymers can be functionalized by incorporating at least one functional group in their polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to the farnesene interpolymers, or they may be copolymerized farnesene with an optional additional comonomer to form an interpolymer of farnesene, the functional comonomer and optionally other comonomer(s). Any means for grafting functional groups known to a skilled artisan can be used. One particularly useful functional group is maleic anhydride.

The amount of the functional group present in the functionalized farnesene interpolymer may vary. In some embodiments, the functional group is present in an amount of at least about 1.0 wt. %, at least about 2.5 wt. %, at least about 5 wt. %, at least about 7.5 wt. %, or at least about 10 wt. %, based on the total weight of the farnesene interpolymer. In other embodiments, the functional group is present in an amount of less than about 40 wt. %, less than about 30 wt. %, less than about 25 wt. %, less than about 20 wt. %, or less than about 15 wt. %, based on the total weight of the franesene interpolymer.

Any catalyst that can polymerize or copolymerize farnesene can be used for making the polyfranesenes disclosed herein. Some non-limiting examples of suitable catalysts include organolithium reagents, Ziegler-Natta catalysts, Kaminsky catalysts and other metallocene catalysts. In some embodiments, the catalyst is a Ziegler-Natta catalyst, a Kaminsky catalyst, a metallocene catalyst or a combination thereof.

In some embodiments, the catalyst further comprises a cocatalyst. In further embodiments, the cocatalyst is a hydride, alkyl or aryl of a metal or a combination thereof. In still further embodiments, the metal is aluminum, lithium, zinc, tin, cadmium, beryllium or magnesium.

In some embodiments, the catalyst is an organolithium reagent. Any organolithium reagent that can act as a catalyst to polymerize olefins can be used herein. Some non-limiting examples of suitable organolithium reagents include n-butyllithium, sec-butyllithium or tert-butyllithium. Some non-limiting examples of suitable Lewis bases include TMEDA, PMDTA or sparteine. Some organolithium reagents are disclosed in Zvi Rappoport et al., "*The Chemistry of Organolithium Compounds*," Part 1 (2004) and Vol. 2 (2006), both of which are incorporated herein by reference.

In some embodiments, the catalyst is a mixture of an organolithium reagent and a Lewis base. Any Lewis base that can deaggregate organolithium reagents, making them more soluble and more reactive, can be used herein. An aggregated organolithium reagent generally has one lithium coordinating to more than one carbon atom and one carbon coordinating to more than one lithium atom. Some non-limiting examples of suitable Lewis bases include 1,2-bis(dimethylamino)ethane (also known as tetramethylethylenediamine or TMEDA), N,N,N',N',N''-pentamethyldiethylenetriamine (PMDTA), sparteine and combinations thereof.

In some embodiments, the catalyst is a Ziegler-Natta catalyst. Generally, Ziegler-Natta catalysts can be heterogeneous or homogeneous. In some embodiments, the Ziegler-Natta catalyst used for polymerizing the polyfarnesenes disclosed herein is a heterogeneous Ziegler-Natta catalyst. Some useful Ziegler-Natta catalysts are disclosed in J. Boor, "Ziegler-Natta Catalysts and Polymerizations," Saunders College Publishing, pp. 1-687 (1979); and Malcolm P. Stevens, "*Polymer Chemistry, an Introduction*," Third Edition, Oxford University Press, pp. 236-245 (1999), both of which are incorporated herein by reference.

Heterogeneous Ziegler-Natta catalysts generally comprise (1) a transition metal compound comprising an element from groups IV to VIII; and (2) an organometallic compound comprising a metal from groups I to III of the periodic table. The transition metal compound is referred as the catalyst while the organometallic compound is regarded as the cocatalyst or activator. The transition metal compound generally comprises a metal and one or more anions and ligands. Some non-limiting examples of suitable metals include titanium, vanadium, chromium, molybdenum, zirconium, iron and cobalt. Some non-limiting examples of suitable anions or ligands include halides, oxyhalides, alkoxy, acetylacetonyl, cyclopentadienyl, and phenyl.

Any cocatalyst or activator that can ionize the organometallic complex to produce an active olefin polymerization catalyst can be used herein. Generally, the organometallic cocatalysts are hydrides, alkyls, or aryls of metals, such as aluminum, lithium, zinc, tin, cadmium, beryllium, and magnesium. Some non-limiting examples of suitable cocatalysts include alumoxanes (methyl alumoxane (MAO), PMAO, ethyl alumoxane, diisobutyl alumoxane), alkylaluminum compounds (trimethylaluminum, triethylaluminum, diethyl aluminum chloride, trimethylaluminum, triisobutylaluminum, trioctylaluminum), diethylzinc, di(i-butyl)zinc, di(n-hexyl)zinc, and ethylzinc (t-butoxide) and the like. Other suitable cocatalysts include acid salts that contain non-nucleophilic anions. These compounds generally consist of bulky ligands attached to boron or aluminum. Some non-limiting examples of such compounds include lithium tetrakis(pentafluorophenyl)borate, lithium tetrakis(pentafluorophenyl)aluminate, anilinium tetrakis(pentafluorophenyl) borate, and the like. Some non-limiting examples of suitable cocatalysts also include organoboranes, which include boron and one or more alkyl, aryl, or aralkyl groups. Other non-limiting examples of suitable cocatalysts include substituted and unsubstituted trialkyl and triarylboranes such as tris(pentafluorophenyl)borane, triphenylborane, tri-n-octylborane, and the like. These and other suitable boron-containing cocatalysts or activators are described in U.S. Pat. Nos. 5,153, 157, 5,198,401, and 5,241,025, both of which are incorporated herein by reference.

In certain embodiments, the Ziegler-Natta catalyst can be impregnated on a support material. Some suitable support materials are disclosed in Malcolm P. Stevens, "*Polymer Chemistry, an Introduction*," Third Edition, Oxford University Press, p. 251 (1999), which is incorporated herein by reference.

The support material is generally a material inert or substantially inert to olefin polymerization reactions. Non-limiting examples of suitable support materials include MgCl$_2$, MgO, alumina such as activated alumina and microgel alumina, silica, magnesia, kieselguhr, fuller's earth, clays, alumina silicates, porous rare earth halides and oxylalides, and combinations thereof. The support material can have a surface area between about 5 m$^2$/g and about 450 m$^2$/g, as determined by the BET (Brunauer-Emmet-Teller) method of measuring surface area, as described by S. Brunauer, P. H. Emmett, and E. Teller, Journal of the American Chemical Society, 60, 309 (1938), which is incorporated herein by reference. In some embodiments, the surface area of the support material is between about 10 m$^2$/g and about 350 m$^2$/g. In further embodiments, the surface area of the support material is between about 25 m$^2$/g and about 300 m$^2$/g.

The support material can have an average particle size ranging from about 20 to about 300 microns, from about 20 to about 250 microns, from about 20 to about 200 microns, from about 20 to about 150 microns, from about 20 to about 120 microns, from about 30 to about 100 microns, or from about 30 to about 90 microns. The compacted or tamped bulk density of the support material can vary between about 0.6 and about 1.6 g/cc, between about 0.7 and about 1.5 g/cc, between about 0.8 and about 1.4 g/cc, or between about 0.9 and about 1.3 g/cc.

In certain embodiments, the catalyst used herein is or comprises a Kaminsky catalyst, also known as homogeneous Ziegler-Natta catalyst. The Kaminsky catalyst can be used to produce polyolefins such as the polyfarnesenes disclosed herein with unique structures and physical properties. Some Kaminsky catalysts or homogeneous Ziegler-Natta catalysts are disclosed in Malcolm P. Stevens, "*Polymer Chemistry, an Introduction*," Third Edition, Oxford University Press, pp. 245-251 (1999); and John Scheirs and Walter Kaminsky, "*Metallocene-Based Polyolefins: Preparation, Properties, and Technology*," Volume 1, Wiley (2000), both of which are incorporated herein by reference.

In some embodiments, the Kaminsky catalyst suitable for making the polyfarnesene disclosed herein comprises a transition-metal atom sandwiched between ferrocene ring structures. In other embodiments, the Kaminsky catalyst can be represented by the formula Cp$_2$MX$_2$, where M is a transition metal (e.g., Zr, Ti or Hf); X is halogen (e.g., Cl), alkyl or a combination thereof, and Cp is a ferrocenyl group. In further embodiments, the Kaminsky catalyst has formula (XVI):

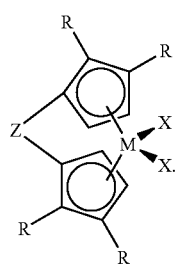

(XVI)

wherein Z is an optional divalent bridging group, usually C(CH$_3$)$_2$, Si(CH$_3$)$_2$, or CH$_2$CH$_2$; R is H or alkyl; M is a transition metal (e.g., Zr, Ti or Hf); X is halogen (e.g., Cl), alkyl or a combination thereof. Some non-limiting examples of Kaminsky catalysts have formulae (XVII) to (XIX):

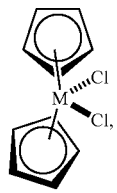

(XVII)

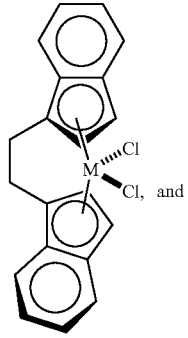

(XVIII)

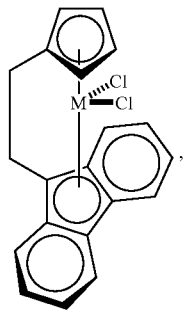

(XIX)

wherein M is Zr, Hf or Ti.

In some embodiments, a cocatalyst is used with the Kaminsky catalyst. The cocatalyst may be any of the cocatalyst disclosed herein. In certain embodiments, the cocatalyst is methylaluminoxane (MAO). MAO is an oligomeric compound having a general formula (CH$_3$AlO)$_n$, where n is from 1 to 10. MAO may play several roles: it alkylates the metallocene precursor by replacing chlorine atoms with methyl groups; it produces the catalytic active ion pair Cp$_2$MCH$_3^+$/MAO$^-$, where the cationic moiety is considered responsible for polymerization and MAO$^-$ acts as weakly coordinating anion. Some non-limiting examples of MAO include formulae (XX) to (XXI):

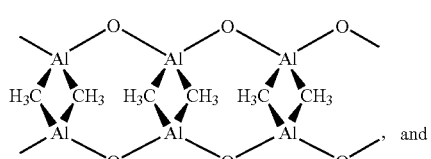

(XX)

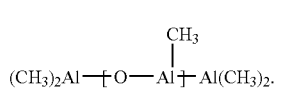

(XXI)

In certain embodiments, the catalyst for making the farnesene interpolymer disclosed herein is or comprises a metallocene catalyst. Some metallocene catalysts are disclosed in Tae Oan Ahn et al., "*Modification of a Ziegler-Natta catalyst* with a metallocene catalyst and its olefin polymerization behavior," Polymer Engineering and Science, 39(7), p. 1257 (1999); and John Scheirs and Walter Kaminsky, "*Metallocene-Based Polyolefins: Preparation, Properties, and Technology*," Volume 1, Wiley (2000), both of which are incorporated herein by reference.

In other embodiments, the metallocene catalyst comprises complexes with a transition metal centre comprising a transition metal, such as Ni and Pd, and bulky, neutral ligands comprising alpha-diimine or diketimine. In further embodiments, the metallocene catalyst has formula (XXII):

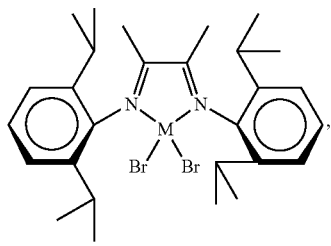

(XXII)

wherein M is Ni or Pd.

In some embodiments, the catalyst used herein is or comprises a metallocene catalyst bearing mono-anionic bidentate ligands. A non-limiting example of such a metallocene catalyst has structure (XXIII):

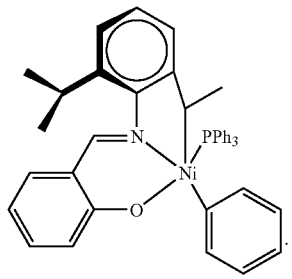

(XXIII)

In other embodiments, the catalyst used herein is or comprises a metallocene catalyst comprising iron and a pyridyl is incorporated between two imine groups giving a tridentate ligand. A non-limiting example of such a metallocene catalyst has structure (XXIV):

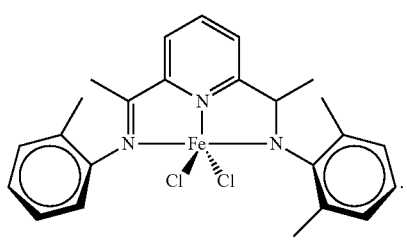

(XXIV)

In some embodiments, the catalyst used herein is or comprises a metallocene catalyst comprising a salicylimine catalyst system based on zirconium. A non-limiting example of such a metallocene catalyst has structure (XXV):

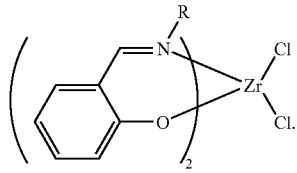

(XXV)

In some embodiments, the farnesene homopolymer disclosed herein is prepared by a process comprising the steps of:
(a) making a farnesene from a simple sugar or non-fermentable carbon source by using a microorganism; and
(b) polymerizing the farnesene in the presence of a catalyst disclosed herein.

In certain embodiments, the farnesene interpolymer disclosed herein is prepared by a process comprising the steps of:
(a) making a farnesene from a simple sugar or non-fermentable carbon source by using a microorganism; and
(b) copolymerizing the farnesene and at least one vinyl monomer in the presence of a catalyst disclosed herein.

In some embodiments, the polyfarnesene disclosed herein is prepared by polymerizing a β-farnesene in the presence of a catalyst, wherein the amount of the cis-1,4-microstructure in the polyfarnesene is at most about 80 wt. %, at most about 75 wt. %, at most about 70 wt. %, at most about 65 wt. %, or at most about 60 wt. %, based on the total weight of the polyfarnesene. In some embodiments, the β-farnesene is copolymerized with a vinyl monomer to form a farnesene copolymer. In other embodiments, the vinyl monomer is styrene. In further embodiments, the farnesene copolymer is a block copolymer.

In certain embodiments, the polyfarnesene disclosed herein is prepared by polymerizing an α-farnesene in the presence of a catalyst, wherein the amount of the cis-1,4-microstructure in the polyfarnesene is from about 1 wt. % to about 99 wt. %, from about 10 wt. % to about 99 wt. %, from about 20 wt. % to about 99 wt. %, from about 30 wt. % to about 99 wt. %, from about 40 wt. % to about 99 wt. %, from about 50 wt. % to about 99 wt. %, from about 1 wt. % to about 99 wt. %, from about 1 wt. % to about 90 wt. %, from about 1 wt. % to about 80 wt. %, from about 1 wt. % to about 70 wt. %, or from about 1 wt. % to about 60 wt. %, based on the total weight of the polyfarnesene. In some embodiments, the α-farnesene is copolymerized with a vinyl monomer to form a farnesene copolymer. In other embodiments, the vinyl monomer is styrene. In further embodiments, the farnesene copolymer is a block copolymer.

In some embodiments, the polyfarnesene disclosed herein can be hydrogenated partially or completely by any hydrogenating agent known to a skilled artisan. For example, a saturated polyfarnesene can be prepared by (a) polymerizing a farnesene disclosed herein in the presence of a catalyst disclosed herein to form a polyfarnesene; and (b) hydrogenating at least a portion of the double bonds in the polyfarnesene in the presence of a hydrogenation reagent. In some embodiments, the farnesene is copolymerized with a vinyl monomer disclosed herein to form a farnesene copolymer. In other embodiments, the vinyl monomer is styrene. In further embodiments, the farnesene copolymer is a block copolymer. In still further embodiments, the farnesene is α-farnesene or β-farnesene or a combination thereof.

In certain embodiments, the hydrogenation reagent is hydrogen in the presence of a hydrogenation catalyst. In some embodiments, the hydrogenation catalyst is Pd, Pd/C, Pt, $PtO_2$, $Ru(PPh_3)_2Cl_2$, Raney nickel or a combination thereof.

In one embodiment, the catalyst is a Pd catalyst. In another embodiment, the catalyst is 5% Pd/C. In a further embodiment, the catalyst is 10% Pd/C in a high pressure reaction vessel and the hydrogenation reaction is allowed to proceed until completion. Generally, after completion, the reaction mixture can be washed, concentrated, and dried to yield the corresponding hydrogenated product. Alternatively, any reducing agent that can reduce a C=C bond to a C—C bond can also be used. For example, the polyfarnesene can be hydrogenated by treatment with hydrazine in the presence of a catalyst, such as 5-ethyl-3-methyllumiflavinium perchlorate, under an oxygen atmosphere to give the corresponding hydrogenated products. The reduction reaction with hydrazine is disclosed in Imada et al., *J. Am. Chem. Soc.*, 127, 14544-14545 (2005), which is incorporated herein by reference.

In some embodiments, at least a portion of the C=C bonds of the polyfarnesene disclosed herein is reduced to the corresponding C—C bonds by hydrogenation in the presence of a catalyst and hydrogen at room temperature. In other embodiments, at least a portion of the C=C bonds of one or more of formulae (I')-(III'), (V')-(VII'), and (XI)-(XIV) and stereoisomers thereof is reduced to the corresponding C—C bonds by hydrogenation in the presence of a catalyst and hydrogen at room temperature. In further embodiments, the hydrogenation catalyst is 10% Pd/C.

In certain embodiments, the vinyl monomer is styrene. In some embodiments, the farnesene is α-farnesene or β-farnesene or a combination thereof. In other embodiments, the farnesene is prepared by using a microorganism. In further embodiments, the farnesene is derived from a simple sugar or non-fermentable carbon source.

Farnesene

The farnesene can be derived from any source or prepared by any method known to a skilled artisan. In some embodiments, the farnesene is derived from a chemical source (e.g., petroleum or coal) or obtained by a chemical synthetic method. In other embodiments, the farnesene is prepared by fractional distillation of petroleum or coal tar. In further embodiments, the farnesene is prepared by any known chemical synthetic method. One non-limiting example of suitable chemical synthetic method includes dehydrating nerolidol with phosphoryl chloride in pyridine as described in the article by Anet E. F. L. J., "*Synthesis of (E,Z)-α-,(ZZ)-α-, and (Z)-β-farnesene,*" *Aust. J. Chem.*, 23(10), 2101-2108 (1970), which is incorporated herein by reference.

In some embodiments, the farnesene can be obtained or derived from naturally occurring terpenes that can be produced by a wide variety of plants, such as *Copaifera langsdorffii*, conifers, and spurges; insects, such as swallowtail butterflies, leaf beetles, termites, and pine sawflies; and marine organisms, such as algae, sponges, corals, mollusks, and fish.

*Copaifera langsdorffii* or *Copaifera* tree is also known as the diesel tree and kerosene tree. It has many names in local languages, including kupa'y, cabismo, and copaúva. *Copaifera* tree may produce a large amount of terpene hydrocarbons in its wood and leaves. Generally, one *Copaifera* tree can produce from about 30 to about 40 liters of terpene oil per year.

Terpene oils can also be obtained from conifers and spurges. Conifers belong to the plant division Pinophyta or Coniferae and are generally cone-bearing seed plants with vascular tissue. The majority of conifers are trees, but some conifers can be shrubs. Some non-limiting examples of suitable conifers include cedars, cypresses, douglas-firs, firs, junipers, kauris, larches, pines, redwoods, spruces, and yews.

Spurges, also known as *Euphorbia*, are a very diverse worldwide genus of plants, belonging to the spurge family (Euphorbiaceae). Consisting of about 2160 species, spurges are one of the largest genera in the plant kingdom.

The farnesene is a sesquiterpene which are part of a larger class of compound called terpenes. A large and varied class of hydrocarbons, terpenes include hemiterpenes, monoterpenes, sesquiterpenes, diterpenes, sesterterpenes, triterpenes, tetraterpenes, and polyterpenes. As a result, the farnesene can be isolated or derived from terpene oils for use in the present invention.

In certain embodiments, the farnesene is derived from a biological source. In other embodiments, the farnesene can be obtained from a readily available, renewable carbon source. In further embodiments, the farnesene is prepared by contacting a cell capable of making a farnesene with a carbon source under conditions suitable for making the farnesene.

Any carbon source that can be converted into one or more isoprenoid compounds can be used herein. In some embodiments, the carbon source is a sugar or a non-fermentable carbon source. The sugar can be any sugar known to those of skill in the art. In certain embodiments, the sugar is a monosaccharide, disaccharide, polysaccharide or a combination thereof. In other embodiments, the sugar is a simple sugar (a monosaccharide or a disaccharide). Some non-limiting examples of suitable monosaccharides include glucose, galactose, mannose, fructose, ribose and combinations thereof. Some non-limiting examples of suitable disaccharides include sucrose, lactose, maltose, trehalose, cellobiose and combinations thereof. In still other embodiments, the simple sugar is sucrose. In certain embodiments, the bioengineered fuel component can be obtained from a polysaccharide. Some non-limiting examples of suitable polysaccharides include starch, glycogen, cellulose, chitin and combinations thereof.

The sugar suitable for making the farnesene can be found in a wide variety of crops or sources. Some non-limiting examples of suitable crops or sources include sugar cane, bagasse, miscanthus, sugar beet, sorghum, grain sorghum, switchgrass, barley, hemp, kenaf, potatoes, sweet potatoes, cassava, sunflower, fruit, molasses, whey or skim milk, corn, stover, grain, wheat, wood, paper, straw, cotton, many types of cellulose waste, and other biomass. In certain embodiments, the suitable crops or sources include sugar cane, sugar beet and corn. In other embodiments, the sugar source is cane juice or molasses.

A non-fermentable carbon source is a carbon source that cannot be converted by the organism into ethanol. Some non-limiting examples of suitable non-fermentable carbon sources include acetate and glycerol.

In certain embodiments, the farnesene can be prepared in a facility capable of biological manufacture of $C_{15}$ isoprenoids. The facility can comprise any structure useful for preparing the $C_{15}$ isoprenoids, such as α-farnesene, β-farnesene, nerolidol or farnesol, using a microorganism. In some embodiments, the biological facility comprises one or more of the cells disclosed herein. In other embodiments, the biological facility comprises a cell culture comprising at least a $C_{15}$ isoprenoid in an amount of at least about 1 wt. %, at least about 5 wt. %, at least about 10 wt. %, at least about 20 wt. %, or at least about 30 wt. %, based on the total weight of the cell culture. In further embodiments, the biological facility comprises a fermentor comprising one or more cells described herein.

Any fermentor that can provide cells or bacteria a stable and optimal environment in which they can grow or reproduce can be used herein. In some embodiments, the fermentor comprises a culture comprising one or more of the cells disclosed herein. In other embodiments, the fermentor comprises a cell culture capable of biologically manufacturing farnesyl pyrophosphate (FPP). In further embodiments, the fermentor comprises a cell culture capable of biologically manufacturing isopentenyl diphosphate (IPP). In certain embodiments, the fermentor comprises a cell culture comprising at least a $C_{15}$ isoprenoid in an amount of at least about 1 wt. %, at least about 5 wt. %, at least about 10 wt. %, at least about 20 wt. %, or at least about 30 wt. %, based on the total weight of the cell culture.

The facility can further comprise any structure capable of manufacturing the fuel component or fuel additive from the $C_{15}$ isoprenoid, such as α-farnesene, β-farnesene, nerolidol or farnesol. The structure may comprise a reactor for dehydrating the nerolidol or farnesol to α-farnesene or β-farnesene. Any reactor that can be used to convert an alcohol into an alkene under conditions known to skilled artisans may be used herein. The reactor may comprise a dehydrating catalyst disclosed herein. In some embodiments, the structure further comprises a mixer, a container, and a mixture of the dehydrating products from the dehydrating step.

The biosynthetic process of making C15 isoprenoid compounds are disclosed in U.S. Pat. No. 7,399,323; U.S. Application Number US 2008/0274523; and PCT Publication Numbers WO 2007/140339 and WO 2007/139924, which are incorporated herein by reference.

α-Farnesene

α-Farnesene, whose structure is

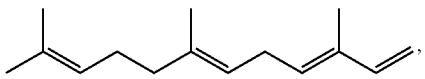

is found in various biological sources including, but not limited to, the Dufour's gland in ants and in the coating of apple and pear peels. Biochemically, α-farnesene is made from FPP by α-farnesene synthase. Some non-limiting examples of suitable nucleotide sequences that encode such an enzyme include (DQ309034; *Pyrus communis cultivar d'Anjou*) and (AY182241; *Malus domestica*). See Pechouus et al., *Planta* 219(1):84-94 (2004).

β-Farnesene

β-Farnesene, whose structure is

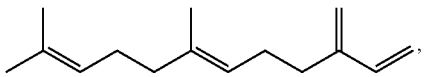

is found in various biological sources including, but not limited to, aphids and essential oils such as peppermint oil. In some plants such as wild potato, β-farnesene is synthesized as a natural insect repellent. Biochemically, β-farnesene is made from FPP by β-farnesene synthase. Some non-limiting examples of suitable nucleotide sequences that encode such an enzyme include (AF024615; *Mentha x piperita*) and (AY835398; *Artemisia annua*). See Picaud et al., *Phytochemistry* 66(9): 961-967 (2005).

Farnesol

Farnesol, whose structure is

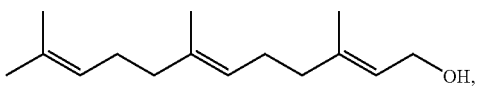

is found in various biological sources including insects and essential oils from cintronella, neroli, cyclamen, lemon grass, tuberose, and rose. Biochemically, farnesol is made from FPP by a hydroxylase such as farnesol synthase. Some non-limiting examples of suitable nucleotide sequences that encode such an enzyme include (AF529266; *Zea mays*) and (YDR481C; *Saccharomyces cerevisiae*). See Song, L., *Applied Biochemistry and Biotechnology* 128:149-158 (2006).

Nerolidol

Nerolidol, whose structure is

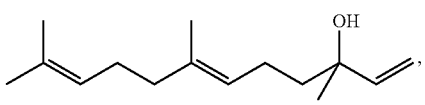

is also known as peruviol which is found in various biological sources including essential oils from neroli, ginger, jasmine, lavender, tea tree, and lemon grass. Biochemically, nerolidol is made from FPP by a hydroxylase such as nerolidol synthase. A non-limiting example of a suitable nucleotide sequence that encodes such an enzyme includes AF529266 from *Zea mays* (maize; gene tps1).

The farnesol and nerolidol disclosed herein may be converted into α-farnesene, β-farnesene or a combination thereof by dehydration with a dehydrating agent or an acid catalyst. Any dehydrating agent or an acid catalyst that can convert an alcohol into an alkene can be used herein. Some non-limiting examples of suitable dehydrating agents or acid catalysts include phosphoryl chloride, anhydrous zinc chloride, phosphoric acid and sulfuric acid.

General Procedures of Making Polyfarnesenes

The polymerization of a farnesene or the copolymerization of a farnesene with a vinyl comonomer can be performed over a wide temperature range. In certain embodiments, the polymerization temperature is from about −30° C. to about 280° C., from about 30° C. to about 180° C., or from about 60° C. to about 100° C. The partial pressures of the vinyl comonomers can range from about 15 psig (0.1 MPa) to about 50,000 psig (245 MPa), from about 15 psig (0.1 MPa) to about 25,000 psig (172.5 MPa), from about 15 psig (0.1 MPa) to about 10,000 psig (69 MPa), from about 15 psig (0.1 MPa) to about 5,000 psig (34.5 MPa) or from about 15 psig (0.1 MPa) to about 1,000 psig (6.9 MPa).

The concentration of the catalyst used for making the polyfranesenes disclosed herein depends on many factors. In some embodiment, the concentration ranges from about 0.01 micromoles per liter to about 100 micromoles per liter. The polymerization time depends on the type of process, the catalyst concentration, and other factors. Generally, the polymerization time is within several minutes to several hours.

A non-limiting example of solution polymerization procedure for farnesene homopolymer is outlined below. A farnesene such as β-farnesene can be added to a solvent such as cyclohexane to form a solution in a reactor which may be optionally under a nitrogen or argon atmosphere. The solution can be dried over a drying agent such as molecular sieves. A catalyst such as organolithium reagent can be added into the reactor, and then the reactor is heated to an elevated temperature until all or a substantial portion of farnesene is consumed. The farnesene homopolymer can then be precipitated from the reaction mixture and dried in a vacuum oven.

A non-limiting example of solution polymerization procedure for farnesene interpolymer is outlined below. A farnesene such as β-farnesene can be added to a solvent such as cyclohexane to form a farnesene solution in a reactor optionally under a nitrogen or argon atmosphere. The farnesene solution can be dried over a drying agent such as molecular sieves. In a second reactor optionally under nitrogen or argon atmosphere, a solution of styrene in cyclohexane with 10% is similarly prepared and dried over a drying agent such as molecular sieves. The styrene is polymerized by a catalyst such as organolithium reagent at an elevated temperature until all or a substantial portion of styrene is consumed. Then, the farnesene solution is transferred to the second reactor. The reaction is allowed to react until all or a substantial portion of farnesene is consumed. Then a dichlorosilane coupling agent (e.g., dichlorodimethylsilane in 1,2-dichloroethane) is then added into the second reactor to form a farnesene interpolymer.

Polyfarnesene Compositions

The polyfarnesenes can be used to prepare polyfarnesene compositions for a wide variety of applications. In some embodiments, the polyfarnesene compositions comprise the polyfarnesene disclosed herein and a second polymer or at least an additive. In certain embodiments, the polyfarnesene compositions comprise a second polymer. In other embodiments, the polyfarnesene compositions do not comprise a second polymer. The second polymer can be a vinyl polymer or polyfarnesene, a non-vinyl polymer or polyfarnesene, or a combination thereof. Some non-limiting examples of vinyl polymers and polyfarnesenes are disclosed in Malcolm P. Stevens, "*Polymer Chemistry, an Introduction*," Third Edition, Oxford University Press, pp. 17-21 and 167-279 (1999), which is incorporated herein by reference. Some non-limiting examples of suitable second polymer include a polyolefin, polyurethane, polyester, polyamide, styrenic polymer, phenolic resin, polyacrylate, polymethacrylate or a combination thereof.

In certain embodiments, the ratio of the polyfarnesene to the second polymer is from about 1:99 to about 99:1, from about 1:50 to about 50:1, from about 1:25 to about 25:1 or from about 1:10 to about 10:1.

In some embodiments, the second polymer is a polyolefin (e.g., polyethylene, polypropylene, an ethylene/α-olefin interpolymer, a copolymer of ethylene and propylene, and a copolymer of ethylene and vinyl acetate (EVA)), polyurethane, polyester, polyamide, styrenic polymer (e.g., polystyrene, poly(acrylonitrile-butadiene-styrene), poly(styrene-butadiene-styrene) and the like), phenolic resin, polyacrylate, polymethacrylate or a combination thereof. In some embodiments, the second polymer is polyethylene, polypropylene, polystyrene, a copolymer of ethylene and vinyl acetate, poly(acrylonitrile-butadiene-styrene), poly(styrene-butadiene-styrene) or a combination thereof. The second polymer may be blended with the farnesene interpolymer before it is added to the polyfarnesene composition. In some embodiments, the second polymer is added directly to the polyfarnesene composition without pre-blending with the farnesene interpolymer.

The weight ratio of the polyfarnesene to the second polymer in the polymer composition can be between about 1:99 and about 99:1, between about 1:50 and about 50:1, between about 1:25 and about 25:1, between about 1:10 and about 10:1, between about 1:9 and about 9:1, between about 1:8 and about 8:1, between about 1:7 and about 7:1, between about 1:6 and about 6:1, between about 1:5 and about 5:1, between about 1:4 and about 4:1, between about 1:3 and about 3:1, between about 1:2 and about 2:1, between about 3:7 and about 7:3 or between about 2:3 and about 3:2.

In some embodiments, the second polymer is a polyolefin. Any polyolefin that is partially or totally compatible with the polyfarnesene may be used. Non-limiting examples of suitable polyolefins include polyethylenes; polypropylenes; polybutylenes (e.g., polybutene-1); polypentene-1; polyhexene-1; polyoctene-1; polydecene-1; poly-3-methylbutene-1; poly-4-methylpentene-1; polyisoprene; polybutadiene; poly-1,5-hexadiene; interpolymers derived from olefins; interpolymers derived from olefins and other polymers such as polyvinyl chloride, polystyrene, polyurethane, and the like; and mixtures thereof. In some embodiments, the polyolefin is a homopolymer such as polyethylene, polypropylene, polybutylene, polypentene-1, poly-3-methylbutene-1, poly-4-methylpentene-1, polyisoprene, polybutadiene, poly-1,5-hexadiene, polyhexene-1, polyoctene-1 and polydecene-1.

Some non-limiting examples of suitable polyethylenes include ultra low density polyethylene (ULDPE), linear low density polyethylene (LLDPE), low density polyethylene (LDPE), medium density polyethylene (MDPE), high density polyethylene (HDPE), high molecular weight high density polyethylene (HMW-HDPE), ultra high molecular weight polyethylene (UHMW-PE) and combinations thereof. Some non-limiting examples of polypropylenes include low density polypropylene (LDPP), high density polypropylene (HDPP), high-melt strength polypropylene (HMS-PP) and combination thereof. In some embodiments, the second polymer is or comprises high-melt-strength polypropylene (HMS-PP), low density polyethylene (LDPE) or a combination thereof.

In some embodiments, the polyfarnesene compositions disclosed herein comprise at least one additive for the purposes of improving and/or controlling the processibility, appearance, physical, chemical, and/or mechanical properties of the polyfarnesene compositions. In some embodiments, the polyfarnesene compositions do not comprise an additive. Any plastics additive known to a person of ordinary skill in the art may be used in the polyfarnesene compositions disclosed herein. Non-limiting examples of suitable additives include fillers, grafting initiators, tackifiers, slip agents, anti-blocking agents, plasticizers, antioxidants, blowing agents, blowing agent activators (e.g., zinc oxide, zinc stearate and the like), UV stabilizers, acid scavengers, colorants or pigments, coagents (e.g., triallyl cyanurate), lubricants, antifogging agents, flow aids, processing aids, extrusion aids, coupling agents, cross-linking agents, stability control agents, nucleating agents, surfactants, solvents, flame retardants, antistatic agents, and combinations thereof.

The total amount of the additives can range from about greater than 0 to about 80%, from about 0.001% to about 70%, from about 0.01% to about 60%, from about 0.1% to about 50%, from about 1% to about 40%, or from about 10% to about 50% of the total weight of the polymer composition. Some polymer additives have been described in Zweifel Hans et al., "*Plastics Additives Handbook*," Hanser Gardner Publications, Cincinnati, Ohio, 5th edition (2001), which is incorporated herein by reference in its entirety.

Optionally, the polyfranesene compositions disclosed herein can comprise an anti-blocking agent. In some embodiments, the polyfranesene compositions disclosed herein do not comprise an anti-blocking agent. The anti-blocking agent can be used to prevent the undesirable adhesion between touching layers of articles made from the polyfarnesene compositions, particularly under moderate pressure and heat during storage, manufacture or use. Any anti-blocking agent known to a person of ordinary skill in the art may be added to the polyfarnesene compositions disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the polymer composition can be from about greater than 0 to about 3 wt %, from about 0.0001 to about 2 wt %, from about 0.001 to about 1 wt %, or from about 0.001 to about 0.5 wt % of the total weight of the polymer composition. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

Optionally, the polyfarnesene compositions disclosed herein can comprise a plasticizer. In general, a plasticizer is a chemical that can increase the flexibility and lower the glass transition temperature of polymers. Any plasticizer known to a person of ordinary skill in the art may be added to the polyfarnesene compositions disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. Where used, the amount of the plasticizer in the polymer composition can be from greater than 0 to about 15 wt %, from about 0.5 to about 10 wt %, or from about 1 to about 5 wt % of the total weight of the polymer composition. Some plasticizers have been described in George Wypych, "*Handbook of Plasticizers*," ChemTec Publishing, Toronto-Scarborough, Ontario (2004), which is incorporated herein by reference.

In some embodiments, the polyfarnesene compositions disclosed herein optionally comprise an antioxidant that can prevent the oxidation of polymer components and organic additives in the polyfarnesene compositions. Any antioxidant known to a person of ordinary skill in the art may be added to the polyfarnesene compositions disclosed herein. Non-limiting examples of suitable antioxidants include aromatic or hindered amines such as alkyl diphenylamines, phenyl-$\alpha$-naphthylamine, alkyl or aralkyl substituted phenyl-$\alpha$-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, N.Y.); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer composition can be from about greater than 0 to about 5 wt %, from about 0.0001 to about 2.5 wt %, from about 0.001 to about 1 wt %, or from about 0.001 to about 0.5 wt % of the total weight of the polymer composition. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

In other embodiments, the polyfarnesene compositions disclosed herein optionally comprise an UV stabilizer that may prevent or reduce the degradation of the polyfarnesene compositions by UV radiations. Any UV stabilizer known to a person of ordinary skill in the art may be added to the polyfarnesene compositions disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer composition can be from about greater than 0 to about 5 wt %, from about 0.01 to about 3 wt %, from about 0.1 to about 2 wt %, or from about 0.1 to about 1 wt % of the total weight of the polymer composition. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

In further embodiments, the polyfarnesene compositions disclosed herein optionally comprise a colorant or pigment that can change the look of the polyfarnesene compositions to human eyes. Any colorant or pigment known to a person of ordinary skill in the art may be added to the polyfarnesene compositions disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer composition can be from about greater than 0 to about 10 wt %, from about 0.1 to about 5 wt %, or from about 0.25 to about 2 wt % of the total weight of the polymer composition. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the polyfarnesene compositions disclosed herein can comprise a filler which can be used to adjust, inter alia, volume, weight, costs, and/or technical performance. Any filler known to a person of ordinary skill in the art may be added to the polyfarnesene compositions disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the polymer composition can be from about greater than 0 to about 80 wt %, from about 0.1 to about 60 wt %, from about 0.5 to about 40 wt %, from about 1 to about 30 wt %, or from about 10 to about 40 wt % of the total weight of the polymer composition. Some fillers have been disclosed in U.S. Pat No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Optionally, the polyfarnesene compositions disclosed herein can comprise a lubricant. In general, the lubricant can be used, inter alia, to modify the rheology of the molten polyfarnesene compositions, to improve the surface finish of molded articles, and/or to facilitate the dispersion of fillers or pigments. Any lubricant known to a person of ordinary skill in the art may be added to the polyfarnesene compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the polymer composition can be from about greater than 0 to about 5 wt %, from about 0.1 to about 4 wt %, or from about 0.1 to about 3 wt % of the total weight of the polymer composition. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polyfarnesene compositions disclosed herein can comprise an antistatic agent. Generally, the antistatic agent can increase the conductivity of the polyfarnesene compositions and to prevent static charge accumulation. Any antistatic agent known to a person of ordinary skill in the art may be added to the polyfarnesene compositions disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer composition can be from about greater than 0 to about 5 wt %, from about 0.01 to about 3 wt %, or from about 0.1 to about 2 wt % of the total weight of the polymer composition. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

Optionally, the polyfarnesene compositions disclosed herein can comprise a blowing agent for preparing foamed articles. The blowing agents can include, but are not limited to, inorganic blowing agents, organic blowing agents, chemical blowing agents and combinations thereof. Some blowing agents are disclosed in Sendijarevic et al., "*Polymeric Foams And Foam Technology*," Hanser Gardner Publications, Cincinnati, Ohio, 2nd edition, Chapter 18, pages 505-547 (2004), which is incorporated herein by reference.

Non-limiting examples of suitable inorganic blowing agents include carbon dioxide, nitrogen, argon, water, air, nitrogen, and helium. Non-limiting examples of suitable organic blowing agents include aliphatic hydrocarbons having 1-6 carbon atoms, aliphatic alcohols having 1-3 carbon atoms, and fully and partially halogenated aliphatic hydrocarbons having 1-4 carbon atoms. Non-limiting examples of suitable aliphatic hydrocarbons include methane, ethane, propane, n-butane, isobutane, n-pentane, isopentane, neopentane, and the like. Non-limiting examples of suitable aliphatic alcohols include methanol, ethanol, n-propanol, and isopropanol. Non-limiting examples of suitable fully and partially halogenated aliphatic hydrocarbons include fluorocarbons, chlorocarbons, and chlorofluorocarbons. Non-limiting examples of suitable fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Non-limiting examples of suitable partially halogenated chlorocarbons and chlorofluorocarbons include methyl chloride, methylene chloride, ethyl chloride, 1,1,1-trichloroethane, 1,1-dichloro-1-fluoroethane (HCFC-141b), 1-chloro-1,1 difluoroethane (HCFC-142b), 1,1-dichloro-2,2,2-trifluoroethane (HCFC-123) and 1-chloro-1,2,2,2-tetrafluoroethane(HCFC-124). Non-limiting examples of suitable fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Non-limiting examples of suitable chemical blowing agents include azodicarbonamide, azodiisobutyro-nitrile, benezenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. In some embodiments, the blowing agent is azodicarbonamide isobutane, $CO_2$, or a mixture of thereof.

The amount of the blowing agent in the polymer composition disclosed herein may be from about 0.1 to about 20 wt. %, from about 0.1 to about 10 wt. %, or from about 0.1 to about 5 wt. %, based on the weight of the farnesene interpolymer or the polymer composition. In other embodiments, the amount of the blowing agent is from about 0.2 to about 5.0 moles per kilogram of the interpolymer or polymer composition, from about 0.5 to about 3.0 moles per kilogram of the interpolymer or polymer composition, or from about 1.0 to about 2.50 moles per kilogram of the interpolymer or polymer composition.

In some embodiments, the polyfarnesene compositions disclosed herein comprise a slip agent. In other embodiments, the polyfarnesene compositions disclosed herein do not comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of films; and reducing the friction between layers of the films and between the films and other surfaces with which they come into contact.

Any slip agent known to a person of ordinary skill in the art may be added to the polyfarnesene compositions disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof.

In some embodiments, the slip agent is a primary amide with a saturated aliphatic group having between 18 and about 40 carbon atoms (e.g., stearamide and behenamide). In other embodiments, the slip agent is a primary amide with an unsaturated aliphatic group containing at least one carbon-carbon double bond and between 18 and about 40 carbon atoms (e.g., erucamide and oleamide). In further embodiments, the slip agent is a primary amide having at least 20 carbon atoms. In further embodiments, the slip agent is erucamide, oleamide, stearamide, behenamide, ethylene-bis-stearamide, ethylene-bis-oleamide, stearyl erucamide, behenyl erucamide or a combination thereof. In a particular embodiment, the slip agent is erucamide. In further embodiments, the slip agent is commercially available having a trade name such as ATMER™ SA from Uniqema, Everberg, Belgium; ARMOSLIP® from Akzo Nobel Polymer Chemicals, Chicago, Ill.; KEMAMIDE® from Witco, Greenwich, Conn.; and CRODAMIDE® from Croda, Edison, N.J. Where used, the amount of the slip agent in the polymer composition can be from about greater than 0 to about 3 wt %, from about 0.0001 to about 2 wt %, from about 0.001 to about 1 wt %, from about 0.001 to about 0.5 wt % or from about 0.05 to about 0.25 wt % of the total weight of the polymer composition. Some slip agents have been described in Zweifel Hans et al., "*Plastics Additives Handbook*," Hanser Gardner Publications, Cincinnati, Ohio, 5th edition, Chapter 8, pages 601-608 (2001), which is incorporated herein by reference.

In some embodiments, the polyfarnesene compositions disclosed herein comprise a tackifier. In other embodiments, the polyfarnesene compositions disclosed herein do not comprise a tackifier. Any material that can be added to an elastomer to produce an adhesive can be used herein as a tackifier. Some non-limiting examples of tackifiers include a natural and modified resin; a glycerol or pentaerythritol ester of natural or modified rosin; a copolymer or terpolymer of natured terpene; a polyterpene resin or a hydrogenated polyterpene resin; a phenolic modified terpene resin or a hydrogenated derivative thereof, an aliphatic or cycloaliphatic hydrocarbon resin or a hydrogenated derivative thereof, an aromatic hydrocarbon resin or a hydrogenated derivative thereof, an aromatic modified aliphatic or cycloaliphatic hydrocarbon resin or a hydrogenated derivative thereof, or a combination thereof. In certain embodiments, the tackifier has a ring and ball (R&B) softening point equal to or greater than 60° C., 70° C., 75° C., 80° C., 85° C., 90° C. or 100° C., as measured in accordance with ASTM 28-67, which is incorporated herein by reference. In certain embodiments, the tackifier has a R&B softening point equal to or greater than 80° C., as measured in accordance with ASTM 28-67.

In certain embodiments, the amount of tackifier in the polyfarnesene compositions disclosed herein is in the range from about 0.1 wt. % to about 70 wt. %, from about 0.1 wt. % to about 60 wt. %, from about 1 wt. % to about 50 wt. %, or from about 0.1 wt. % to about 40 wt. % or from about 0.1 wt. % to about 30 wt. % or from about 0.1 wt. % to about 20 wt. %, or from about 0.1 wt. % to about 10 wt. %, based on the total weight of the composition. In other embodiments, the amount of tackifier in the compositions disclosed herein is in the range from about 1 wt. % to about 70 wt. %, from about 5 wt. % to about 70 wt. %, from about 10 wt. % to about 70 wt. %, from about 15 wt. % to about 70 wt. %, from about 20 wt. % to about 70 wt. %, or from about 25 wt. % to about 70 wt. %, based on the total weight of the composition.

Optionally, the polyfarnesene compositions disclosed herein can comprise a wax, such as a petroleum wax, a low molecular weight polyethylene or polypropylene, a synthetic wax, a polyolefin wax, a beeswax, a vegetable wax, a soy wax, a palm wax, a candle wax or an ethylene/α-olefin interpolymer having a melting point of greater than 25° C. In certain embodiments, the wax is a low molecular weight polyethylene or polypropylene having a number average molecular weight of about 400 to about 6,000 g/mole. The wax can be present in the range from about 10% to about 50% or 20% to about 40% by weight of the total composition.

Optionally, the polyfarnesene compositions disclosed herein may be crosslinked, partially or completely. When crosslinking is desired, the polyfarnesene compositions disclosed herein comprise a cross-linking agent that can be used to effect the cross-linking of the polyfarnesene compositions, thereby increasing their modulus and stiffness, among other things. An advantage of a polyfarnesene composition is that crosslinking can occur in its side chains instead of the polymer backbone like other polymers such as polyisoprene and polybutadiene. Any cross-linking agent known to a person of ordinary skill in the art may be added to the polyfarnesene compositions disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). Where used, the amount of the cross-linking agent in the polymer composition can be from about greater than 0 to about 20 wt. %, from about 0.1 wt. % to about 15 wt. %, or from about 1 wt. % to about 10 wt. % of the total weight of the polymer composition. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

In some embodiments, the farnesene interpolymers disclosed herein includes farnesene-modified polymers prepared by copolymerizing one or more farnesene with one or more vinyl monomers. In certain embodiments, the unmodified polymer derived from the one or more vinyl monomers can be any known olefin homopolymer or interpolymer. In further embodiments, none of the one or more other vinyl monomers has an unsaturated side chain capable of reacting with a cross-linking agent. Because of the unsaturated side chains derived from the farnesene, the farnesene-modified polymer disclosed herein can be cross-linked by a cross-linking agent disclosed herein.

In certain embodiments, the amount of the farnesene in the farnesene-modified polymer disclosed herein is from about 1 wt. % to about 20 wt. %, from about 1 wt. % to about 10 wt. %, from about 1 wt. % to about 7.5 wt. %, from about 1 wt. % to about 5 wt. %, from about 1 wt. % to about 4 wt. %, from about 1 wt. % to about 3 wt. %, or from about 1 wt. % to about 2 wt. %, based on the total weight of the farnesene-modified polymer. In other embodiments, the amount of the one or more other vinyl monomers in the farnesene-modified polymer disclosed herein is from about 80 wt. % to about 99 wt. %, from about 90 wt. % to about 99 wt. %, from about 92.5 wt. % to about 99 wt. %, from about 95 wt. % to about 99 wt. %, from about 96 wt. % to about 99 wt. %, from about 97 wt. % to about 99 wt. %, or from about 98 wt. % to about 99 wt. %, based on the total weight of the farnesene-modified polymer.

The cross-linking of the polyfarnesene compositions can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in embodiments of the invention.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range of about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example, 0° C. to about 60° C., may also be employed. Preferably, the irradiation is carried out after shaping or fabrication of the article. Also, in a preferred embodiment, the farnesene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases; carboxylic acids; and organometallic compounds including organic titanates and complexes or carboxylates of lead, cobalt, iron, nickel, zinc and tin; dibutyltindilaurate, dioctyltinmaleate, dibutyltindiacetate, dibutyltindioctoate, stannous acetate, stannous octoate, lead naphthenate, zinc caprylate, cobalt naphthenate; and the like. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallvl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have poly-functional (i.e. at least two) moieties such as C=C, C=N or C=O.

At least one pro-rad additive can be introduced to the farnesene interpolymer by any method known in the art. However, preferably the pro-rad additive(s) is introduced via a masterbatch concentrate comprising the same or different base resin as the farnesene interpolymer. Preferably, the pro-rad additive concentration for the masterbatch is relatively high e.g., about 25 weight percent (based on the total weight of the concentrate).

The at least one pro-rad additive is introduced to the polyfarnesene in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the farnesene interpolymer.

In addition to electron-beam irradiation, crosslinking can also be effected by UV irradiation. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monacetals is the homolytic cleavage of the α-bond to give acyl and dialkoxyalkyl radicals. This type of α-cleavage is known as a Norrish Type I reaction which is more fully described in W. Horspool and D. Armesto, "*Organic Photochemistry: A Comprehensive Treatment*," Ellis Horwood Limited, Chichester, England, 1992; J. Kopecky, "*Organic Photochemistry: A Visual Approach*," VCH Publishers, Inc., New York, N.Y. 1992; N. J. Turro, et al., *Acc. Chem. Res.*, 1972, 5, 92; and J. T. Banks, et al., *J. Am. Chem. Soc.*, 1993, 115, 2473. The synthesis of monoacetals of aromatic 1,2 diketones, Ar—CO—C(OR)$_2$—Ar' is described in U.S. Pat. No. 4,190,602 and Ger. Offen. 2,337,813. The preferred compound from this class is 2,2-dimethoxy-2-phenylacetophenone, $C_6H_5$—CO—$C(OCH_3)_2$—$C_6H_5$, which is commercially available from Ciba-Geigy as IRGACURE™ 651. Examples of other aromatic ketones useful herein as photoinitiators are IRGACURE™ 184, 369, 819, 907 and 2959, all available from Ciba-Geigy.

In one embodiment of the invention, the photoinitiator is used in combination with a photocrosslinker. Any photocrosslinker that will upon the generation of free radicals, link two or more polyolefin backbones together through the formation of covalent bonds with the backbones can be used herein. Preferably these photocrosslinkers are polyfunctional, i.e., they comprise two or more sites that upon activation will form a covalent bond with a site on the backbone of the polyfarnesene. Representative photocrosslinkers include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate and the like. Preferred photocrosslinkers for use in the present invention are compounds which have polyfunctional (i.e., at least two) moieties. Particularly preferred photocrosslinkers are triallycyanurate (TAC) and triallylisocyanurate (TAIC).

Certain compounds act as both a photoinitiator and a photocrosslinker herein. These compounds are characterized by the ability to generate two or more reactive species (e.g., free radicals, carbenes, nitrenes, etc.) upon exposure to UV-light and to subsequently covalently bond with two polymer chains. Any compound that can perform these two functions can be used herein, and representative compounds include sulfonyl azides.

In another embodiment, the polyfarnesene is subjected to secondary crosslinking, i.e., crosslinking other than and in addition to photocrosslinking. In this embodiment, the photoinitiator is used either in combination with a nonphotocrosslinker, e.g., a silane, or the polyfarnesene is subjected to a secondary crosslinking procedure, e.g., exposure to E-beam radiation. The use of a photocrosslinker in this embodiment is optional.

At least one photoadditive, i.e., photoinitiator and optional photocrosslinker, can be introduced to the polyfarnesene by any method known in the art. However, preferably the photoadditive(s) is (are) introduced via a masterbatch concentrate comprising the polyfarnesene. Preferably, the photoadditive concentration for the masterbatch is high than about 10 wt. %, about 15 wt. %, about 20 wt. %, or about 25 wt. %, based on the total weight of the concentrate.

The at least one photoadditive is introduced to the polyfarnesene in any effective amount. Preferably, the at least one photoadditive introduction amount is from about 0.001 wt. % to about 5 wt. %, more preferably from about 0.005 wt. % to about 2.5 wt. % and most preferably from about 0.015 wt. % to about 1 wt. %, based on the total weight of the polyfarnesene.

The photoinitiator(s) and optional photocrosslinker(s) can be added during different stages of the fiber or film manufacturing process. If photoadditives can withstand the extrusion temperature, a polyolefin resin can be mixed with additives before being fed into the extruder, e.g., via a masterbatch addition. Alternatively, additives can be introduced into the extruder just prior the slot die, but in this case the efficient mixing of components before extrusion is important. In another approach, polyolefin fibers can be drawn without photoadditives, and a photoinitiator and/or photocrosslinker can be applied to the extruded fiber via a kiss-roll, spray, dipping into a solution with additives, or by using other industrial methods for post-treatment. The resulting fiber with photoadditive(s) is then cured via electromagnetic radiation in a continuous or batch process. The photo additives can be blended with the polyolefin using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with a polyolefin resin, extruded into a fiber, and irradiated in a continuous process using one energy source or several units linked in a series. There are several advantages to using a continuous process compared with a batch process to cure a fiber or sheet of a knitted fabric which are collected onto a spool.

Irradiation may be accomplished by the use of UV-radiation. Preferably, UV-radiation is employed up to the intensity of 100 J/cm$^2$. The irradiation source can be any UV-light generator operating in a range of about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 J/cm$^2$ to about 500 J/scm$^2$, preferably between about 5 J/cm$^2$ to about 100 J/cm$^2$. Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the polyfarnesene which has been incorporated with a photoadditive is irradiated with UV-radiation at about 10 J/cm$^2$ to about 50 J/cm$^2$.

Blending of the Ingredients of the Polymer Compositions

The ingredients of the polyfarnesene compositions, i.e., the farnesene interpolymer, the additive, the optional second polymer (e.g., polyethylene, and polypropylene) and additives (e.g., the cross-linking agent) can be mixed or blended using methods known to a person of ordinary skill in the art. Non-limiting examples of suitable blending methods include melt blending, solvent blending, extruding, and the like.

In some embodiments, the ingredients of the polyfarnesene compositions are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the foam is formed by heating the contents of the vessel to a molten state while stirring.

In other embodiments, the ingredients of the articles are processed using solvent blending. First, the ingredients of the desired foam are dissolved in a suitable solvent and the mixture is then mixed or blended. Next, the solvent is removed to provide the foam.

In further embodiments, physical blending devices that can provide dispersive mixing, distributive mixing, or a combination of dispersive and distributive mixing can be used in preparing homogenous blends. Both batch and continuous methods of physical blending can be used. Non-limiting examples of batch methods include those methods using BRABENDER® mixing equipments (e.g., BRABENDER PREP CENTER® , available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the farnesene interpolymer, the optional second polymer or the foam. The mixing or blending of polymers by extrusion has been described in C. Rauwendaal, "*Polymer Extrusion*", Hanser Publishers, New York, N.Y., pages 322-334 (1986), which is incorporated herein by reference.

When one or more additives are required in the polyfarnesene compositions, the desired amounts of the additives can be added in one charge or multiple charges to the farnesene interpolymer, the second polymer or the polymer composition. Furthermore, the addition can take place in any order. In some embodiments, the additives are first added and mixed or blended with the farnesene interpolymer and then the additive-containing interpolymer is blended with the second polymer. In other embodiments, the additives are first added and mixed or blended with the second polymer and then the additive-containing second polymer is blended with the farnesene interpolymer. In further embodiments, the farnesene interpolymer is blended with the second polymer first and then the additives are blended with the polymer composition.

The ingredients of the polymer composition can be mixed or blended in any suitable mixing or blending devices known to skilled artisans. The ingredients in the polymer composition can then be mixed at a temperature below the decomposition temperature of the blowing agent and the cross-linking agent to ensure that all ingredients are homogeneously mixed and remain intact. After the polymer composition is relatively homogeneously mixed, the composition is shaped and then exposed to conditions (e.g. heat, pressure, shear, etc.) over a sufficient period of time to activate the blowing agent and the cross-linking agent to make the foam.

Applications of the Compositions Comprising the Polyfarnesenes

The polyfarnesenes or polyfarnesene compositions disclosed herein can be used for a wide variety of applications. For example, they can be used in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the present polymers, include blends with other natural or synthetic polymers, additives, reinforcing agents, ignition resistant additives, antioxidants, stabilizers, colorants, extenders, crosslinkers, blowing agents, and plasticizers. Of particular utility are multi-component fibers such as core/sheath fibers, having an outer surface layer, comprising at least in part, one or more polymers of the invention.

Fibers that may be prepared from the polyfarnesenes or polyfarnesene compositions disclosed herein include staple fibers, tow, multicomponent, sheath/core, twisted, and monofilament. Any fiber forming processes can be used herein. For example, suitable fiber forming processes include spinbonded, melt blown techniques, gel spun fibers, woven and nonwoven fabrics, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers. The polyfarnesenes or polyfarnesene compositions disclosed herein are also useful for wire and cable coating operations, as well as in sheet extrusion for vacuum forming operations, and forming molded articles, including the use of injection molding, blow molding process, or rotomolding processes. The polyfarnesenes or polyfarnesene compositions disclosed herein can also be formed into fabricated articles such as those previously mentioned using conventional polyolefin processing techniques which are well known to those skilled in the art of polyolefin processing.

Dispersions (both aqueous and non-aqueous) can also be formed using the polyfarnesenes or polyfarnesene compositions disclosed herein. Frothed foams comprising the polyfarnesenes or polyfarnesene compositions disclosed herein can also be formed. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Suitable end uses for the foregoing products include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

The polyfarnesene compositions disclosed herein can also be used to manufacture articles for various applications such as the automotive, construction, medical, food and beverage, electrical, appliance, business machine, and consumer markets. In some embodiments, the polyfarnesene compositions are used to manufacture molded parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles.

In some embodiments, the polyfarnesene compositions disclosed herein are used to prepare molded articles, films, sheets and foams with known polymer processes such as extrusion (e.g., sheet extrusion and profile extrusion); molding (e.g., injection molding, rotational molding, and blow molding); fiber spinning; and blown film and cast film processes. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*," Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 ( 2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming. The rotational molding of polymers has been described in Glenn Beall, "*Rotational Molding: Design, Materials & Processing*," Hanser Gardner Publications, Cincinnati, Ohio (1998), which is incorporated herein by reference in its entirety.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene. The blow molding of polymers has been described in Norman C. Lee, "*Understanding Blow Molding*," Hanser Gardner Publications, Cincinnati, Ohio (2000), which is incorporated herein by reference in its entirety.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Purification of Starting Materials

β-farnesene having 97.6% purity by weight was obtained from Amyris Biotechnologies Inc., Emeryville, Calif. β-Farnesene included hydrocarbon-based impurities such as zingiberene, bisabolene, farnesene epoxide, farnesol isomer, E,E-farnesol, squalene, ergosterol, and some dimers of farnesene. β-farnesene was purified with a 3 Å molecular sieve to remove the impurities and were then redistilled under nitrogen atmosphere to improve purity. Cyclohexane was distilled under nitrogen atmosphere to eliminate moisture and stored with a drying agent.

Differential Scanning Calorimetry

A TA Q200 differential scanning calorimeter was utilized to determine glass transition temperatures ($T_g$) of polymer samples disclosed herein. A 5 mg sample was placed in an aluminum pan. An empty reference pan and the sample pan were maintained within i 0.01 mg. Samples were scanned from about −175° C. to about 75° C. at a rate of 10° C./min. $T_g$ was identified as a step change transition in the heat flow. The mid-point of the transition was reported as the $T_g$ of the sample.

Gel Permeation Chromatography

GPC was utilized to determine the molecular weights and polydispersities of polymer samples. A Waters 2414 refractive index detector was used with a Waters 1515 isocratic HPLC pump. HPLC grade tetrahydrofuran was used as solvent. Polydispersed fractions were collected from GPC. The molecular weight of a sample was generally recorded as the number averaged molecular weight ($M_n$) or the weight average ($M_w$). When there were overlapping peaks which prohibited the determination of a unique polydispersity of each peak, a peak molecular weight ($M_p$) was incorporated herein.

Thermal Gravimetric Analysis

The degradation temperatures of samples were determined by thermal gravimetric analysis (TGA). About 20 mg of a sample was placed in a tared pan. The pan was then loaded into a furnace. Air flow was allowed to equilibrate. The sample was then heated from room temperature to 580° C. at 10° C./min. Temperatures for 1% and 5% weight loss of samples were reported respectively.

Ultraviolet-Visible Spectroscopy

Ultraviolet-visible (UV-Vis) spectroscopy was utilized to monitor monomer consumption during the reaction. The reaction was allowed to continue until all monomers had been consumed. A Shimadzu UV-2450 UV-Vis spectrophotometer was utilized. Background measurement was averaged from five measurements with an empty quartz cuvette. Aliquots were periodically taken from the reaction vessel, which was then placed in a square quartz cuvette with having 1 cm beam distance. The absorbance of the sample is directly proportional to the concentration of the monomer in the aliquot. The progress of the reaction was monitored by UV-Vis spectroscopy with the characteristic absorption peak of β-farnesene at 230 nm.

Tensile Strength

Tensile strength of samples were determined using an INSTRON™ tensile tester. A sample was cast into films and cut to the appropriate dimensions. The thickness and width of the sample after processing were measured. A gauge length of 2.54 cm was used with a crosshead speed 25 mm/min.

Lap Test

Lap test was used to characterize adhesive properties of samples. Two substrates were held together by an adhesive. Substrates were then pulled apart, shearing the adhesive. The construct fails in one of three ways. When the substrate failed, it was called a substrate failure. When the adhesive was torn apart, it was called a cohesive failure. When the interface between the substrate and adhesive failed, it was called an adhesive failure. An INSTRON™ tensile tester was used to characterize the forces involved in the failure. The adhesive was applied to a 2 cm² section of the substrate with a crosshead speed of 25 mm/min. Aluminum was used as the substrate. Aluminum was cleaned with acetone before bonding.

$^1$H and $^{13}$C Nuclear Magnetic Resonance $^1$H and $^{13}$C Nuclear Magnetic Resonance was utilized to characterize chemical microstructures of the samples. A Varian Mercury 300 MHz NMR was utilized for these measurements. Deuterated chloroform was used as the solvent. Several measurements were repeated for collecting spectra.

Example 1

1,4-polyfarnesene Having a $M_n$ of 105,000

To a dried three-neck reactor under argon atmosphere, a pre-dried solution comprising 92.29 g of β-farnesene in 13.7% in cyclohexane was added. n-Butyl lithium (1.85×10⁻³ mol, obtained from Acros, Morris Plains, N.J.) was added into the reactor as an initiator, and the reactor was heated at about 50° C. for about 19 hours, until all β-farnesene was consumed, monitored by UV-Vis spectroscopy. Example 1 was precipitated from the reaction mixture with a 1% solution of ethanol and t-butyl catachol (obtained from Sigma-Aldrich, St. Louis, Mo.). After drying in a vacuum oven at about 60° C. for about 2 hours, Example 1 was kept under vacuum for about 16 hours. Afterwards, Example 1, collected at 89.83 g (yield 97%), was stored in a refrigerator to prevent any crosslinking before characterization.

The progress of synthesizing Example 1 was monitored by the disappearance of β-farnesene, as measured by UV-Vis in the reaction mixture. FIG. 1 shows the Ultraviolet-Visible (UV-Vis) spectra of Example 1 and β-farnesene. The characteristic absorption peak of β-farnesene at 230 nm is present in the UV-Vis spectrum for β-farnesene in FIG. 1, but absent in the UV-Vis spectrum for Example 1 in FIG. 1.

Figure 2:
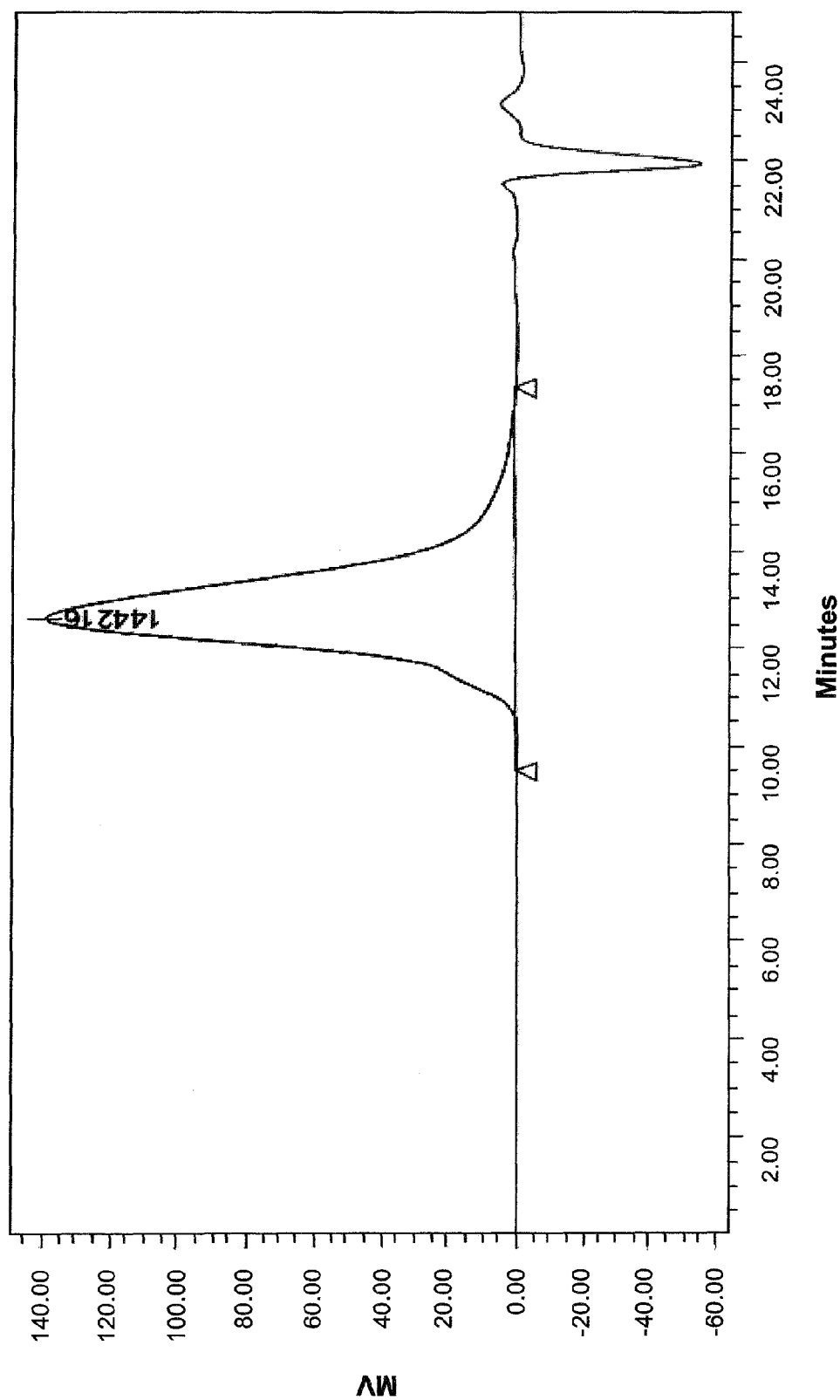
FIG. 2 depicts a Gel Permeation Chromatography (GPC) curve of Example 1.

The molecular weight and polydispersity of Example 1 were determined by GPC. FIG. 2 shows the GPC curve of Example 1. The number average molecular weight ($M_n$), weight average molecular weight ($M_w$), peak molecular weight ($M_p$), z average molecular weight ($M_z$), z+1 average molecular weight ($M_{z+1}$), $M_w/M_n$ (i.e., polydispersity), $M_z/M_w$, and $M_{z+1}/M_w$ of Example 1 are shown in Table 1. The definitions of $M_n$, $M_w$, $M_z$, $M_{z+1}$, $M_p$, and polydispersity can be found in Technical Bulletin TBO21, "*Molecular Weight Distribution and Definitions of MW Averages*," published by Polymer Laboratories, which is incorporated herein by reference. Some methods of measuring the molecular weights of polymers can be found in the book by Malcolm P. Stevens, "Polymer Chemistry: An Introduction," Oxford University Press, Chapter 2 (1999), pp. 35-58, which is incorporated herein by reference. The number of farnesene units in Example 1 was calculated to be about 490.

TABLE 1

| Properties | Example 1 |
| --- | --- |
| $M_n$ | 104,838 g/mol |
| $M_w$ | 147,463 g/mol |
| $M_p$ | 144,216 g/mol |
| $M_z$ | 207,084 g/mol |
| $M_{z+1}$ | 314,887 g/mol |
| Polydispersity | 1.406588 |
| $M_z/M_w$ | 1.404311 |
| $M_{z+1}/M_w$ | 2.135360 |

Figure 3:
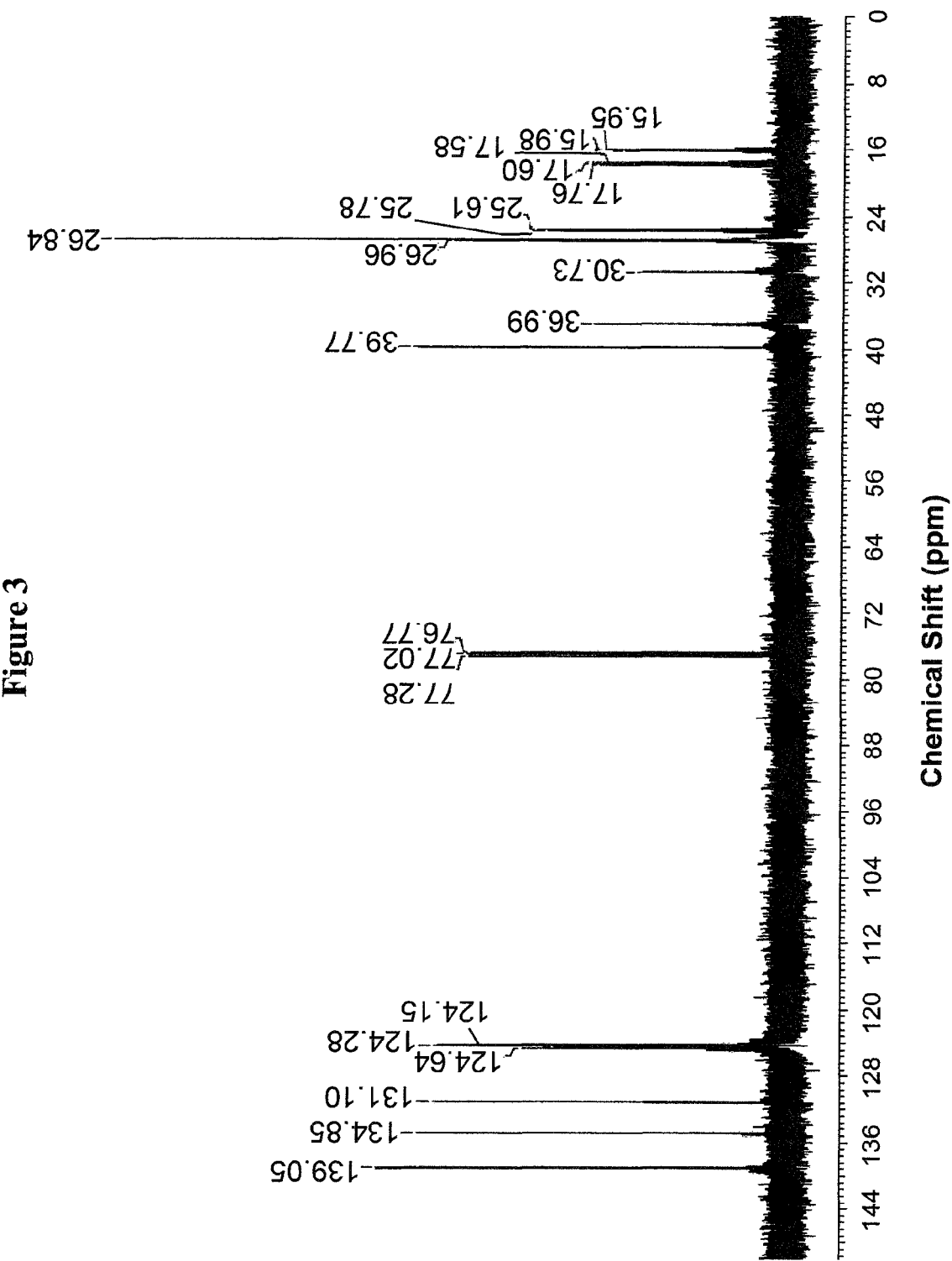
FIG. 3 depicts a $C^{13}$ Nuclear Magnetic Resonance (NMR) spectrum of Example 1.

FIG. 3 shows the $^{13}$C NMR spectrum of Example 1. Peaks at 77.28 ppm, 77.02 ppm, and 76.77 ppm were peaks associated with the deuterated chloroform used for collecting the $^{13}$C NMR spectrum. The characteristic peak identifying Example 1 was at 139.05 ppm.

Figure 4:
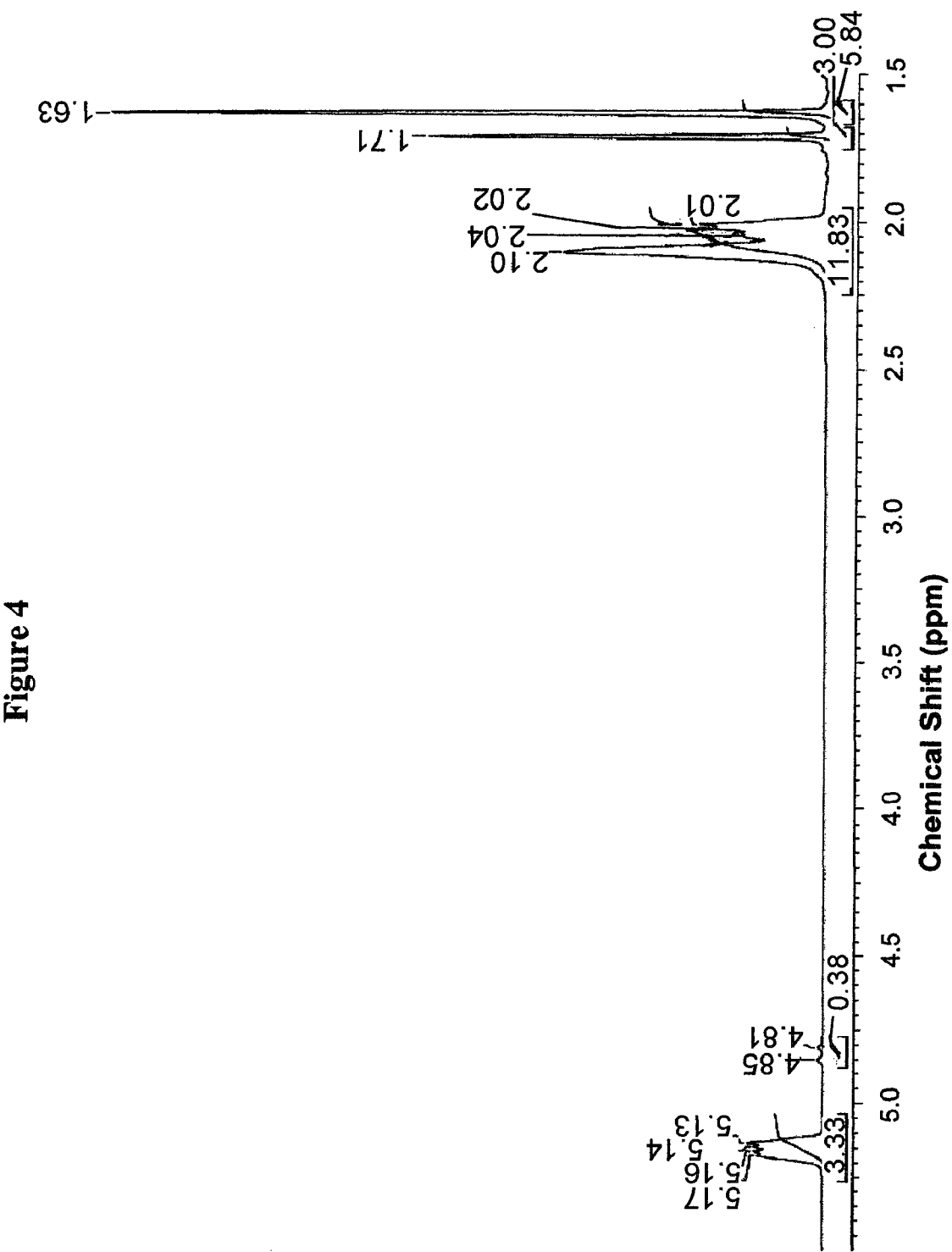
FIG. 4 depicts a $H^1$ NMR spectrum of Example 1.

FIG. 4 shows the $^1$H NMR spectrum of Example 1. Peaks at 4.85 ppm and 4.81 ppm were peaks associated with 3,4-microstructure. Peaks at 5.17 ppm, 5.16 ppm, 5.14 ppm, and 5.13 ppm were peaks associated with 1,4- and 3,4-microstructures. Based on the areas under the peaks of FIG. 4, about 12% of franesene units in Example 1 was found to have 3,4-microstructure.

Figure 5:
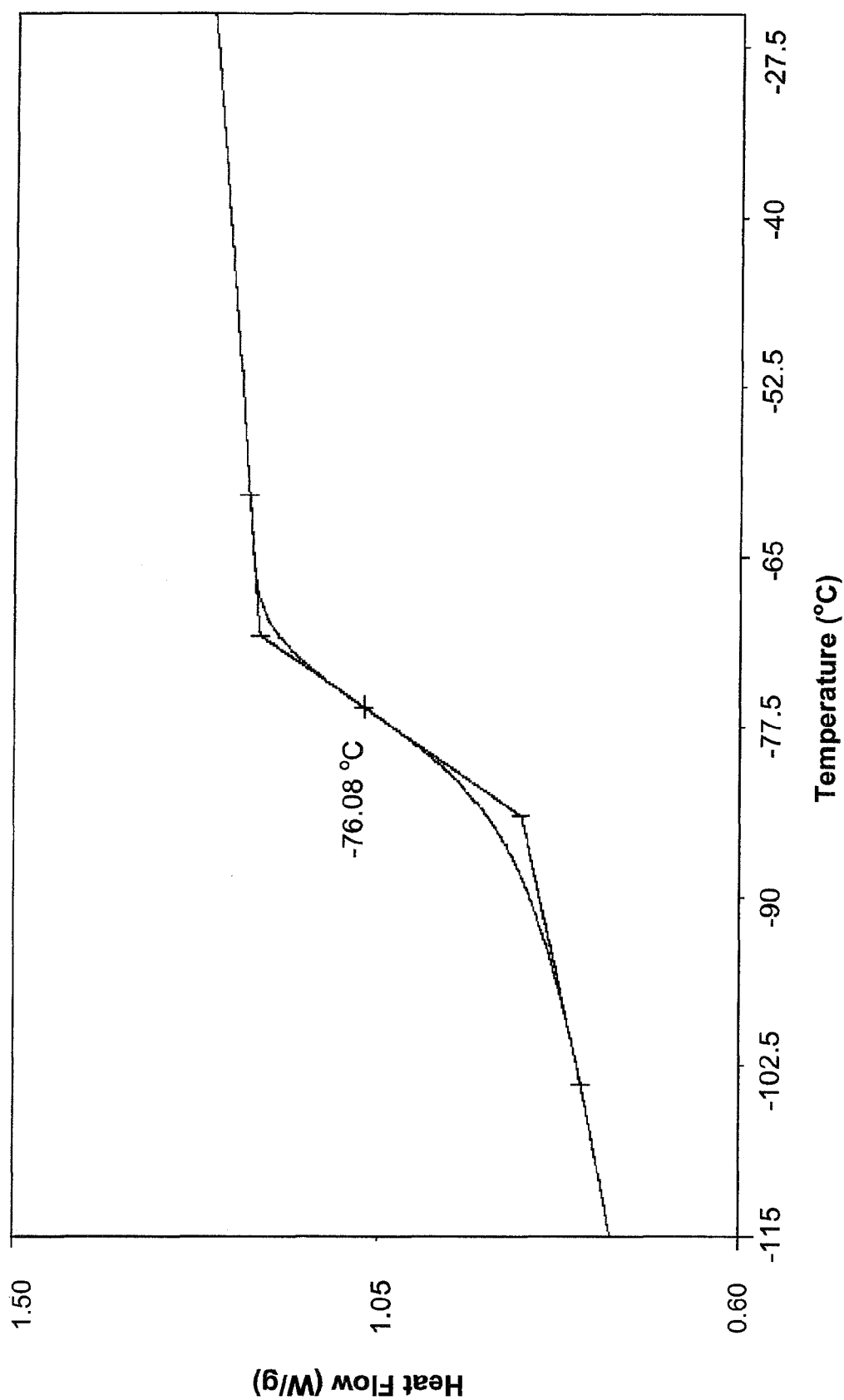
FIG. 5 depicts a Differential Scanning Calorimetry (DSC) curve of Example 1.

The DSC curve of Example 1 is shown in FIG. 5. The thermal characteristics of Example 1 were measured by DSC. The $T_g$ of Example 1 was found to be about –76° C. No other thermal event was detected between –175° C. and 75° C.

Figure 6:
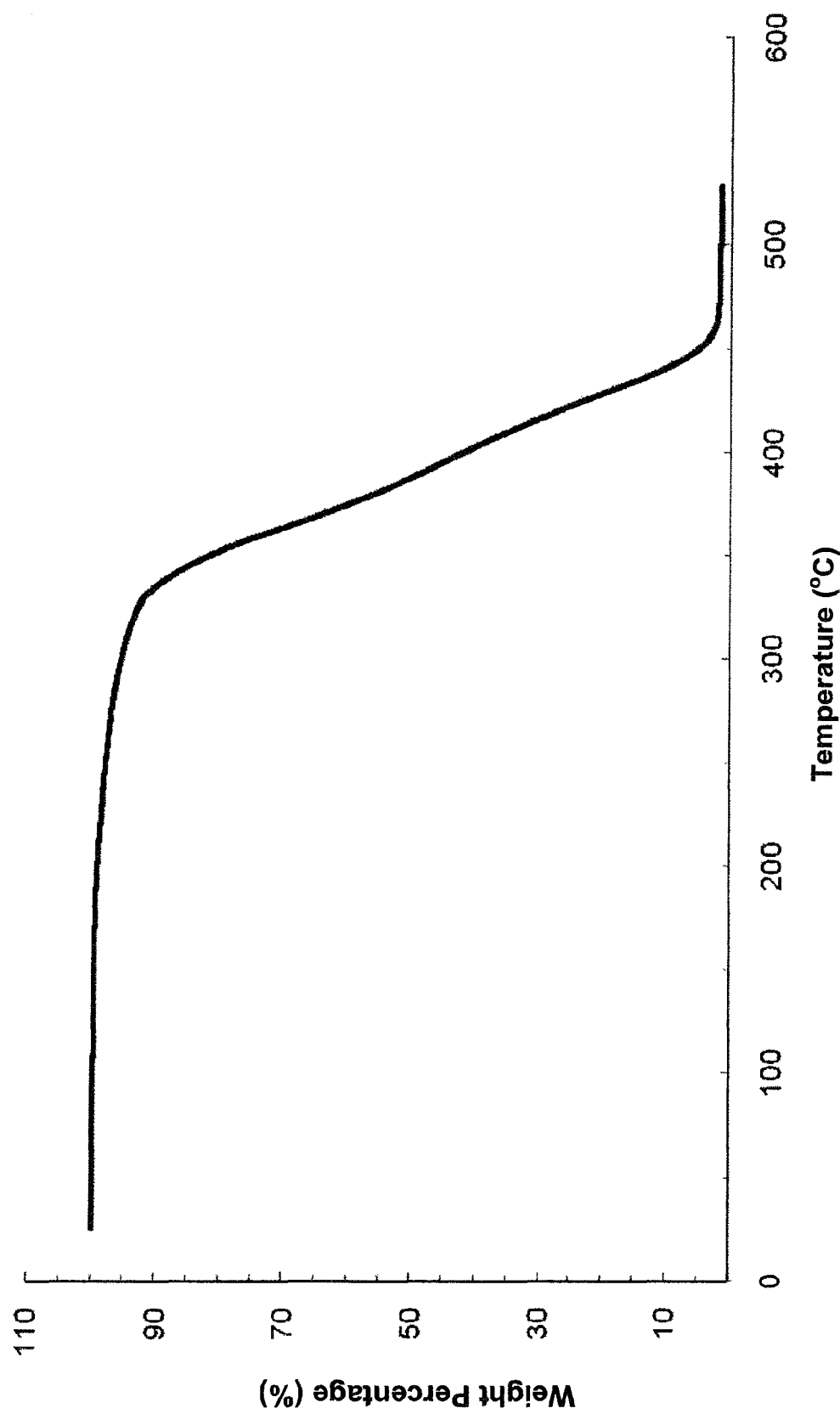
FIG. 6 depicts a Thermal Gravimetric Analysis (TGA) curve of Example 1 measured in air.

The TGA curve of Example 1 measured in air is shown in FIG. 6. The decomposition temperature of Example 1 in air was determined by TGA. The 1% weight loss of Example 1 in air was recorded at 210° C. and the 5% weight loss of Example 1 in air was recorded at 307° C.

Figure 7:
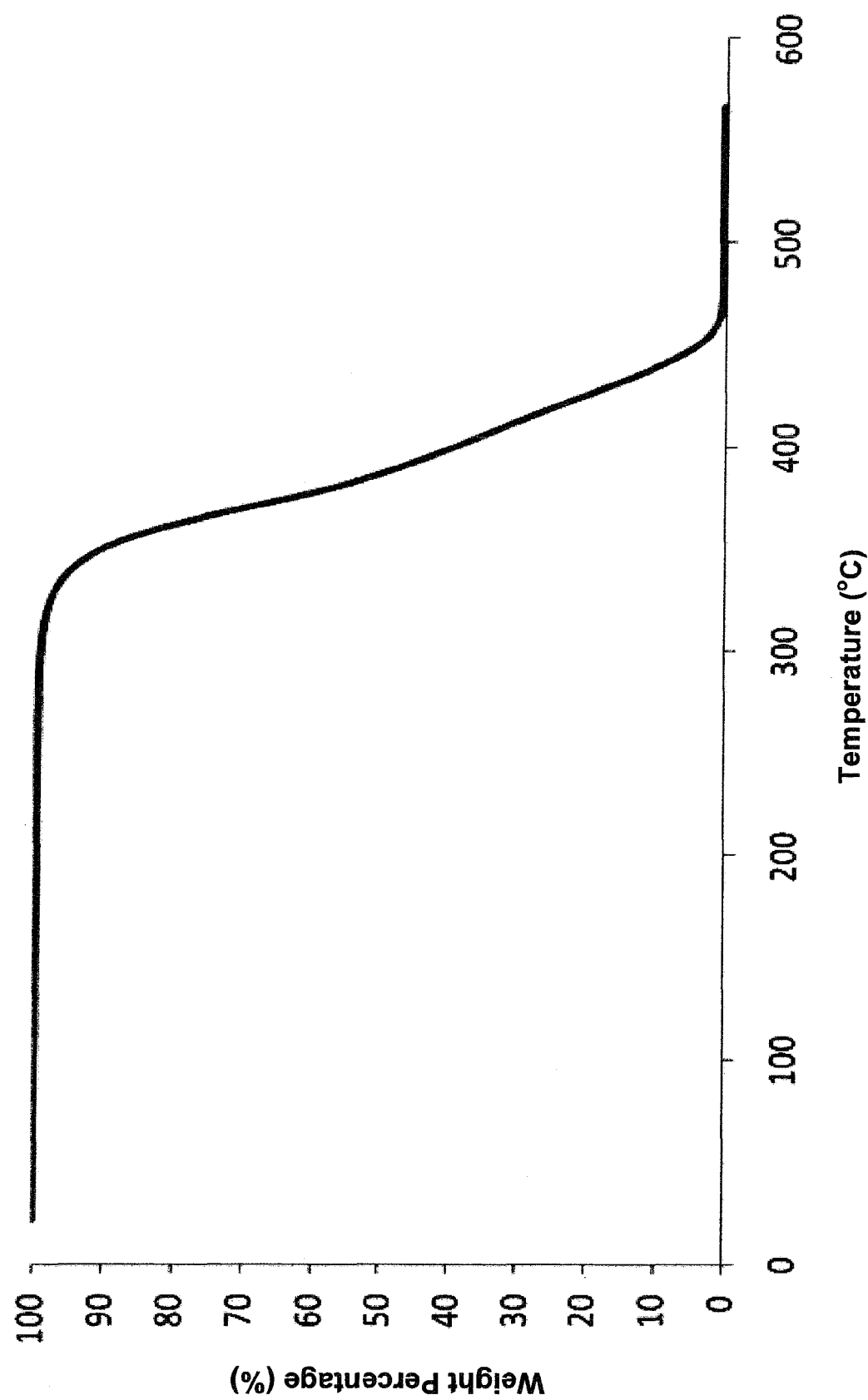
FIG. 7 depicts a Thermal Gravimetric Analysis (TGA) curve of Example 1 measured in nitrogen.

The TGA curve of Example 1 measured under nitrogen atmosphere is shown in FIG. 7. The 1% weight loss of Example 1 under nitrogen atmosphere was recorded at 307° C. and the 5% weight loss of Example 1 under nitrogen atmosphere was recorded at 339° C.

Figure 8:
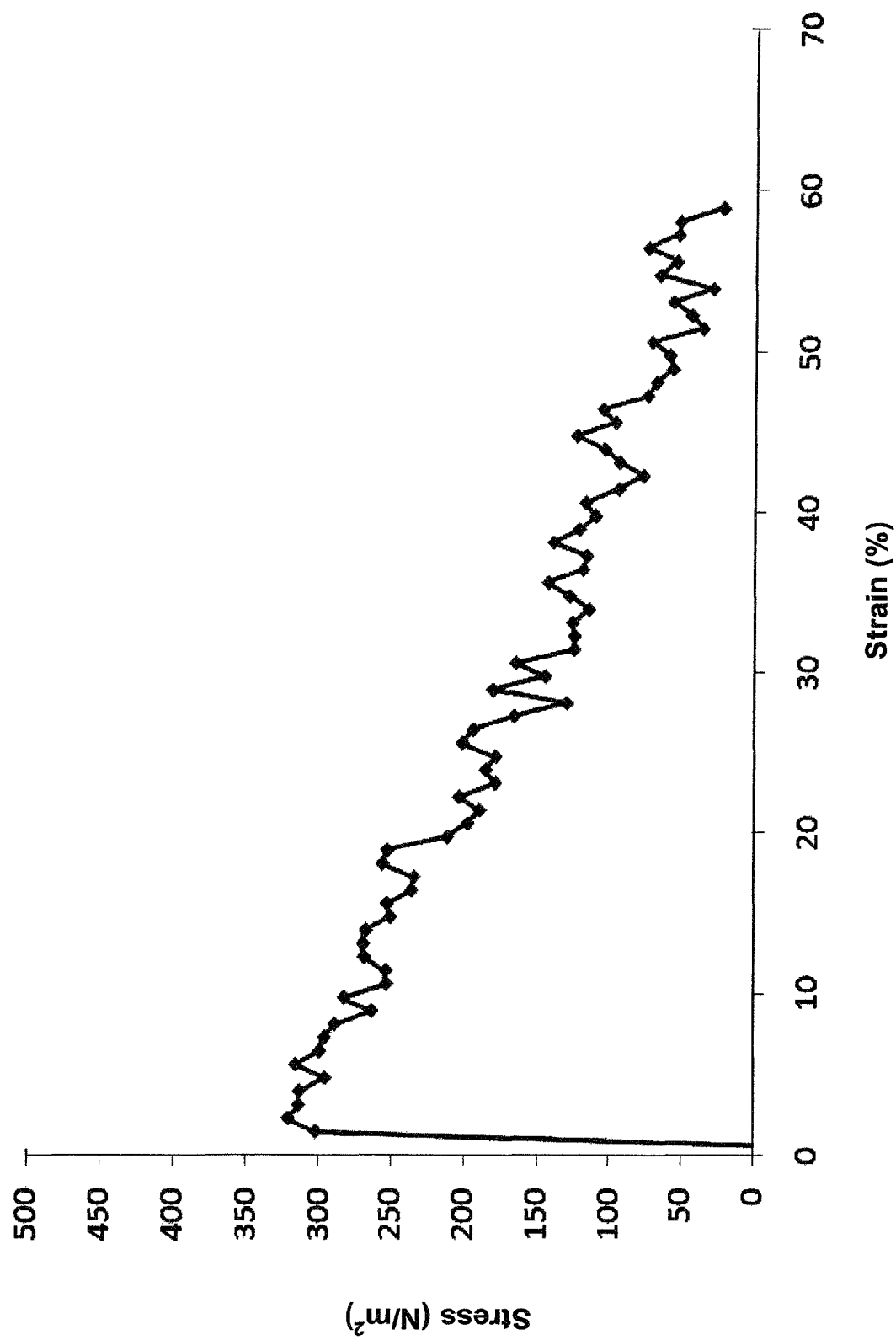
FIG. 8 depicts lap test results of Example 1.

Example 1 was observed to be tacky. The lap test results of Example 1 are shown in FIG. 8. The adhesive capability of Example 1 was measured by the lap test. The adhesive energy of Example 1 was found to be about 11,400 J/m$^2$ with a peak stress of about 314 N/m$^2$.

Example 2

1,4-polyfarnesene Having a $M_n$ of 245,000

Example 2 is a 1,4-polyfarnesene having a $M_n$ of about 245,000 g/mol. Example 2 was synthesized similarly according to the procedure for Example 1, except sec-butyl lithium was used as the initiator. The net weight of Example 2 was found to be 83.59 g (yield 71.4%). The yield is lower because aliquots were removed to monitor the progression of the reaction.

Figure 9:
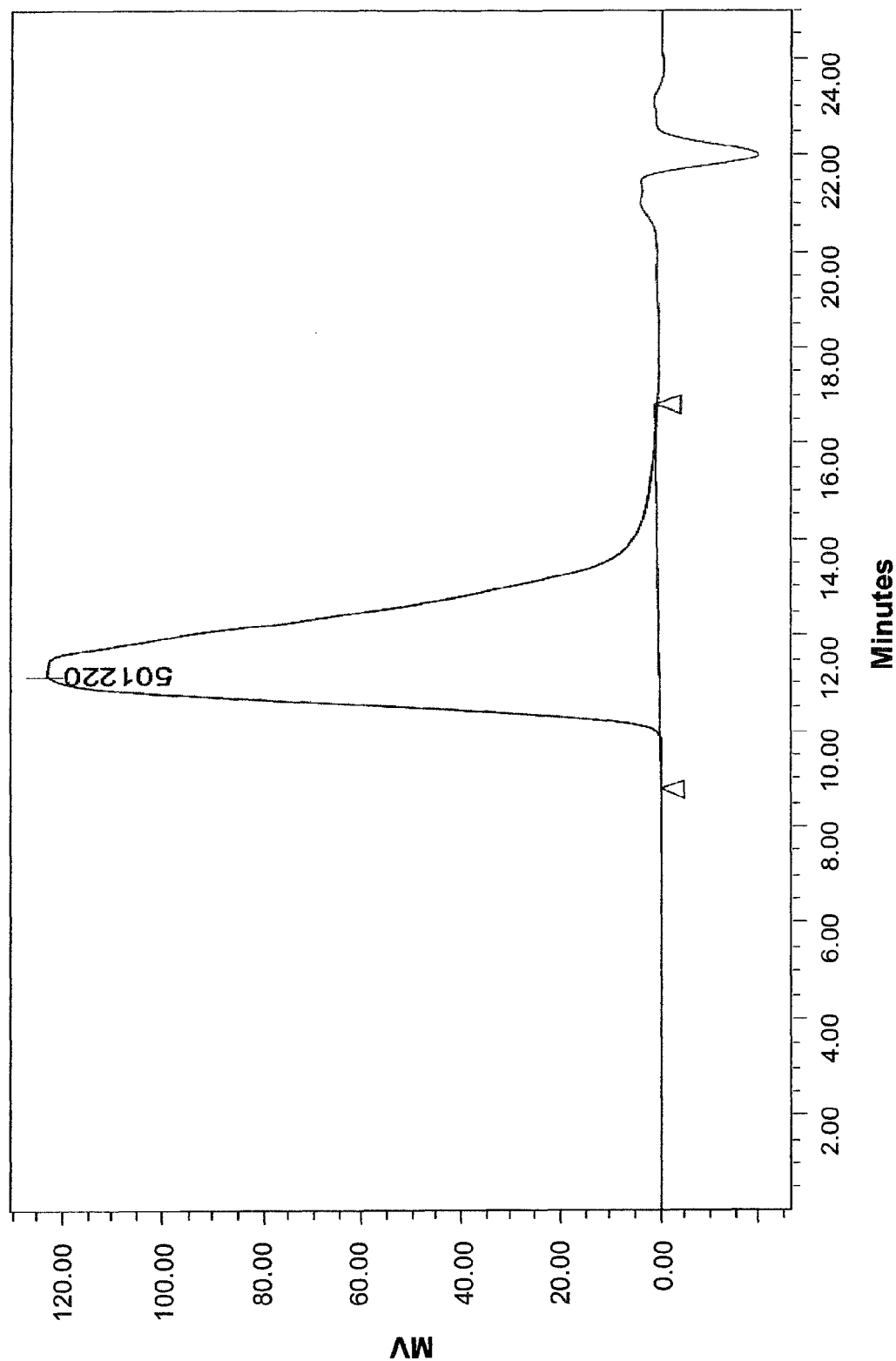
FIG. 9 depicts a GPC curve of Example 2.

The molecular weight and polydispersity of Example 2 were determined by GPC. FIG. 9 shows the GPC curve of Example 2. The $M_n$, $M_w$, $M_p$, $M_z$, $M_{z+1}$, polydispersity, $M_z/M_w$, and $M_{z+1}/M_w$ of Example 2 are shown in Table 2. The number of farnesene units in Example 2 was calculated to be about 2000. Because of the increased molecular weight of Example 2, it had a higher level of entanglement and longer relaxation time than Example 1.

TABLE 2

| Properties | Example 2 |
| --- | --- |
| $M_n$ | 244,747 g/mol |
| $M_w$ | 457,340 g/mol |
| $M_p$ | 501,220 g/mol |
| $M_z$ | 768,187 g/mol |
| $M_{z+1}$ | 1,132,362 g/mol |
| Polydispersity | 1.868622 |
| $M_z/M_w$ | 1.679684 |
| $M_{z+1}/M_w$ | 2.475971 |

Figure 10:
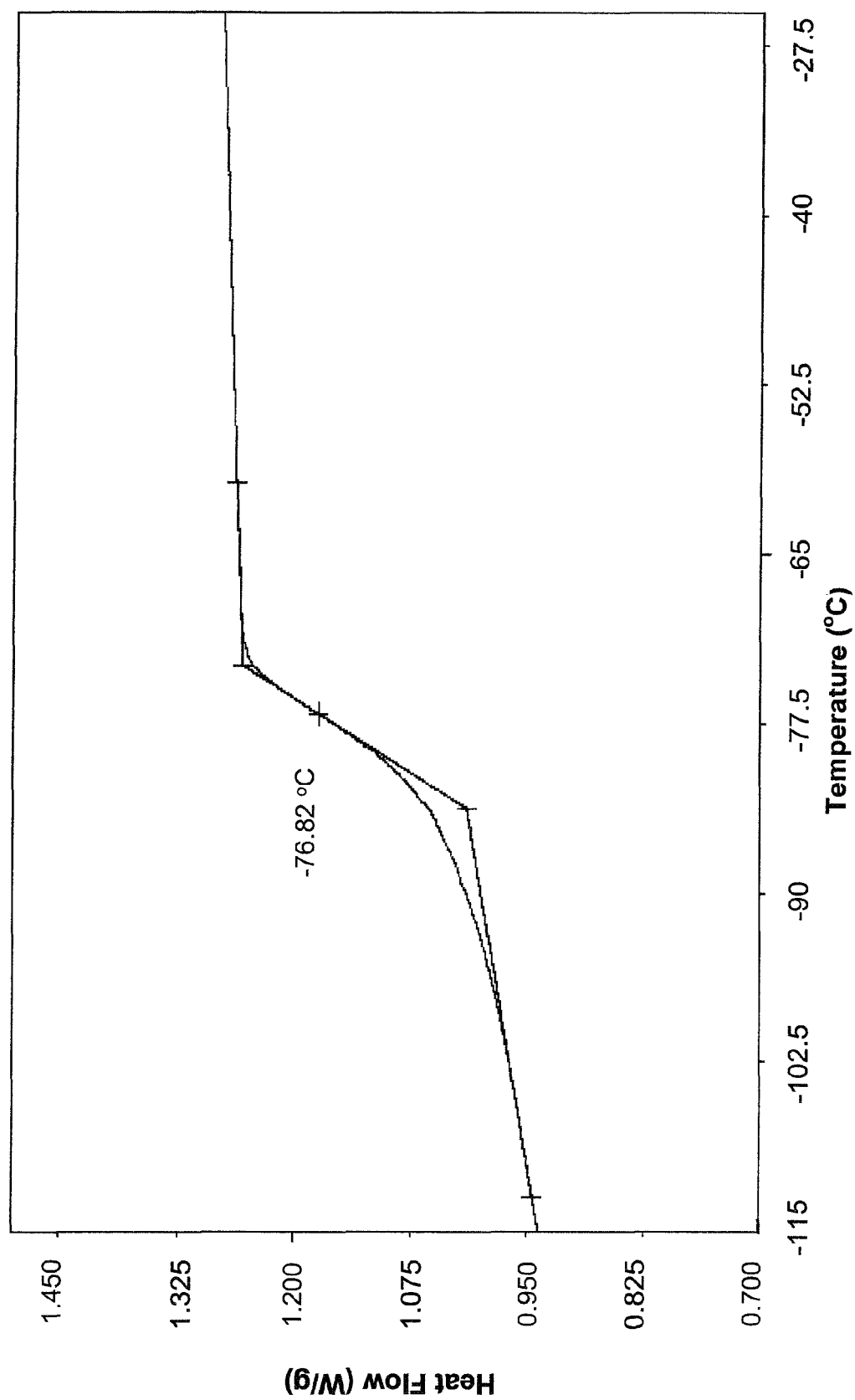
FIG. 10 depicts a DSC curve of Example 2.

The DSC curve of Example 2 is shown in FIG. 10. The thermal characteristics of Example 2 were measured by DSC. The $T_g$ of Example 2 was found to be about –76° C.

Figure 11:
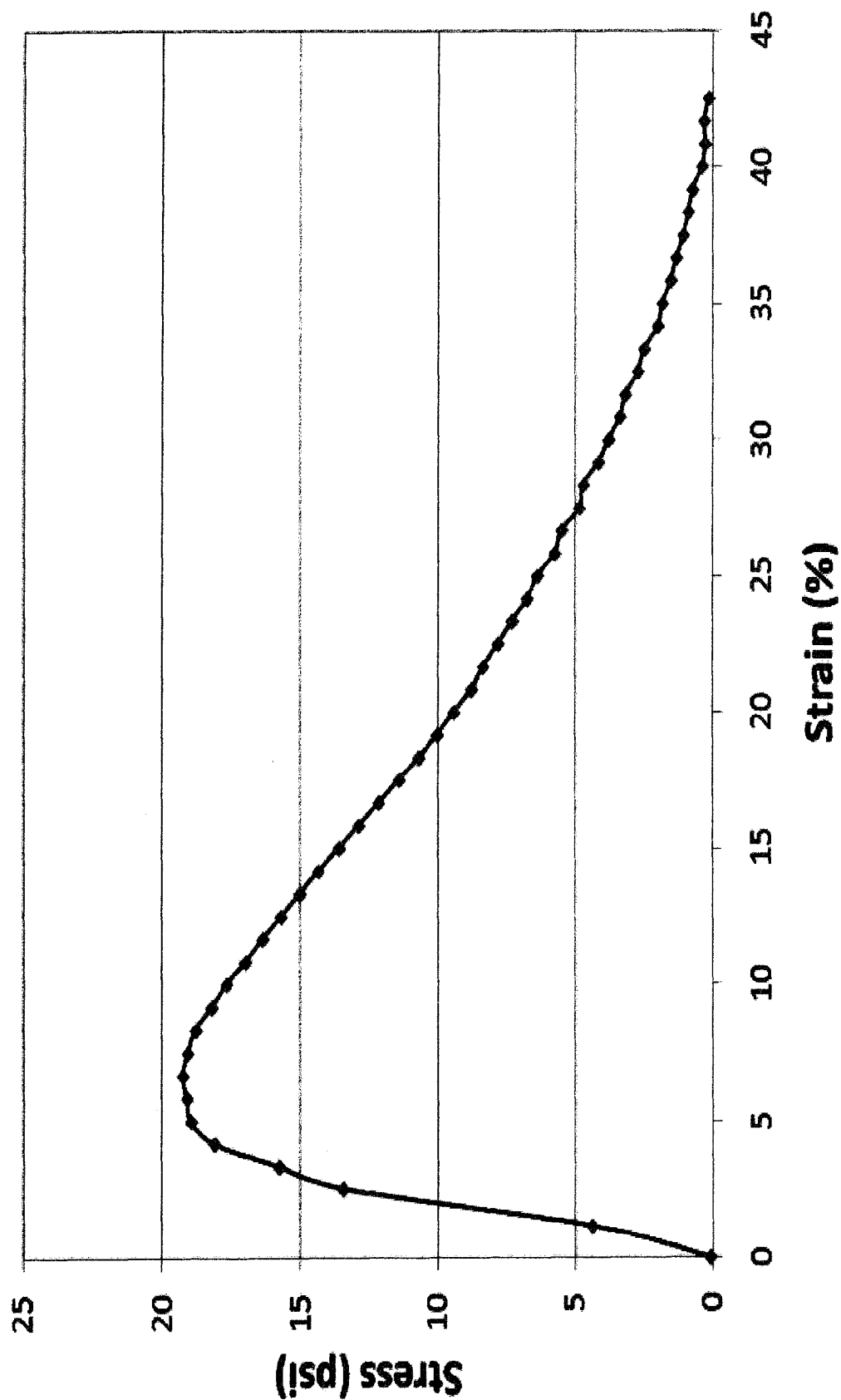
FIG. 11 depicts tensile test results of Example 2.

The tensile test results of Example 2 are shown in FIG. 11. The tensile strength of Example 2 was measured by a tensile test. Example 2 was observed to be soft, tacky and yielded quickly. As shown in FIG. 11, the peak elongation of Example 2 was found to be about 6% with a maximum tensile strength of about 19 psi. The modulus of Example 2 was calculated to be about 4.6 kpsi. Example 2 continued to yield to about 40% elongation.

Example 3

3,4-polyfarnesene

Example 3 was synthesized similarly according to the procedure for Example 1 except that n-butyl lithium (1.71×10$^{-3}$ mol) was added in the presence of N,N,N',N'-tetramethylethylenediamine (1.71×10$^{-3}$ mol, TMEDA, obtained from Sigma-Aldrich, St. Louis, Mo.). The net weight of Example 3 was found to be 82.72 g (yield 97%).

Figure 12:
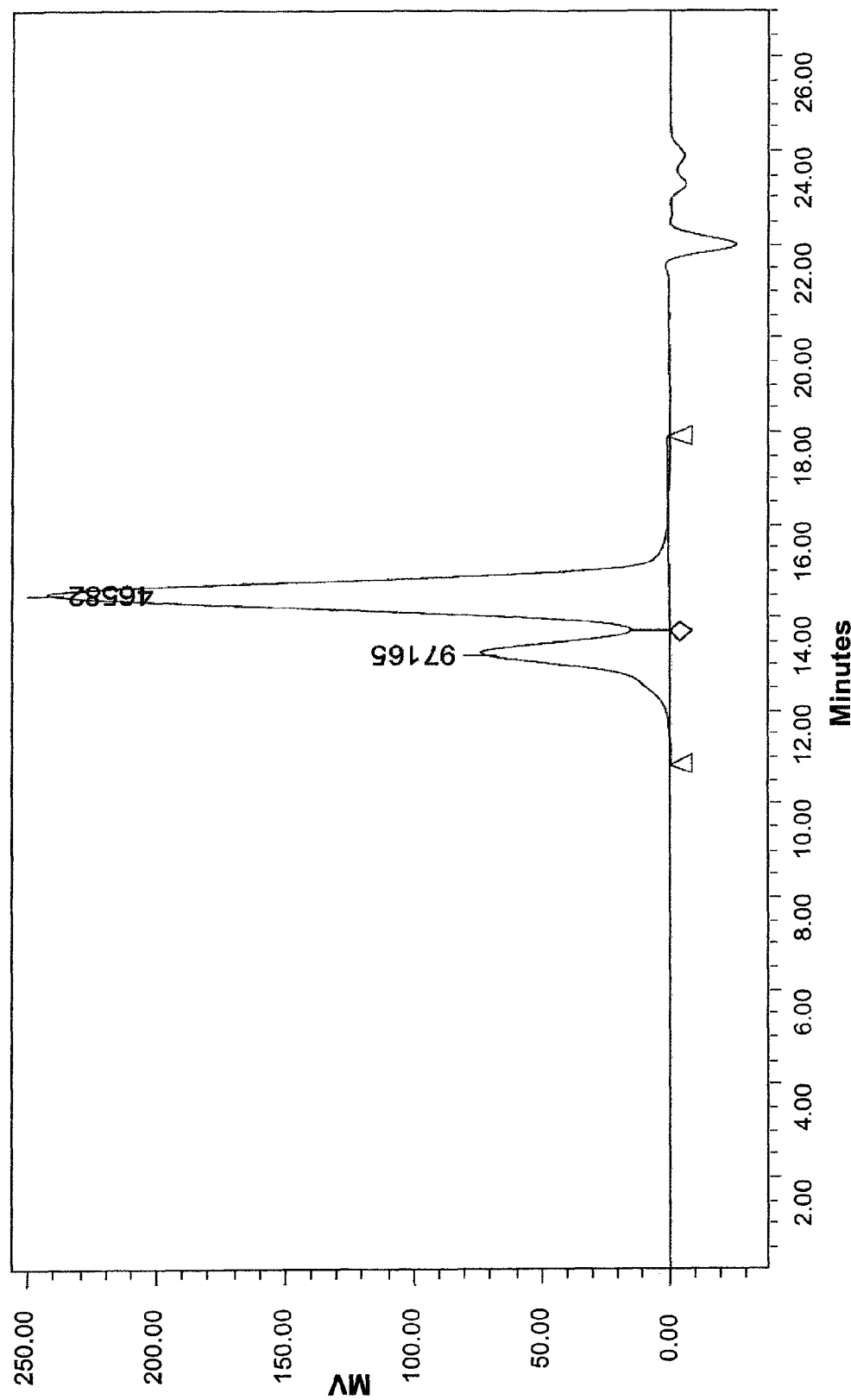
FIG. 12 depicts a GPC curve of Example 3.

The molecular weight and polydispersity of Example 3 were determined by GPC. FIG. 12 shows the GPC curve of Example 3. The two peaks in FIG. 12 indicated that two distinct weight fractions formed in Example 3. The $M_n$, $M_w$, $M_z$, $M_{z+1}$, polydispersity, $M_z/M_w$, and $M_{z+1}/M_w$ of Example 3 are shown in Table 3. The $M_p$ of the first peak in FIG. 12 was about 97,165 g/mol. The $M_p$ of the second peak in FIG. 12 was about 46,582 g/mol. The number of farnesene units in Example 3 was calculated to be about 240.

TABLE 3

| Properties | Example 3 |
| --- | --- |
| $M_n$ | 45,818 g/mol |
| $M_w$ | 47,644 g/mol |
| $M_z$ | 49,134 g/mol |
| $M_{z+1}$ | 50,527 g/mol |
| Polydispersity | 1.039844 |
| $M_z/M_w$ | 1.031269 |
| $M_{z+1}/M_w$ | 1.060509 |

Figure 13:
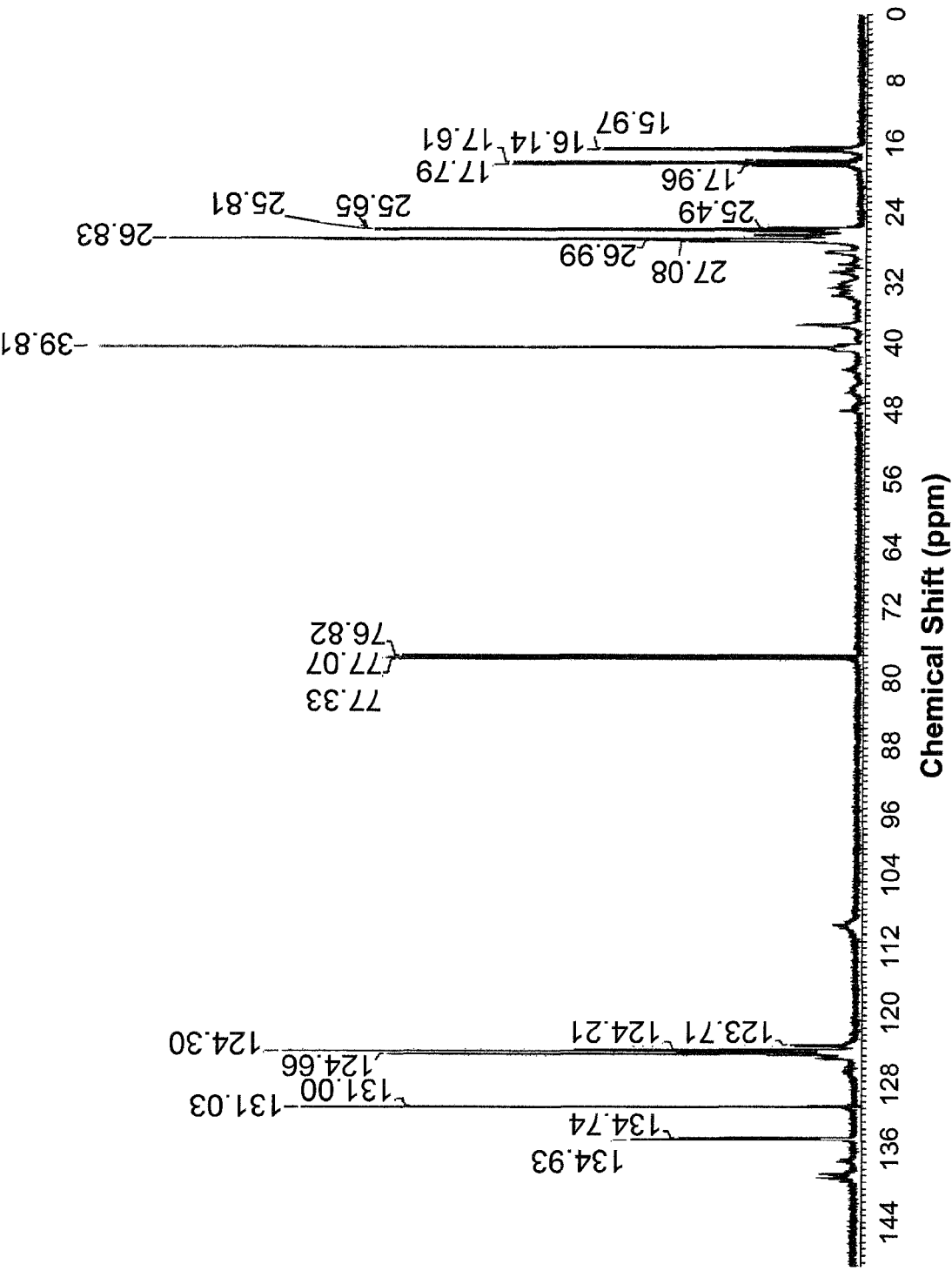
FIG. 13 depicts a $C^{13}$ NMR spectrum of Example 3.

FIG. 13 shows the $^{13}$C NMR spectrum of Example 3. Peaks at 77.33 ppm, 77.07 ppm, and 76.82 ppm were peaks of deuterated chloroform used for collecting the $^{13}$C NMR spectrum. The characteristic peak identifying Example 1 at 139.05 ppm was absent in FIG. 13, indicating a regular microstructure of Example 3.

Figure 14:
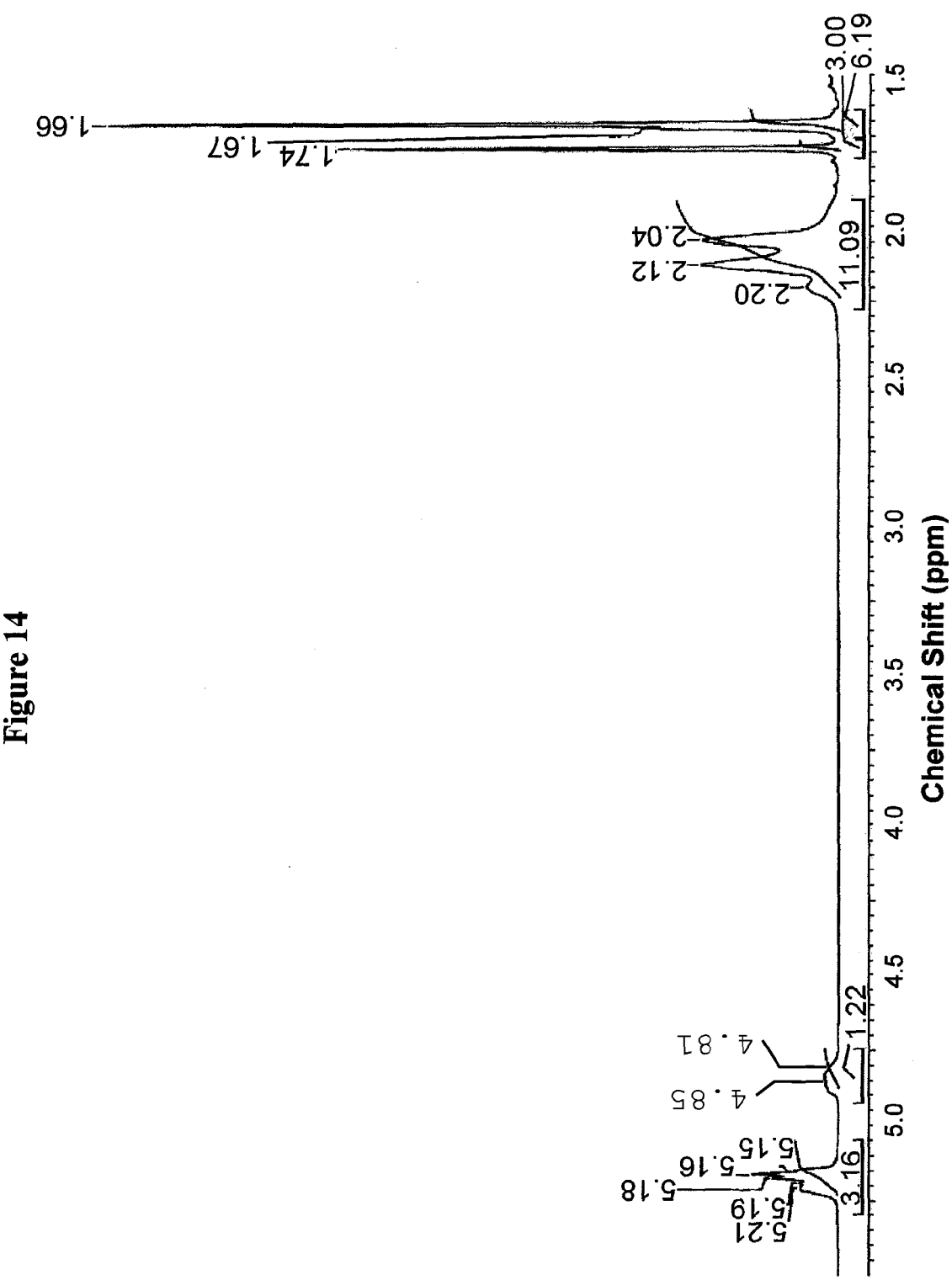
FIG. 14 depicts a $H^1$ NMR spectrum of Example 3.

FIG. 14 shows the $^1$H NMR spectrum of Example 3. Peaks at 4.85 ppm and 4.81 ppm were peaks associated with 3,4-microstructure. Peaks at 5.21 ppm, 5.19 ppm, 5.18 ppm, 5.16 ppm, and 5.15 ppm were peaks associated with 1,4- and 3,4-microstructures. Based on the areas under the peaks of FIG. 14, about 10% of farnesene units in Example 3 was found to have 1,4-microstructure.

Figure 15:
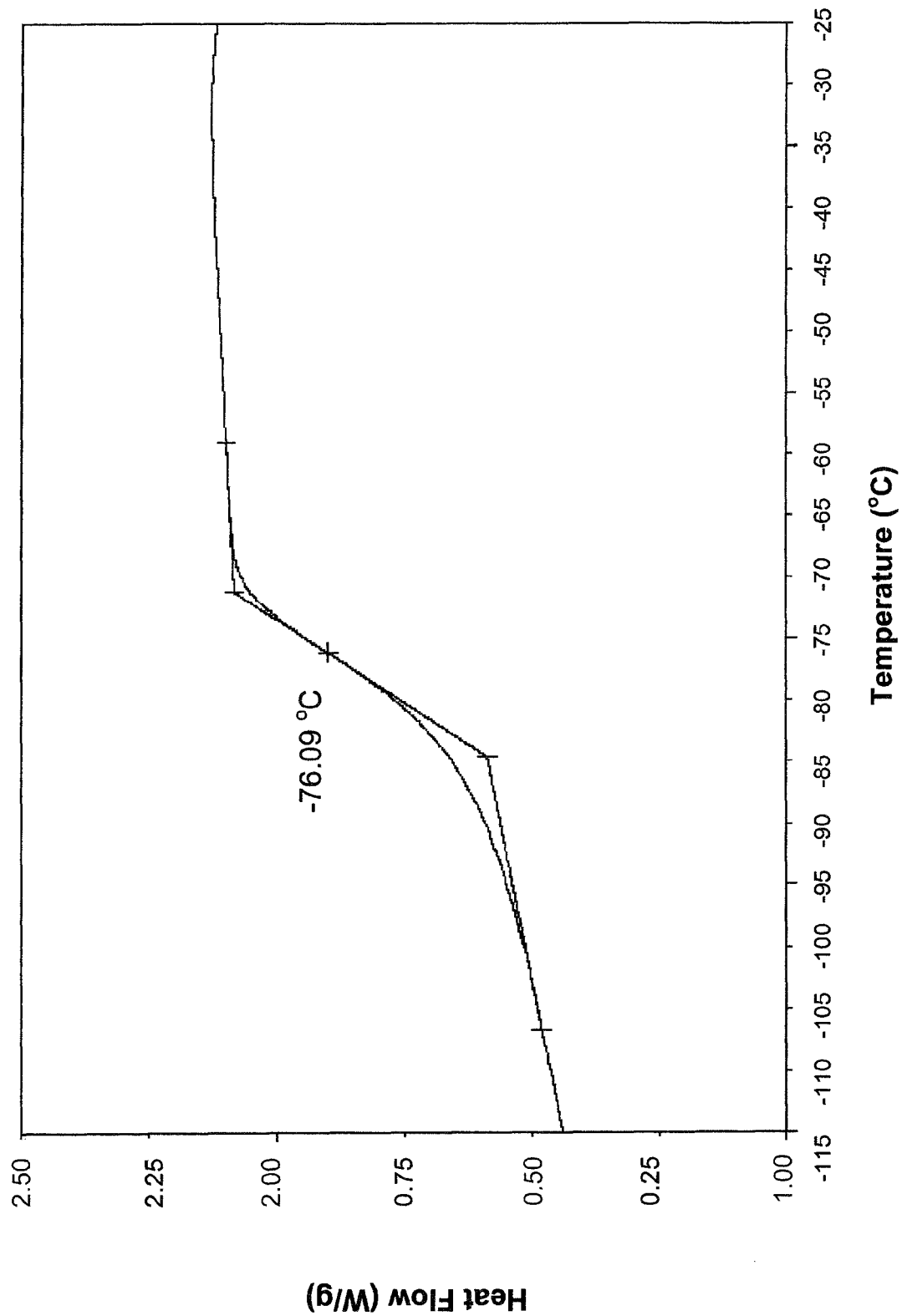
FIG. 15 depicts a DSC curve of Example 3.

The DSC curve of Example 3 is shown in FIG. 15. The thermal characteristics of Example 3 were measured by DSC. The $T_g$ of Example 3 was found to be about −76° C. No other thermal event was detected between −175° C. and 75° C.

Figure 16:
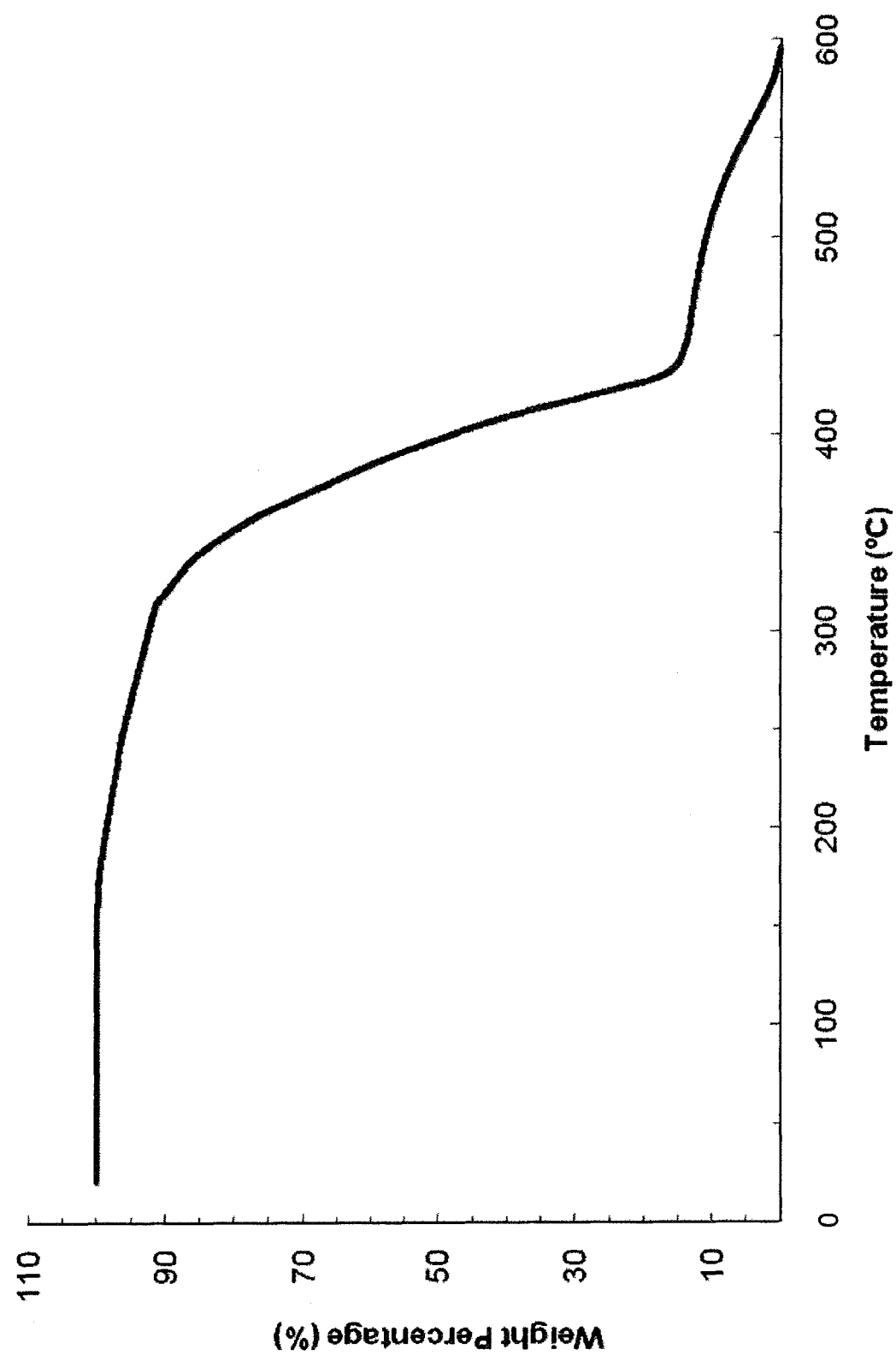
FIG. 16 depicts a TGA curve of Example 3.

The TGA curve of Example 1 measured in air is shown in FIG. 16. The decomposition temperature of Example 3 in air was determined by TGA. The 1% weight loss of Example 1 in air was recorded at 191° C and the 5% weight loss of Example 1 in air was recorded at 265° C.

Figure 17:
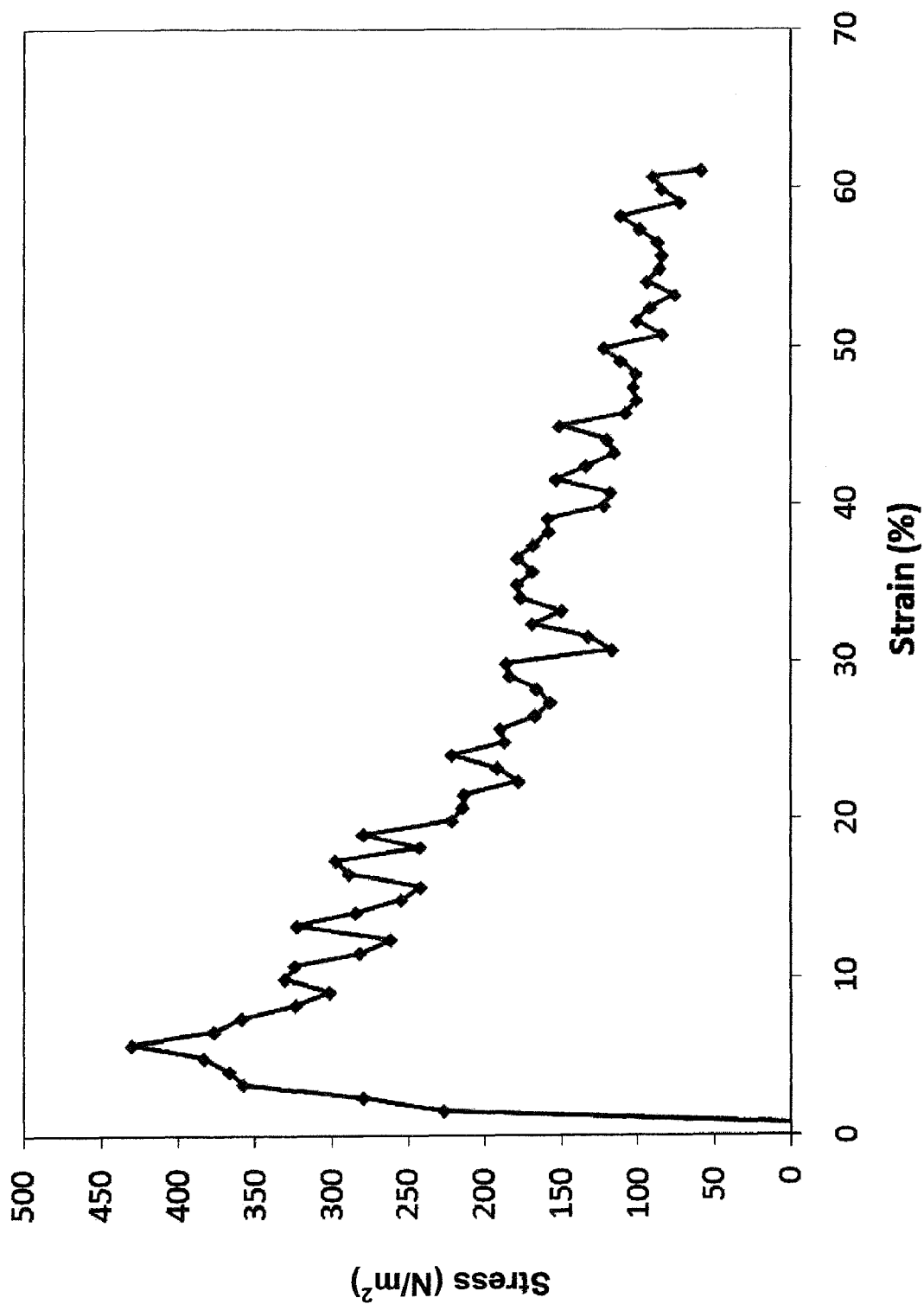
FIG. 17 depicts lap test results of Example 3.

Example 3 was observed to be a highly tacky viscous fluid. The lap test results of Example 3 are shown in FIG. 17. The adhesive capability of Example 3 was measured by the lap test. The adhesive energy of Example 3 was found to be about 12,900 $J/m^2$ with a peak stress of about 430 $N/m^2$.

Example 4 polystyrene-1,4-polyfarnesene-polystyrene

To a first dried three neck reactor under argon atmosphere, a pre-dried solution of 12% β-farnesene in cyclohexane was added. To a second dried three neck reactor under argon atmosphere, a 20.65 g solution of 10% styrene in cyclohexane was added. Afterwards, to the styrene solution, n-butyl lithium (6.88×10$^{−4}$ mol) was added into the reactor as an initiator, and the reactor was heated at about 50° C. for about 16 hours, until all styrene was consumed, as monitored by GPC. Then, 161.8 β-farnesene solution (i.e., 19.61 g of β-farnesene) was transferred to the reactor under argon atmosphere. The reaction was allowed to react until completion for about 7 hours, monitored by GPC. Three equal aliquots of dichlorosilane coupling agent (3.44×10$^{−4}$ mol, obtained from Acros, Morris Plains, N.J.) were then added into the reactor such that the mole ratio of Li to Cl of the reaction mixture was 1:2. The reaction mixture was allowed to react until completion as indicated by a color change from yellow to clear in the reactor. Example 4 was precipitated from the reaction mixture with a 1% solution of t-butyl catachol in ethanol. After drying in a vacuum oven at about 60° C. for about 2 hours, Example 4 was kept under vacuum for about 16 hours. Afterwards, Example 4, collected at 39.15 g (yield 97%), was stored in a refrigerator to prevent any crosslinking before characterization.

Figure 18:
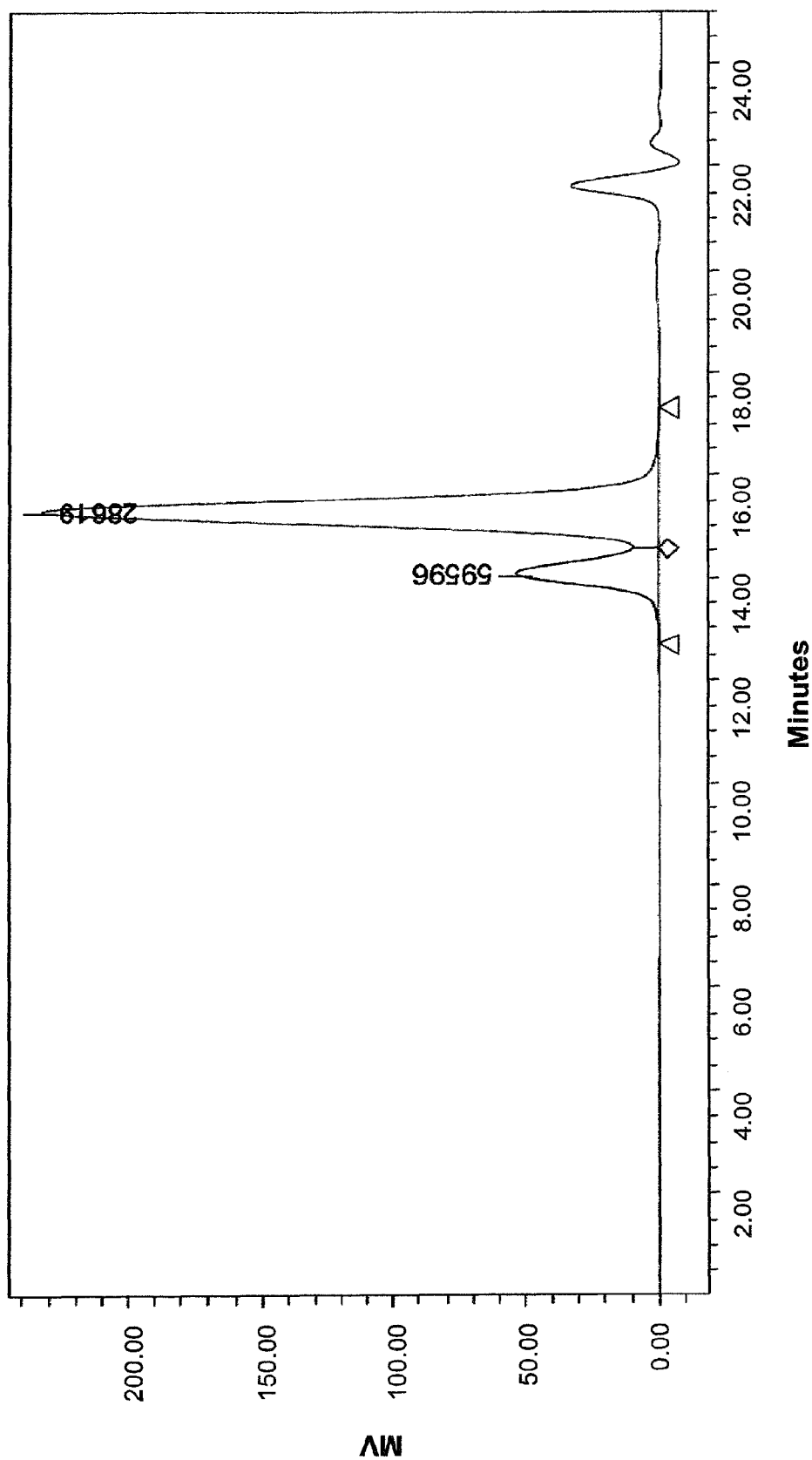
FIG. 18 depicts a GPC curve of polystyrene formed.

The GPC curve of polystyrene is shown in FIG. 18. The progress of polystyrene synthesis reaction was monitored by GPC. The two peaks in FIG. 18 indicated that there were two distinct weight fractions of polystyrene formed. The $M_n$, $M_w$, $M_z$, $M_{z+1}$, polydispersity, $M_z/M_w$, and $M_{z+1}/M_w$ of the polystyrene are shown in Table 4. The $M_p$ of the first peak in FIG. 18 was found to be about 59,596 g/mol. The $M_p$ of the second peak in FIG. 18 was found to be about 28,619 g/mol.

TABLE 4

| Properties | Polystyrene |
|---|---|
| $M_n$ | 28,396 g/mol |
| $M_w$ | 29,174 g/mol |
| $M_z$ | 29,895 g/mol |
| $M_{z+1}$ | 30,598 g/mol |
| Polydispersity | 1.027385 |
| $M_z/M_w$ | 1.024739 |
| $M_{z+1}/M_w$ | 1.048810 |

Figure 19:
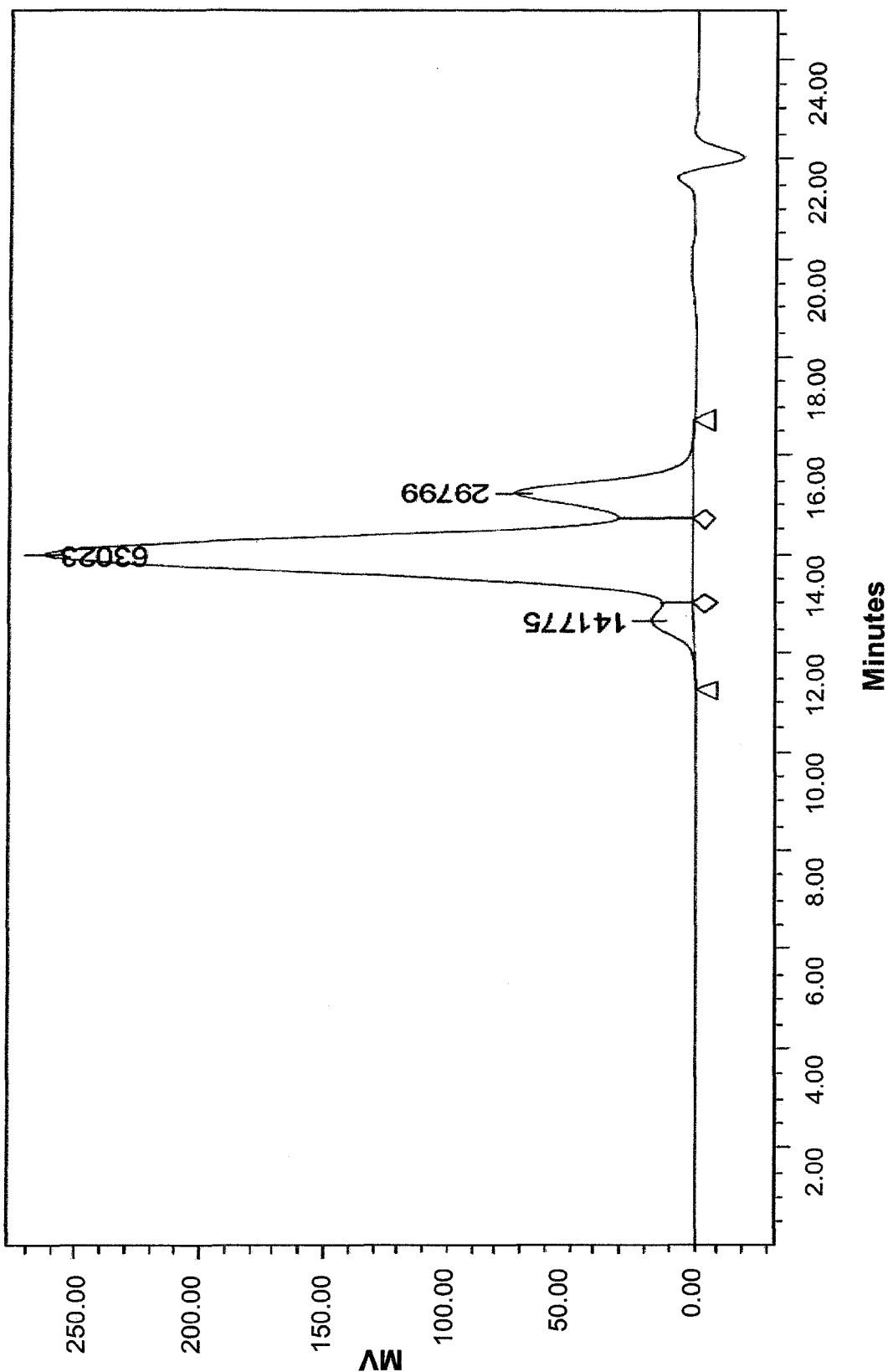
FIG. 19 depicts a GPC curve of polystyrene-1,4-polyfarnesene di-block copolymer formed.

The polystyrene formed then acted as an initiator to initiate the polymerization with β-farnesene to form a polystyrene-1,4-polyfarnesene di-block copolymer. The GPC curve of the di-block copolymer is shown in FIG. 19. The progress of the di-block copolymer synthetic reaction was monitored by GPC. The three peaks in FIG. 19 indicated that there were three distinct weight fractions in the di-block copolymer reaction solution. The $M_n$, $M_w$, $M_p$, $M_z$, $M_{z+1}$ polydispersity, $M_z/M_w$ and $M_{z+1}/M_w$ of the di-block copolymer are shown in Table 5. The $M_p$ of the first peak in FIG. 19, corresponding to polystyrene-1,4-polyfarnesene-polystyrene, was found to be about 141,775 g/mol. The $M_p$ of the second peak in FIG. 19, corresponding to the di-block copolymer, was found to be about 63,023 g/mol. The molecular weight of 1,4-polyfarnesene in the di-block copolymer was calculated to be about 35,000 g/mol. The $M_p$ of the third peak in FIG. 19, corresponding to polystyrene, was found to be about 29,799 g/mol.

TABLE 5

| Properties | Polystyrene-1,4-polyfarnesene Di-block Copolymer |
|---|---|
| $M_n$ | 29,434 g/mol |
| $M_w$ | 30,345 g/mol |
| $M_p$ | 29,799 g/mol |
| $M_z$ | 31,172 g/mol |
| $M_{z+1}$ | 31,936 g/mol |
| Polydispersity | 1.030949 |
| $M_z/M_w$ | 1.027264 |
| $M_{z+1}/M_w$ | 1.052449 |

Figure 20:
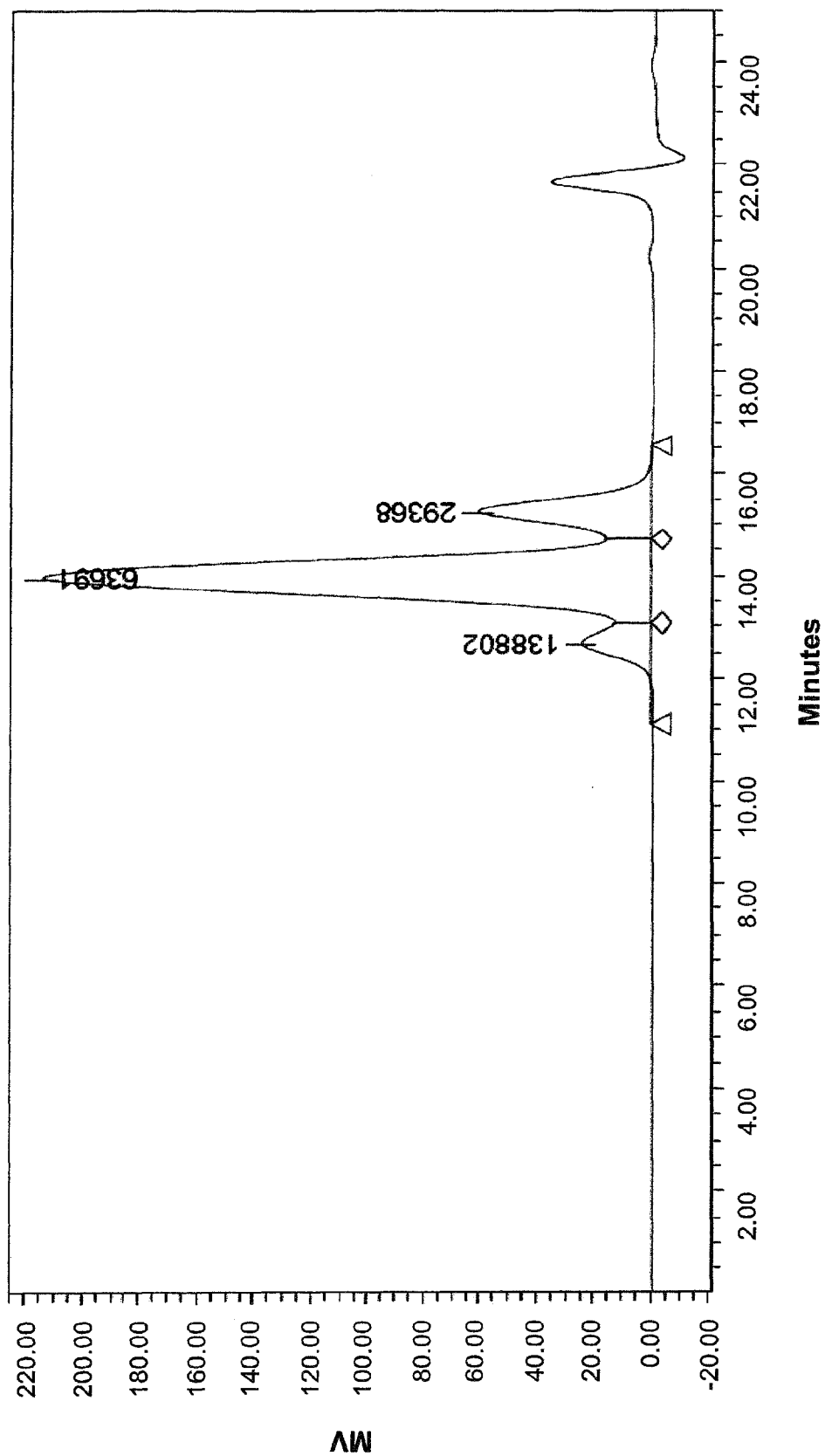
FIG. 20 depicts a GPC curve of Example 4.

The polystyrene-1,4-polyfarnesene di-block copolymer was further coupled to form Example 4. FIG. 20 shows the GPC curve of Example 4. The molecular weight and polydispersity of Example 4 were determined by GPC. The three peaks in FIG. 20 indicated that there were three distinct weight fractions for the coupling product formed. The $M_n$, $M_w$, $M_z$, $M_{z+1}$, polydispersity, $M_z/M_w$, and $M_{z+1}/M_w$ of the coupling product are shown in Table 6. The $M_p$ of the first peak in FIG. 20, corresponding to Example 4, was found to be about 138,802 g/mol. Example 4 was obtained in about 10% of the coupling product. The number of farnesene monomer units in Example 4 was calculated to be about 300. The $M_p$ of the second peak in FIG. 20, which corresponds to polystyrene-1,4-polyfarnesene di-block copolymers, was found to be about 63,691 g/mol. The $M_p$ of the third peak in FIG. 20, corresponding to polystyrene, was found to be about 29,368 g/mol.

TABLE 6

| Properties | Example 4 |
|---|---|
| $M_n$ | 138,240 g/mol |
| $M_w$ | 142,147 g/mol |
| $M_z$ | 146,636 g/mol |
| $M_{z+1}$ | 151,848 g/mol |
| Polydispersity | 1.028264 |
| $M_z/M_w$ | 1.031576 |
| $M_{z+1}/M_w$ | 1.068242 |

Figure 21:
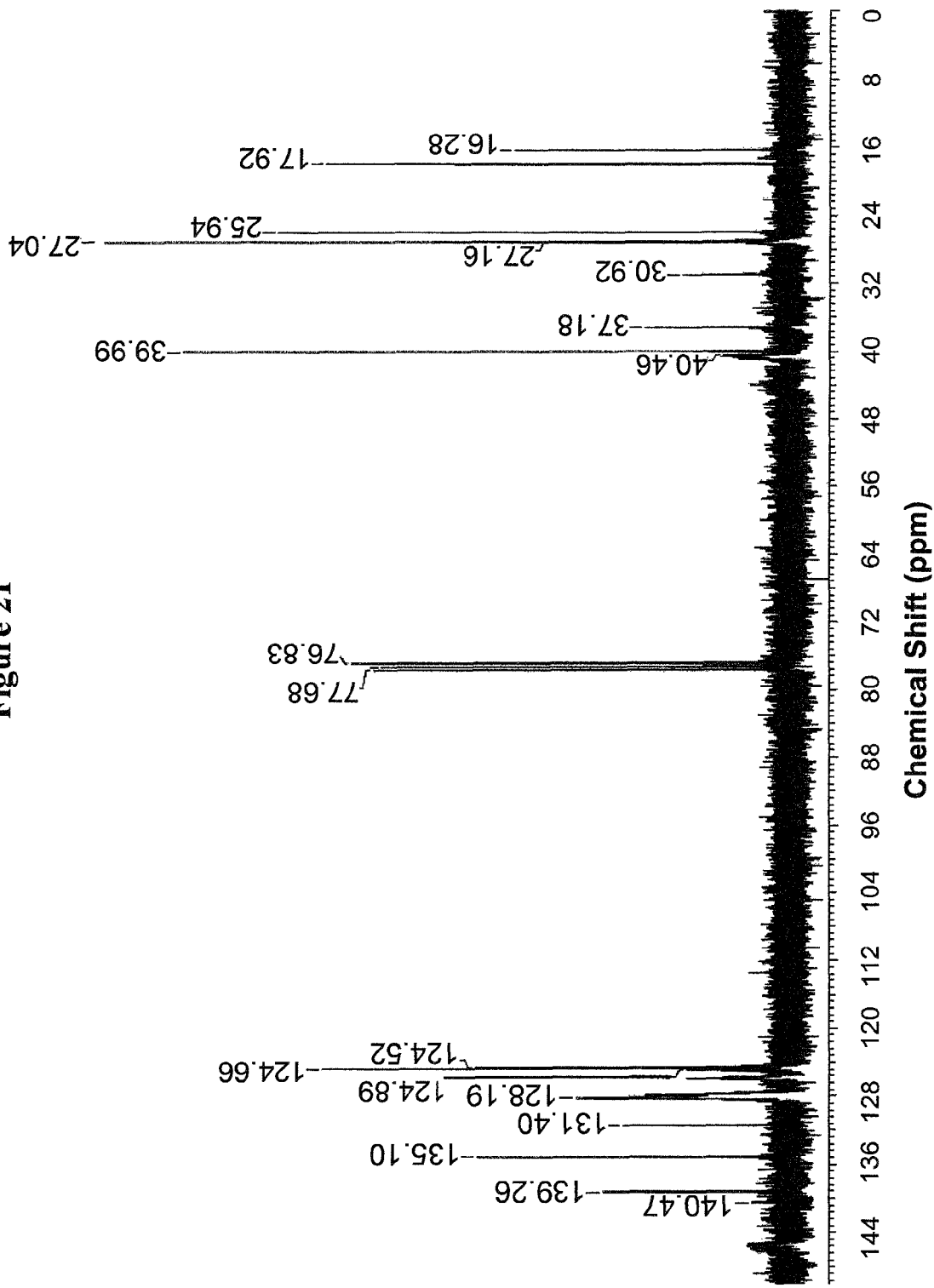
FIG. 21 depicts a $^{13}C$ NMR spectrum of Example 4.

FIG. 21 shows the $^{13}$C NMR spectrum of Example 4. Peaks at 77.68 ppm and 76.83 ppm were peaks of associated with the deuterated chloroform used for collecting the $^{13}$C NMR spectrum. Other peaks in FIG. 21 were peaks associated with 1,4-polyfarnesene and polystyrene. The characteristic peak identifying 1,4-polyfarnesene at 139.26 ppm was present in FIG. 21, indicating the presence of 1,4-polyfarnesene in Example 4.

Figure 22:
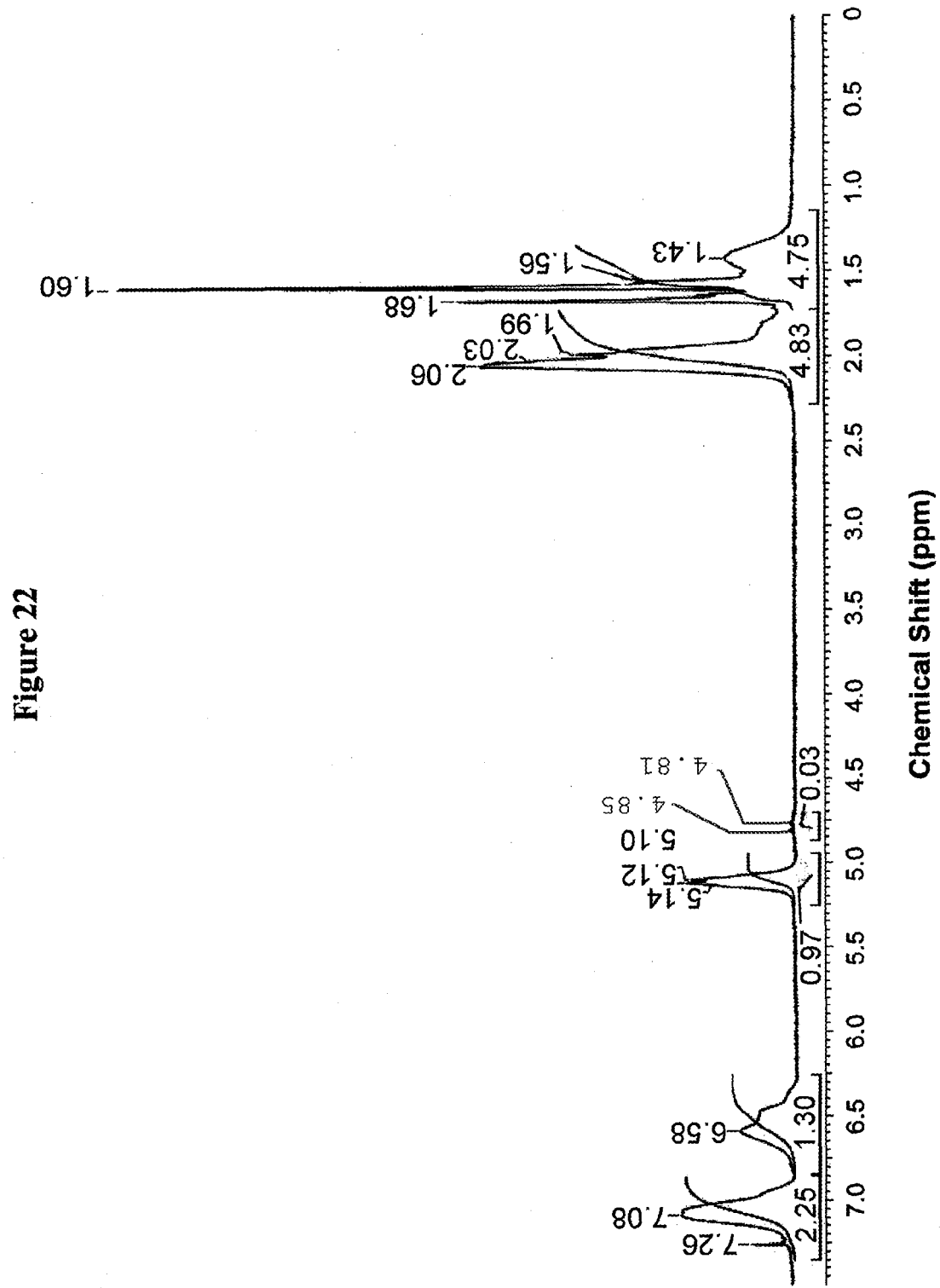
FIG. 22 depicts a $^1H$ NMR spectrum of Example 4.

FIG. 22 shows the $^1$H NMR spectrum of Example 4. Peaks at 4.85 ppm and 4.81 ppm were peaks associated with 3,4-microstructure. Peaks at 5.10 ppm, 5.12 ppm, and 5.14 ppm were peaks associated with 1,4- and 3,4-microstructures. Based on the areas under the peaks of FIG. 22, about 3% of farnesene units in Example 4 was found to have 3,4-microstructure.

Figure 23:
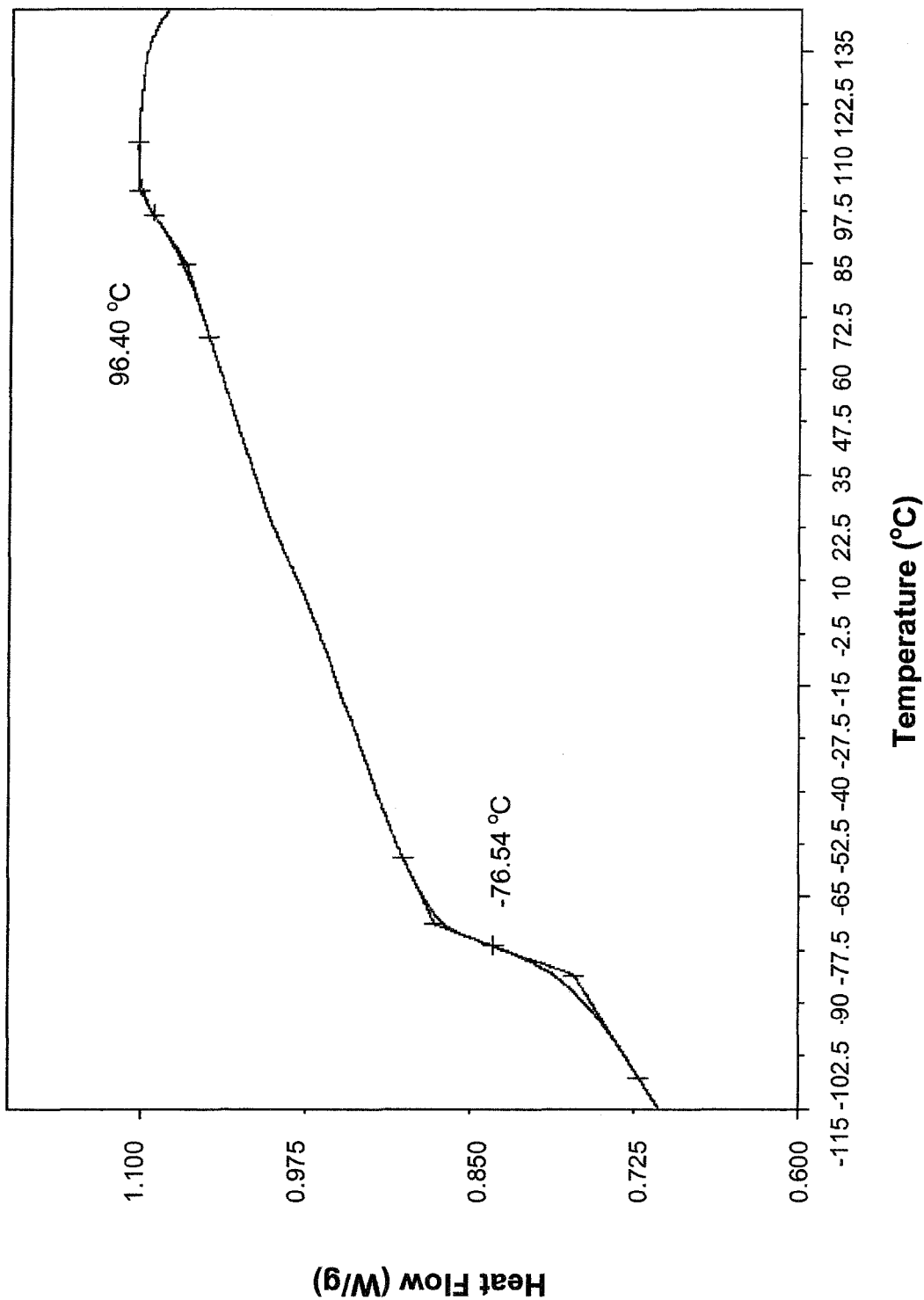
FIG. 23 depicts a DSC curve of Example 4.

The DSC curve of Example 4 is shown in FIG. 23. The thermal characteristics of Example 4 were measured by DSC. The $T_g$ of 1,4-polyfarnesene in Example 4 was found to be about −76° C. The $T_g$ of polystyrene in Example 4 was found to be about 96° C. No other thermal event was detected between −175° C. and 75° C.

Figure 24:
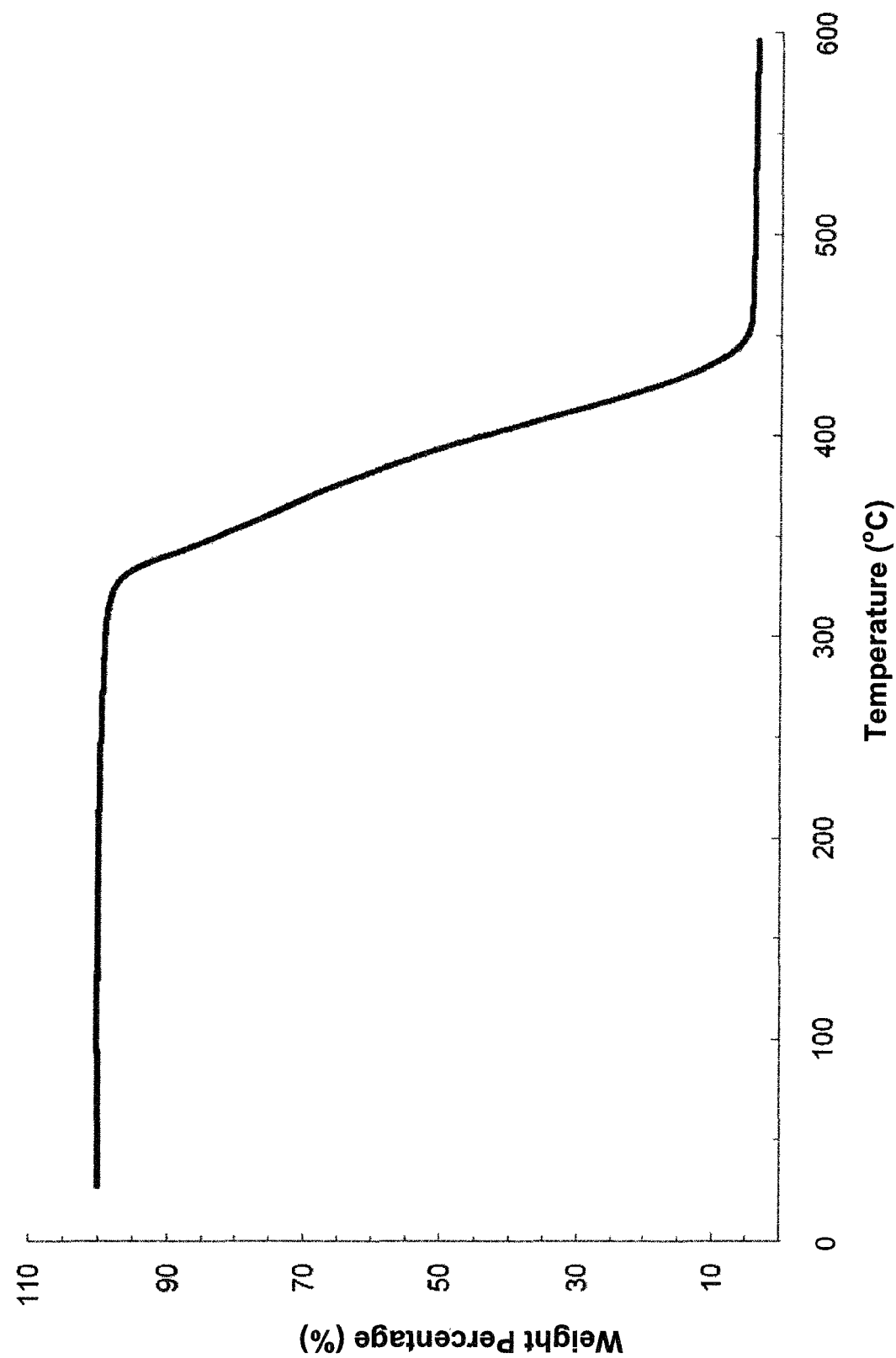
FIG. 24 depicts a TGA curve of Example 4.

The TGA curve of Example 4 measured in air is shown in FIG. 24. The decomposition temperature of Example 4 in air was determined by TGA. The 1% weight loss of Example 4 in air was recorded at 307° C. and the 5% weight loss of Example 4 in air was recorded at 333° C.

Figure 25:
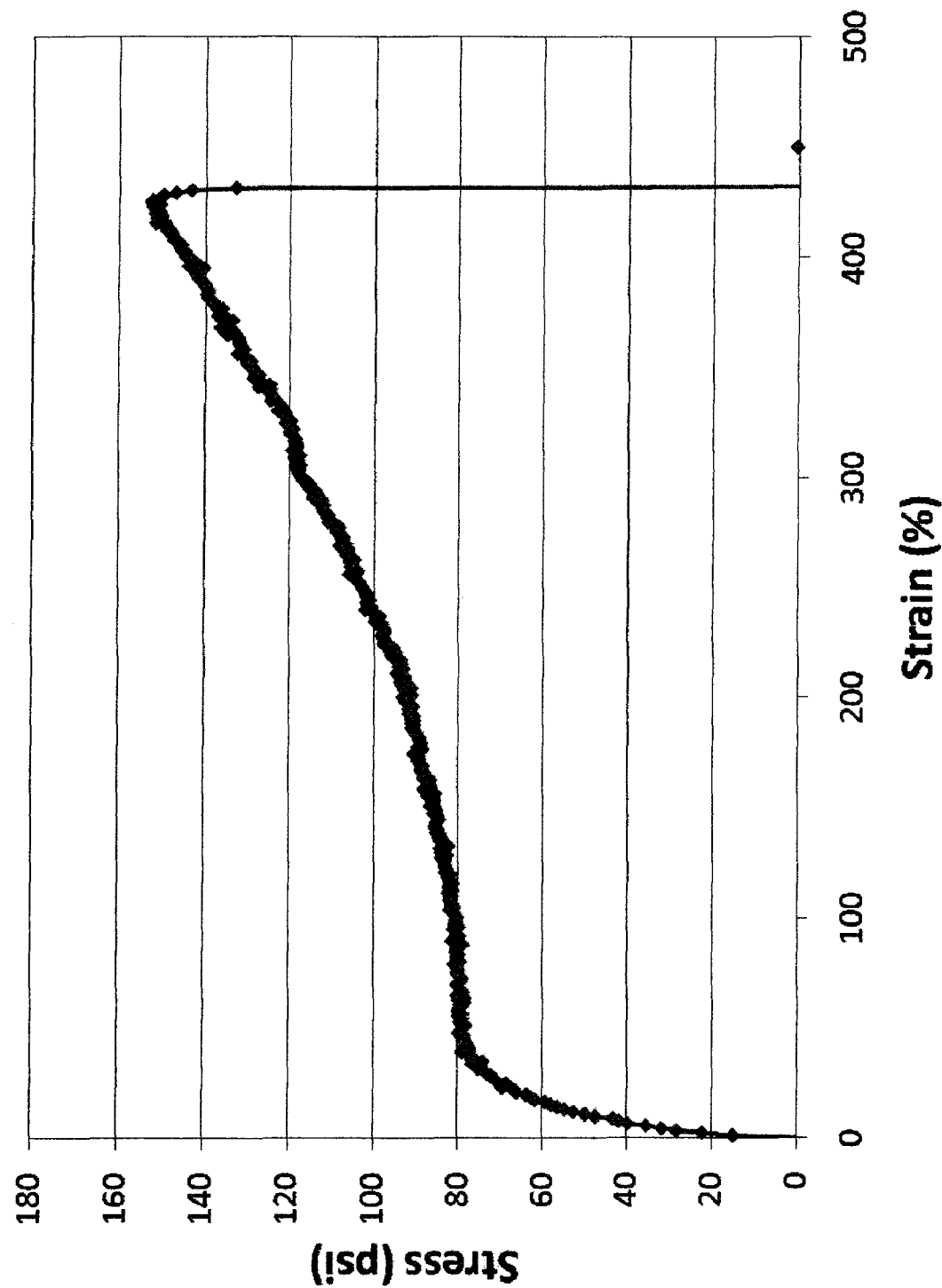
FIG. 25 depicts tensile test results of Example 4.

The tensile test results of Example 4 are shown in FIG. 25. The tensile strength of Example 4 was measured by a tensile test. Example 4 was stiff but yielded. As shown in FIG. 25, the elongation at break of Example 4 was found to be about 425% with a maximum tensile strength of about 152 psi. The modulus of Example 4 was calculated to be about 31.9 kpsi. Stress at 330% elongation of Example 4 was about 122 psi.

Figure 26:
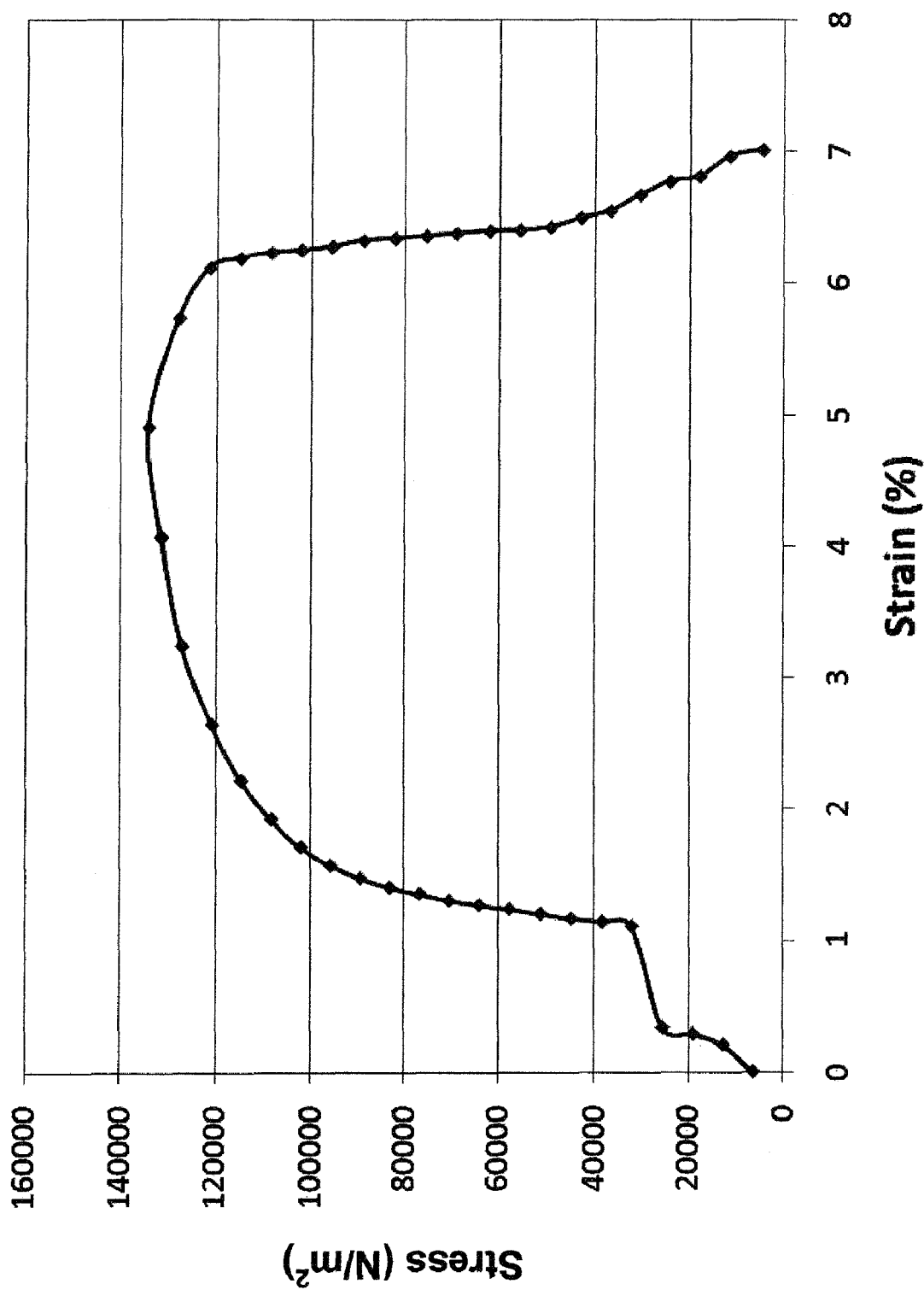
FIG. 26 depicts lap test results of Example 4.

Example 4 was observed to be tacky. The lap test results of Example 4, due to an adhesive failure, are shown in FIG. 26. The adhesive energy of Example 4 was found to be about 2,928,000 J/m$^2$ with a peak stress of about 134,000 N/m$^2$.

Example 5 polystyrene-3,4-polyfarnesene-polystyrene

To a first dried three neck reactor under argon atmosphere, a pre-dried 12% solution of β-farnesene in cyclohexane was added. To a second dried three neck reactor under argon atmosphere, a pre-dried solution of 10% styrene in cyclohexane was added. Afterwards, 141.1 g of the styrene solution (i.e., 14.82 g of styrene) was transferred to a dried reactor under argon atmosphere. A mixture of n-butyl lithium (5.84× 10$^{-4}$ mol) and TMEDA (5.02×10$^{-4}$ mol) was added into the reactor as an initiator, and the reactor was heated at about 50° C. for about 16 hours, until all styrene was consumed, as monitored by GPC. Then, 143.07 g of β-farnesene solution (i.e., 15.74 g of β-farnesene) was transferred to the reactor under argon atmosphere. The reaction was allowed to react until completion for about 16 hours, as monitored by GPC. Dichlorosilane coupling agent was then added into the reactor in three equal aliquots, such that the mole ratio of Li to Cl was 1:2. The reaction mixture was allowed react until completion as indicated by a color change from yellow to clear in the reactor. Example 5 was precipitated from the reaction mixture by a 1% solution of t-butyl catachol in ethanol. After drying in a vacuum oven at about 60° C. for about 2 hours, Example 5 was kept under vacuum for about 16 hours. Afterwards, Example 5, collected at 28.75 g (yield 96%), was stored in a refrigerator to prevent any crosslinking before characterization.

Figure 27:
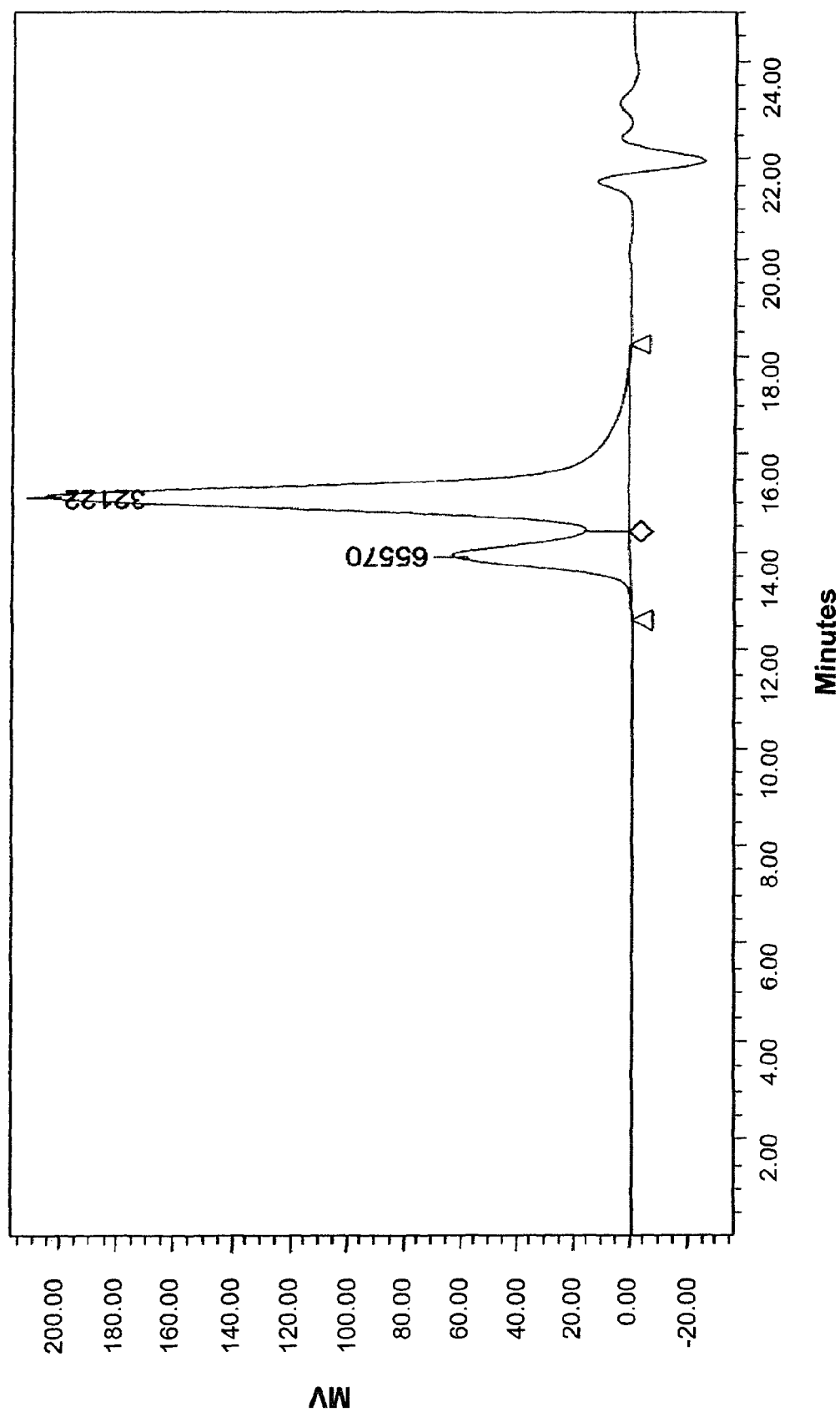
FIG. 27 depicts a GPC curve of polystyrene formed.

The GPC curve of polystyrene is shown in FIG. 27. The progress of synthesizing polystyrene was monitored by GPC. The two peaks in FIG. 27 indicated that there were two distinct weight fractions of polystyrene. The $M_n$, $M_w$, $M_z$, $M_{z+1}$, polydispersity, $M_z/M_w$, and $M_{z+1}/M_w$ of polystyrene are shown in Table 7. The $M_p$ of the first peak in FIG. 27 was found to be about 65,570 g/mol. The $M_p$ of the second peak in FIG. 27 was found to be about 32,122 g/mol.

TABLE 7

| Properties | Polystyrene |
| --- | --- |
| $M_n$ | 27,915 g/mol |
| $M_w$ | 30,898 g/mol |
| $M_z$ | 32,608 g/mol |
| $M_{z+1}$ | 33,819 g/mol |
| Polydispersity | 1.106849 |
| $M_z/M_w$ | 1.055361 |
| $M_{z+1}/M_w$ | 1.094557 |

Figure 28:
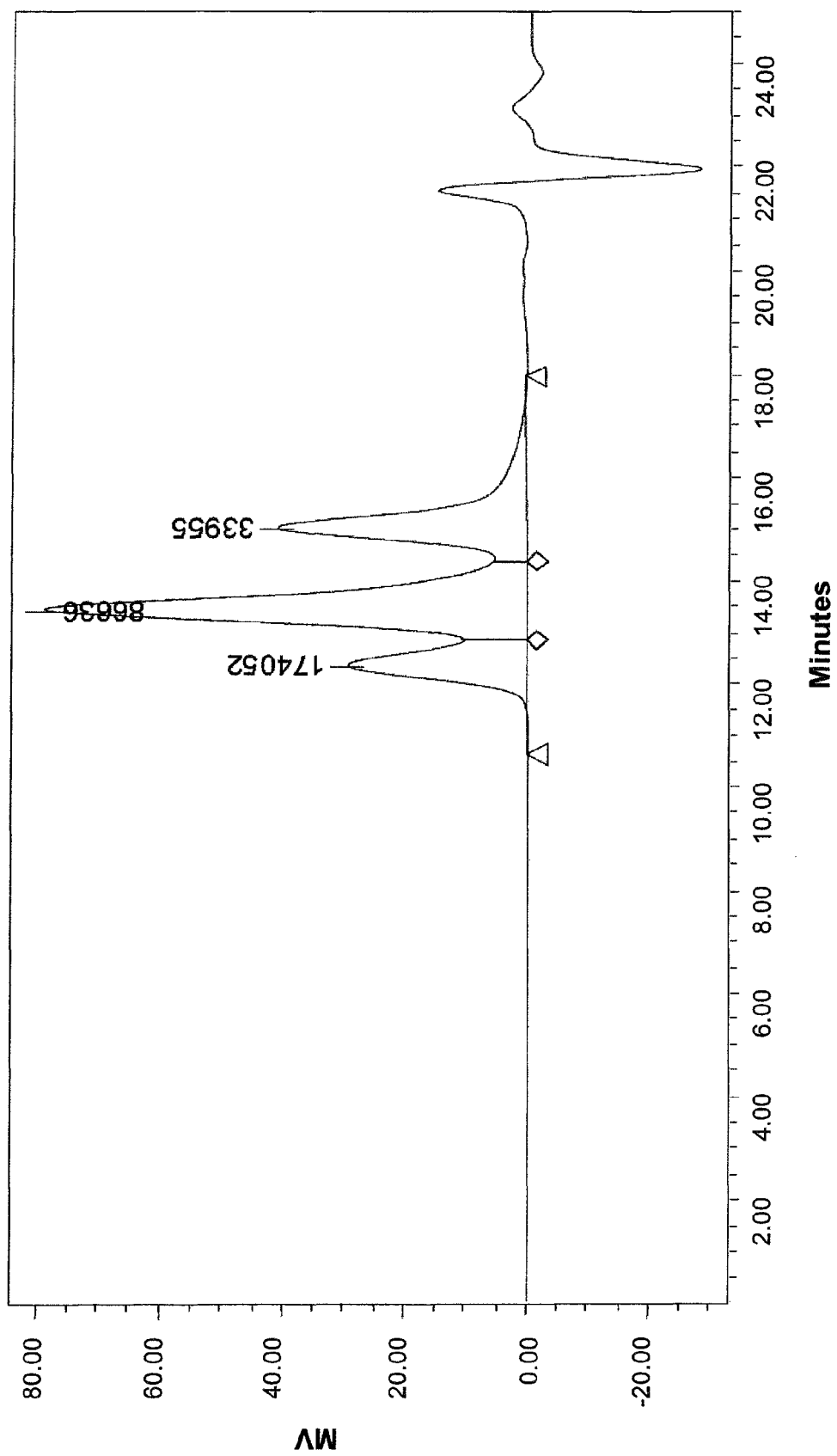
FIG. 28 depicts a GPC curve of polystyrene-3,4-polyfarnesene di-block copolymer formed.

The polystyrene formed then acted as an initiator to initiate the polymerization with β-farnesene to form a polystyrene-3,4-polyfarnesene di-block copolymer. The GPC curve of the di-block copolymer is shown in FIG. 28. The progress of the di-block copolymer synthesis was monitored by GPC. The three peaks in FIG. 28 indicated that there were three distinct weight fractions in the di-block copolymer reaction solution. The $M_n$, $M_w$, $M_z$, $M_{z+1}$, polydispersity, $M_z/M_w$, and $M_{z+1}/M_w$ of the di-block copolymer are shown in Table 8. The $M_p$ of the first peak in FIG. 28, corresponding to polystyrene-3,4-polyfarnesene-polystyrene, was found to be about 174,052 g/mol. The $M_p$ of the second peak in FIG. 28, corresponding to the di-block copolymer, was found to be about 86,636 g/mol. The molecular weight of 3,4-polyfarnesene in the di-block copolymer was calculated to be about 54,000 g/mol. The $M_p$ of the third peak in FIG. 28, corresponding to polystyrene, was found to be about 33,955 g/mol.

TABLE 8

| Properties | Polystyrene-3,4-polyfarnesene Di-block Copolymer |
| --- | --- |
| $M_n$ | 27,801 g/mol |
| $M_w$ | 31,379 g/mol |
| $M_z$ | 33,539 g/mol |
| $M_{z+1}$ | 35,033 g/mol |
| Polydispersity | 1.128697 |
| $M_z/M_w$ | 1.068833 |
| $M_{z+1}/M_w$ | 1.116447 |

Figure 29:
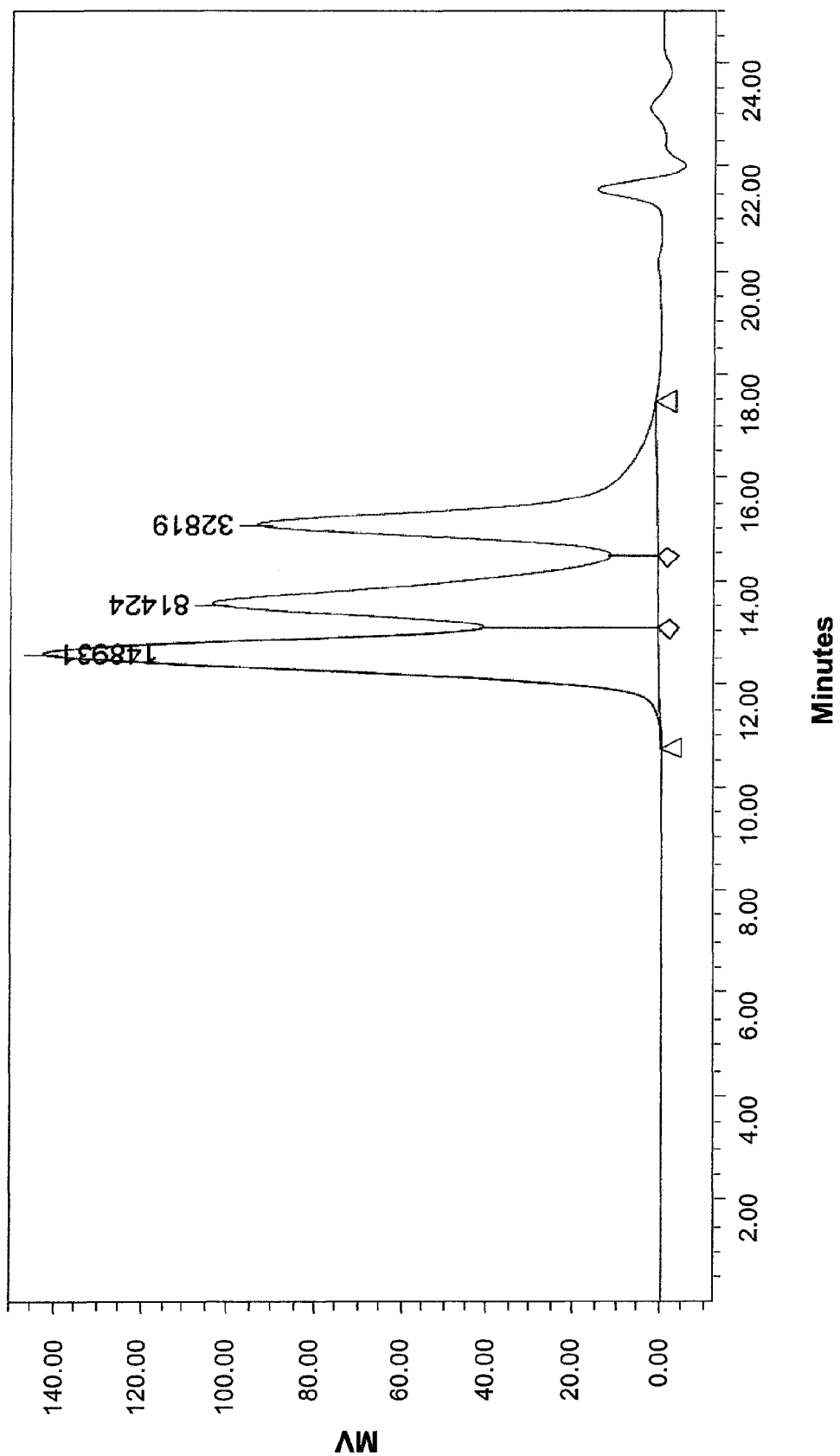
FIG. 29 depicts a GPC curve of Example 5.

The polystyrene-3,4-polyfarnesene di-block copolymer was further coupled to form Example 5. FIG. 29 shows the GPC curve of Example 5. The molecular weight and polydispersity of Example 5 were determined by GPC. The three peaks in FIG. 29 indicated that there were three distinct weight fractions for the coupling product formed. The $M_n$, $M_w$, $M_z$, $M_{z+1}$, polydispersity, $M_z/M_w$, and $M_{z+1}/M_w$ of Example 5 are shown in Table 9. The $M_p$ of the first peak in FIG. 29, corresponding to Example 5, was found to be about 148,931 g/mol. Example 5 was obtained at about 33% of the coupling product. The number of farnesene monomer units in Example 5 was calculated to be about 300. The peak molecular weight of the blocks in Example 5 was found to be about 32,000-108,000-32,000 g/mol. The $M_p$ of the second peak in FIG. 29, corresponding to the polystyrene-3,4-polyfarnesene di-block copolymer, was found to be about 81,424 g/mol. The $M_p$ of the third peak in FIG. 29, corresponding to polystyrene, was found to be about 32,819 g/mol.

TABLE 9

| Properties | Example 4 |
| --- | --- |
| $M_n$ | 28,179 g/mol |
| $M_w$ | 30,815 g/mol |
| $M_z$ | 32,590 g/mol |
| $M_{z+1}$ | 33,905 g/mol |

TABLE 9-continued

| Properties | Example 4 |
|---|---|
| Polydispersity | 1.093554 |
| $M_n/M_w$ | 1.057606 |
| $M_{z+1}/M_w$ | 1.100250 |

Figure 30:
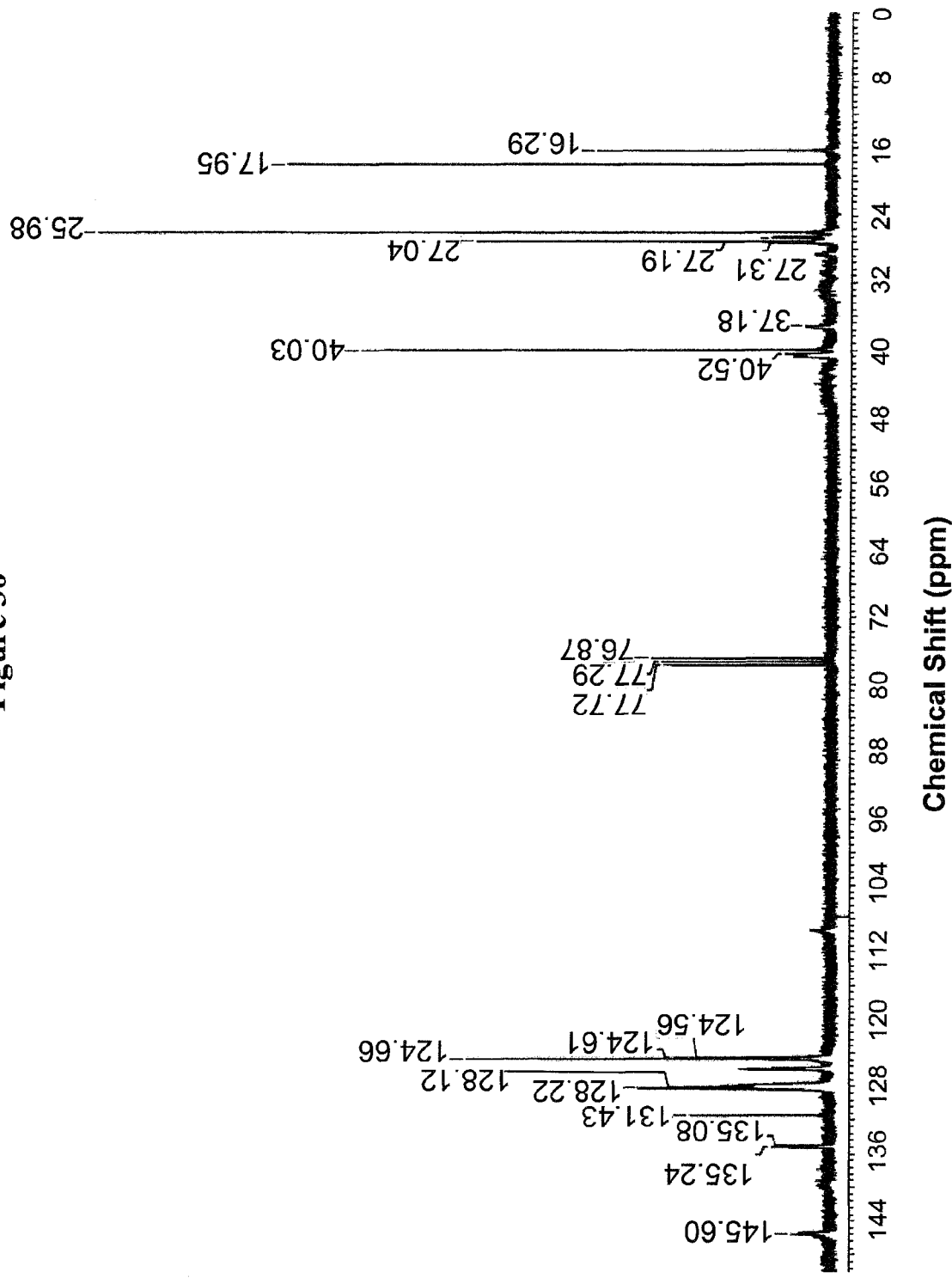
FIG. 30 depicts a $^{13}C$ NMR spectrum of Example 5.

FIG. 30 shows the $^{13}$C NMR spectrum of Example 5. Peaks at 77.72 ppm, 77.29 ppm, and 76.87 ppm were peaks of associated with the deuterated chloroform used for collecting the $^{13}$C NMR spectrum. Other peaks in FIG. 30 were peaks associated with 3,4-polyfarnesene and polystyrene. The characteristic peak identifying 1,4-polyfarnesene at 139.05 ppm was absent in FIG. 30, indicating a regular microstructure of Example 5.

Figure 31:
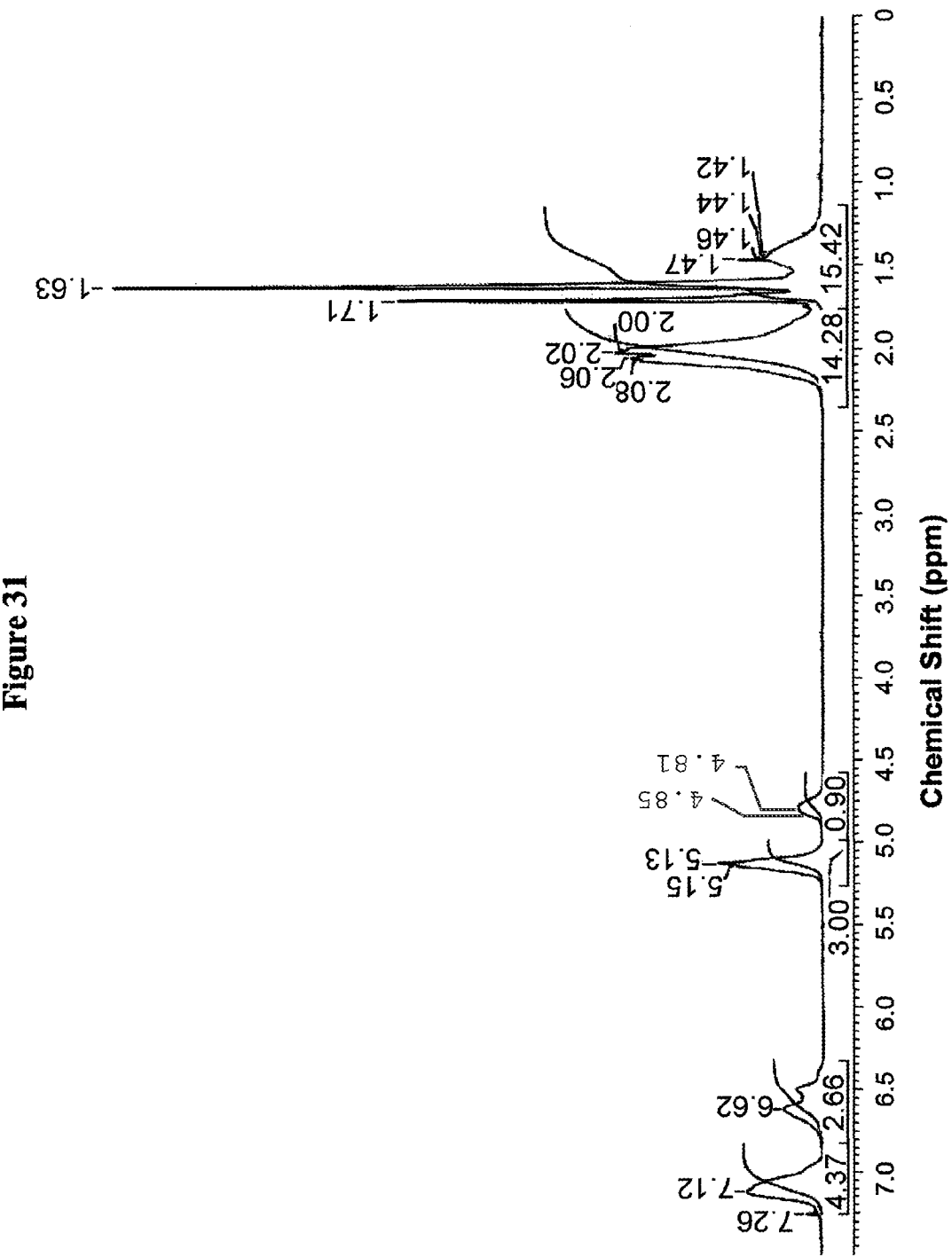
FIG. 31 depicts a $^1H$ NMR spectrum of Example 5.

FIG. 31 shows the $^1$H NMR spectrum of Example 5. Peaks at 4.85 ppm and 4.81 ppm were peaks associated with 3,4-microstructure. Peaks at 5.15 ppm and 5.13 ppm were peaks associated with 1,4- and 3,4-microstructures. Based on the areas under the peaks of FIG. 31, about 5% of farnesene units in Example 5 was found to have 1,4-microstructure.

Figure 32:
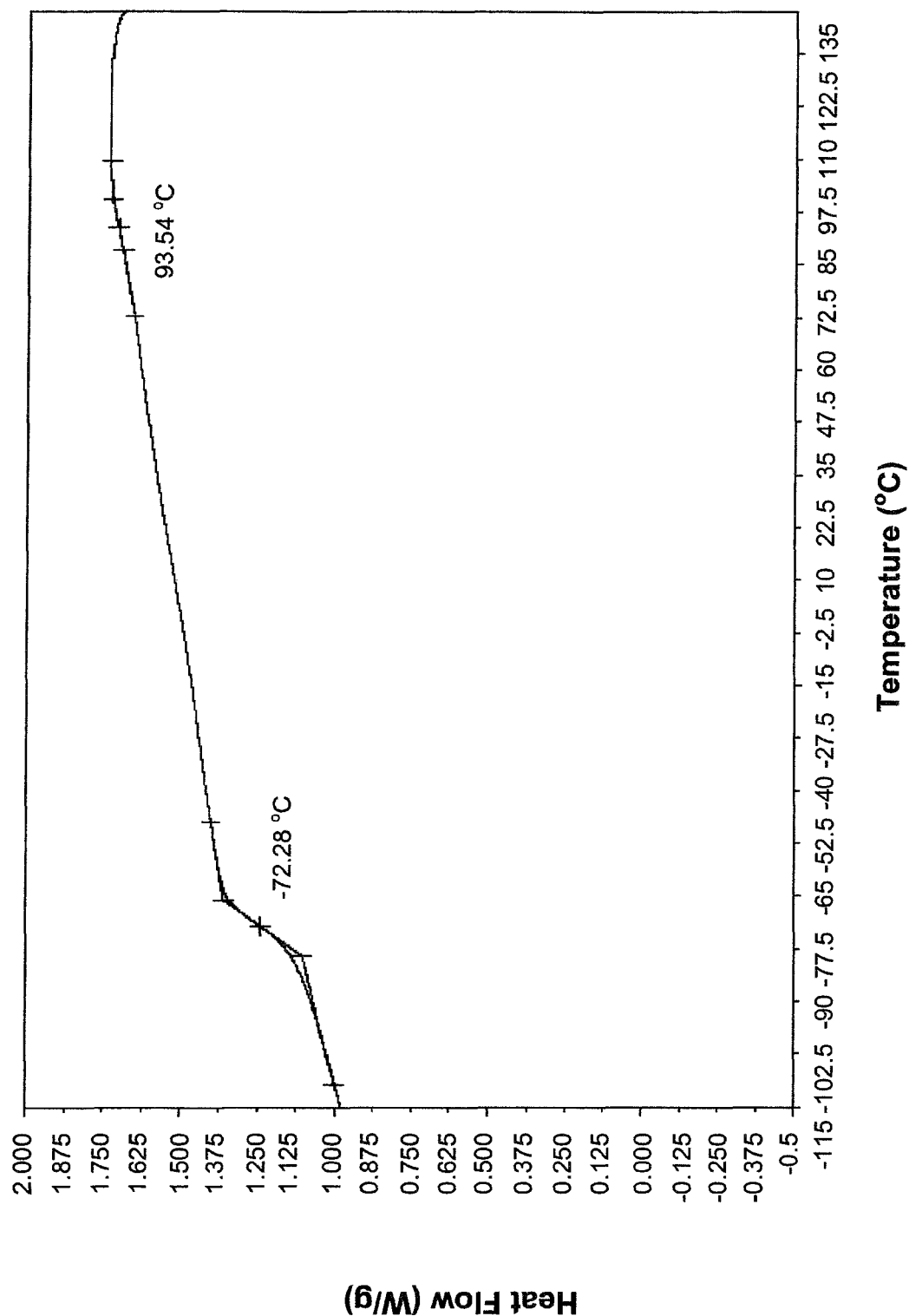
FIG. 32 depicts a DSC curve of Example 5.

The DSC curve of Example 5 is shown in FIG. 32. The thermal characteristics of Example 5 were measured by DSC. The $T_g$ of 3,4-polyfarnesene in Example 5 was found to be about −72° C. The $T_g$ of polystyrene in Example 5 was found to be about 94° C. No other thermal event was detected between −175° C. and 75° C.

Figure 33:
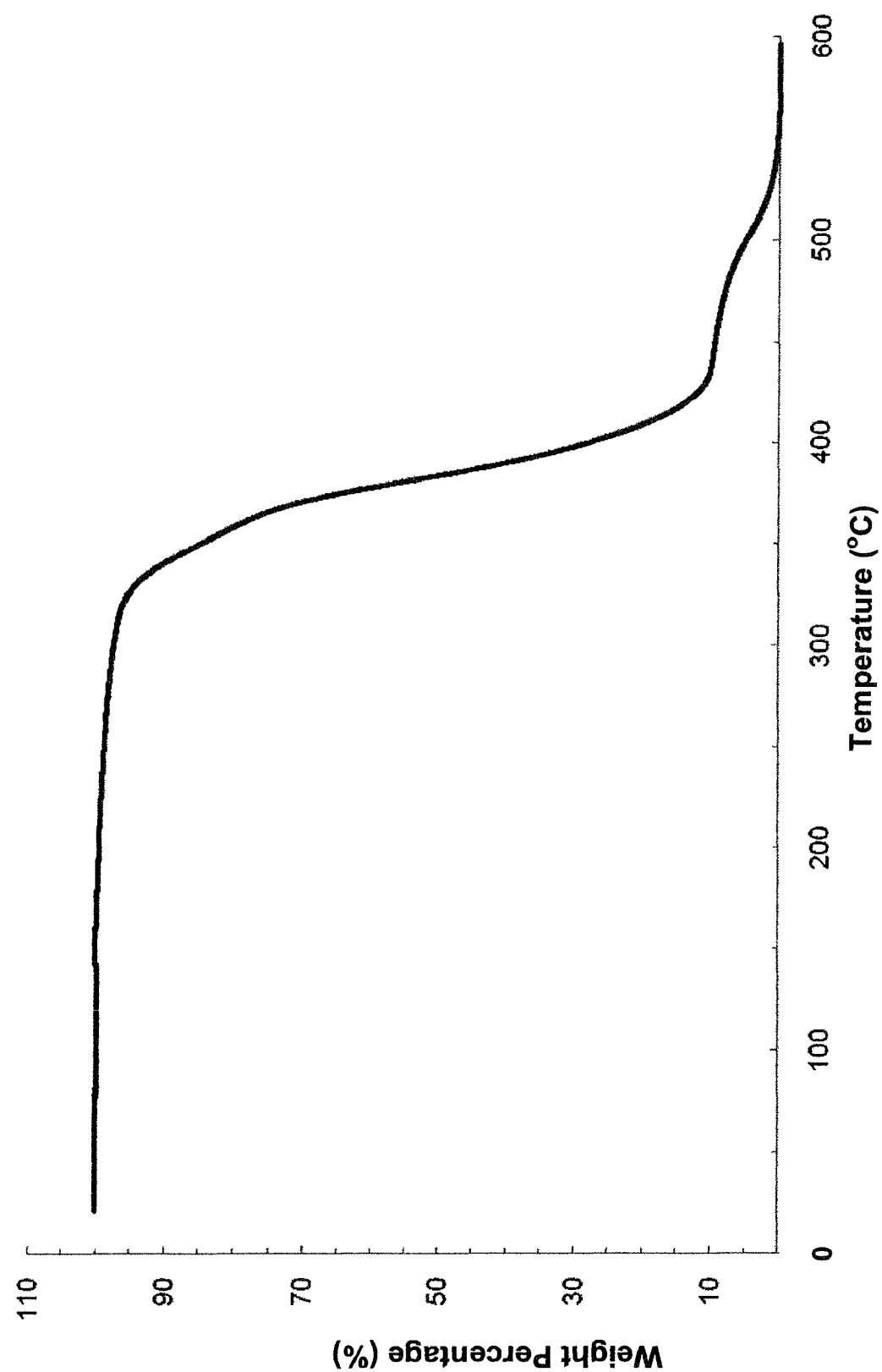
FIG. 33 depicts a TGA curve of Example 5.

The TGA curve of Example 5 measured in air is shown in FIG. 33. The decomposition temperature of Example 5 in air was determined by TGA. The 1% weight loss of Example 5 in air was recorded at 240° C. and the 5% weight loss of Example 5 in air was recorded at 327° C.

Figure 34:
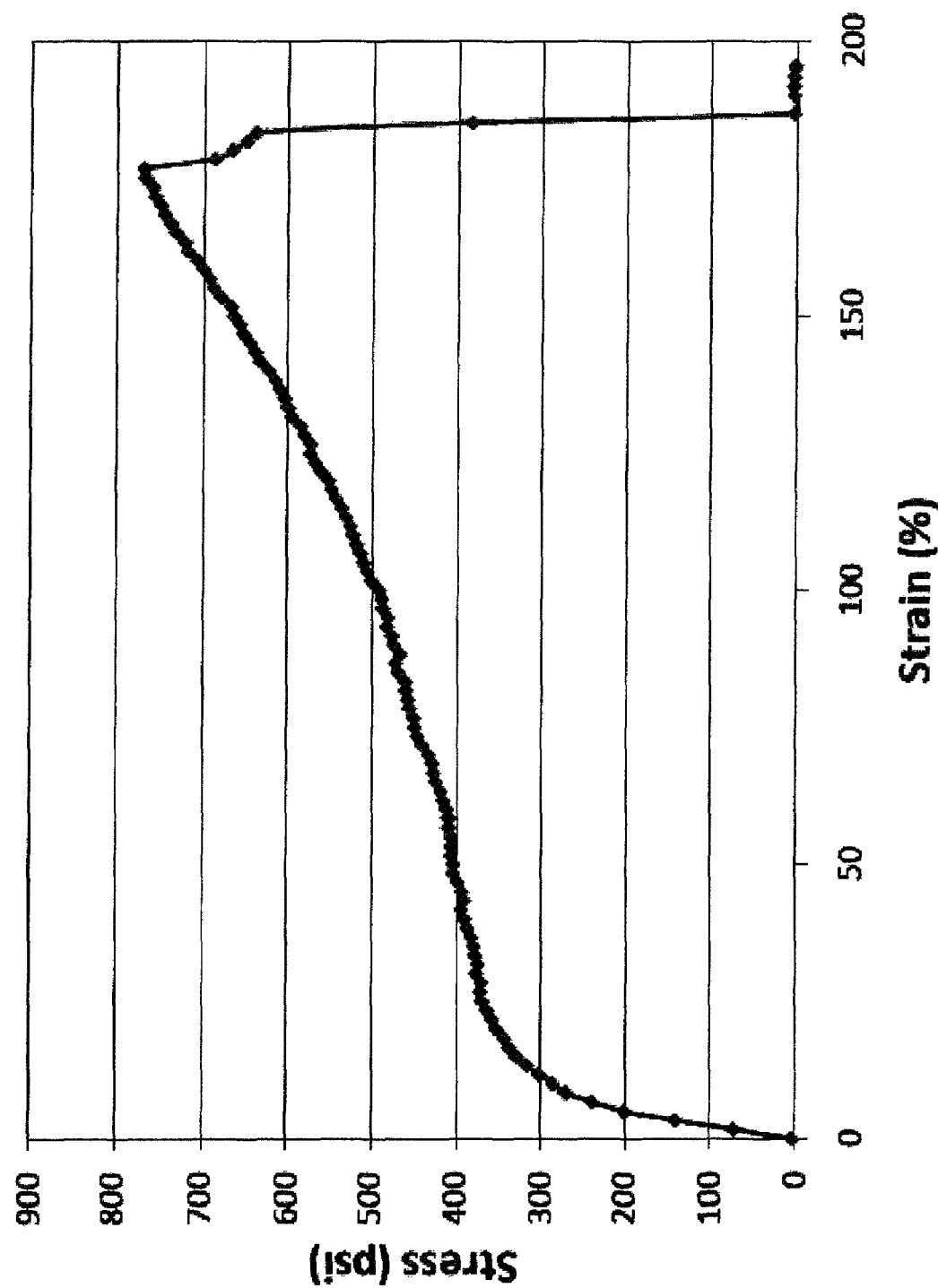
FIG. 34 depicts tensile test results of Example 5.

The tensile test results of Example 5 are shown in FIG. 34. The tensile strength of Example 5 was measured by a tensile test. Example 5 was stiff but yielded. As shown in FIG. 34, the elongation at break of Example 5 was found to be about 175% with a maximum tensile strength of about 768 psi. The modulus of Example 5 was calculated to be about 39.5 kpsi.

Figure 35:
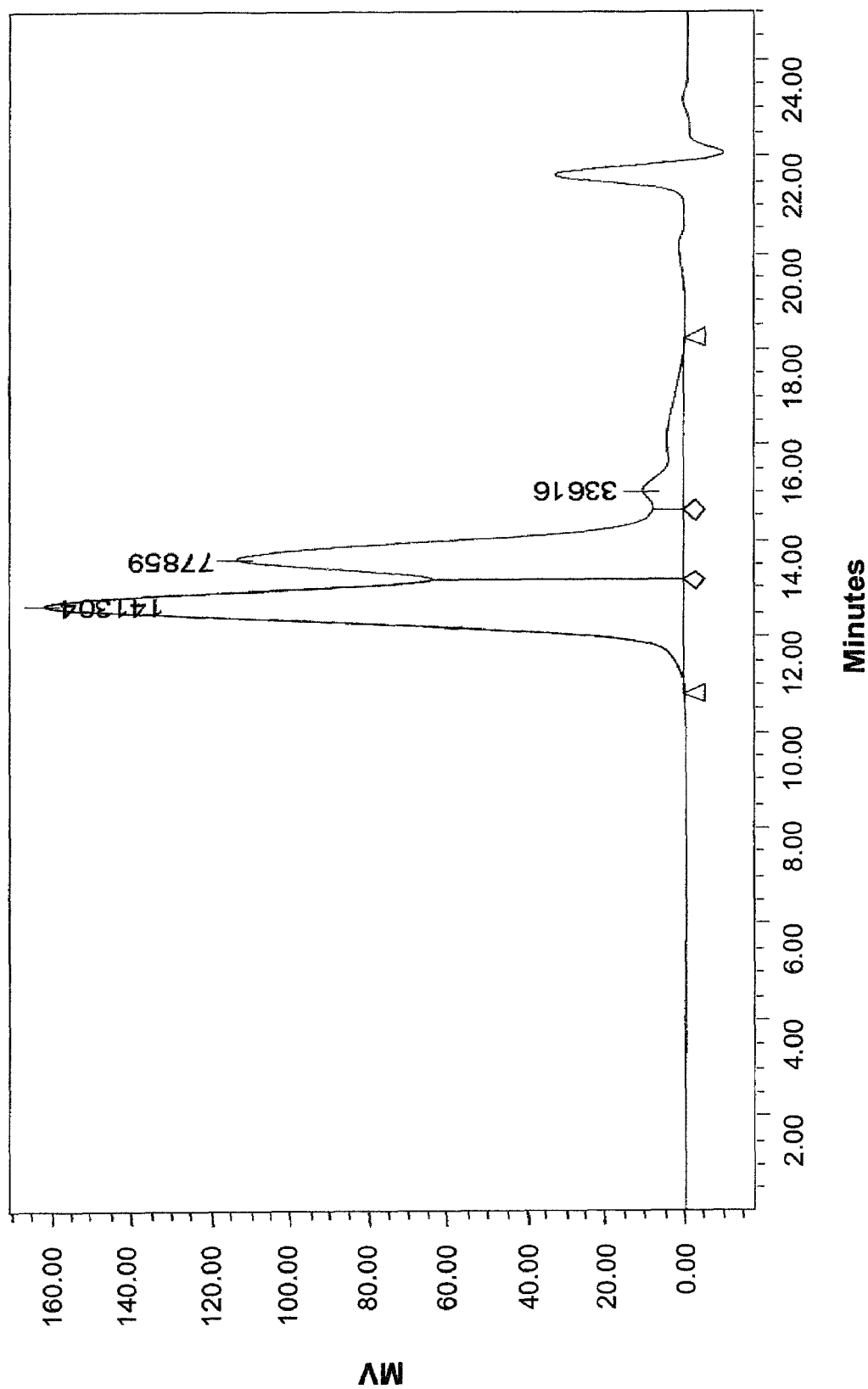
FIG. 35 depicts a GPC curve of Example 5 after extraction with hexane.

Example 5 was further purified by repeated extraction with solvent hexane 4 times. The GPC curve of the purified Example 5 is shown in FIG. 35. The extraction of Example 5 from the coupling product was evaluated by GPC. After the extraction, Example 5, shown as the first peak in FIG. 35, was increased to about 60% of the extracted product. The polystyrene-3,4-polyfarnesene di-block copolymer, shown as the second peak in FIG. 35, was reduced to about 30% of the extracted product. Polystyrene, shown as the third peak in FIG. 35, was reduced to about 10% of the extracted product.

Figure 36:
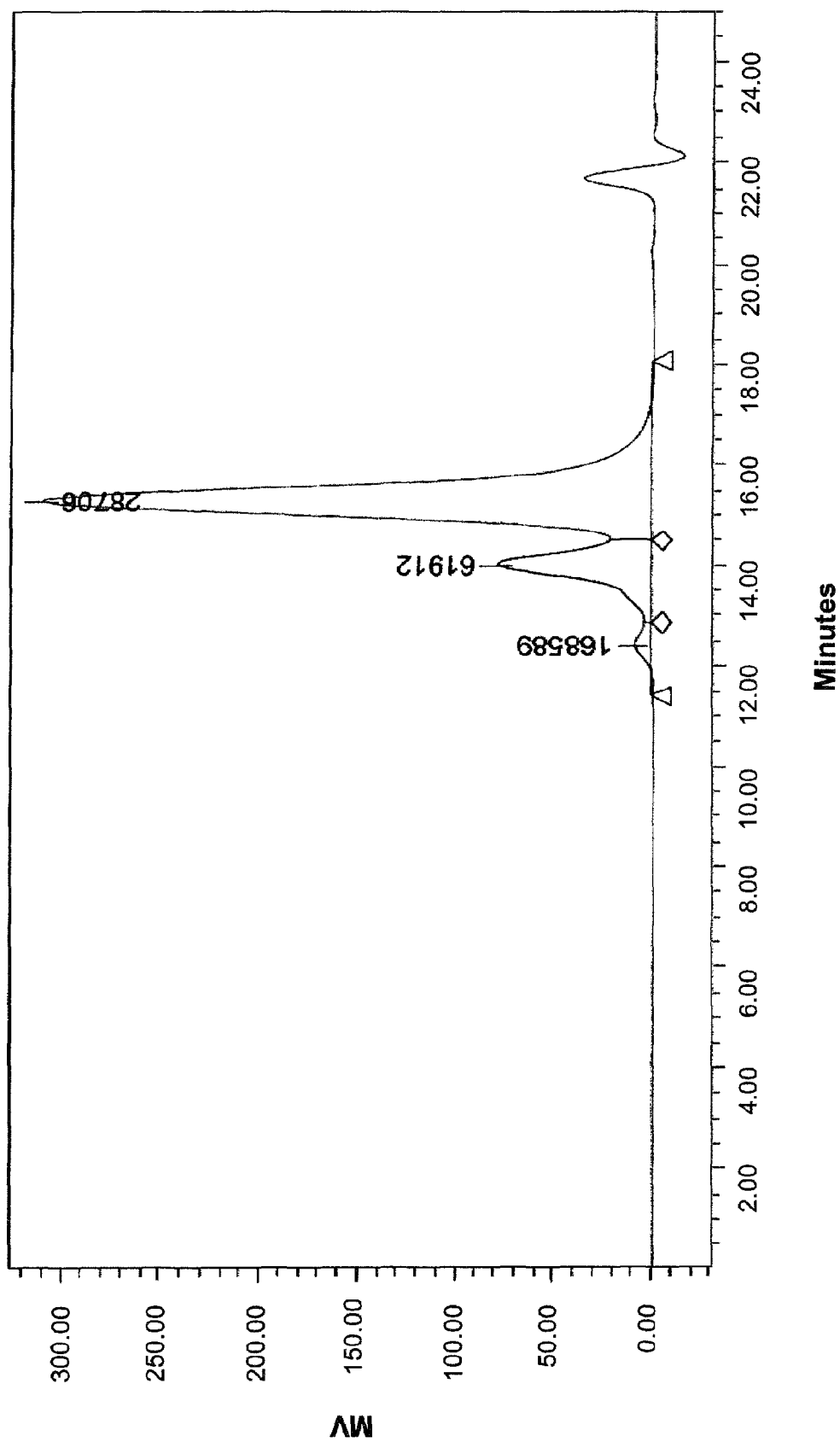
FIG. 36 depicts a GPC curve of hexane after extraction for Example 5.

The GPC curve of the extraction solvent hexane is shown in FIG. 36. After the extraction, Example 5 existed in very low amount in the extraction solvent, shown as the first peak in FIG. 36. A significant amount of the polystyrene-3,4-polyfarnesene di-block copolymer was extracted to the extraction solvent, shown as the second peak in FIG. 36. A majority of polystyrene was extracted to the extraction solvent, shown as the third peak in FIG. 36.

Figure 37:
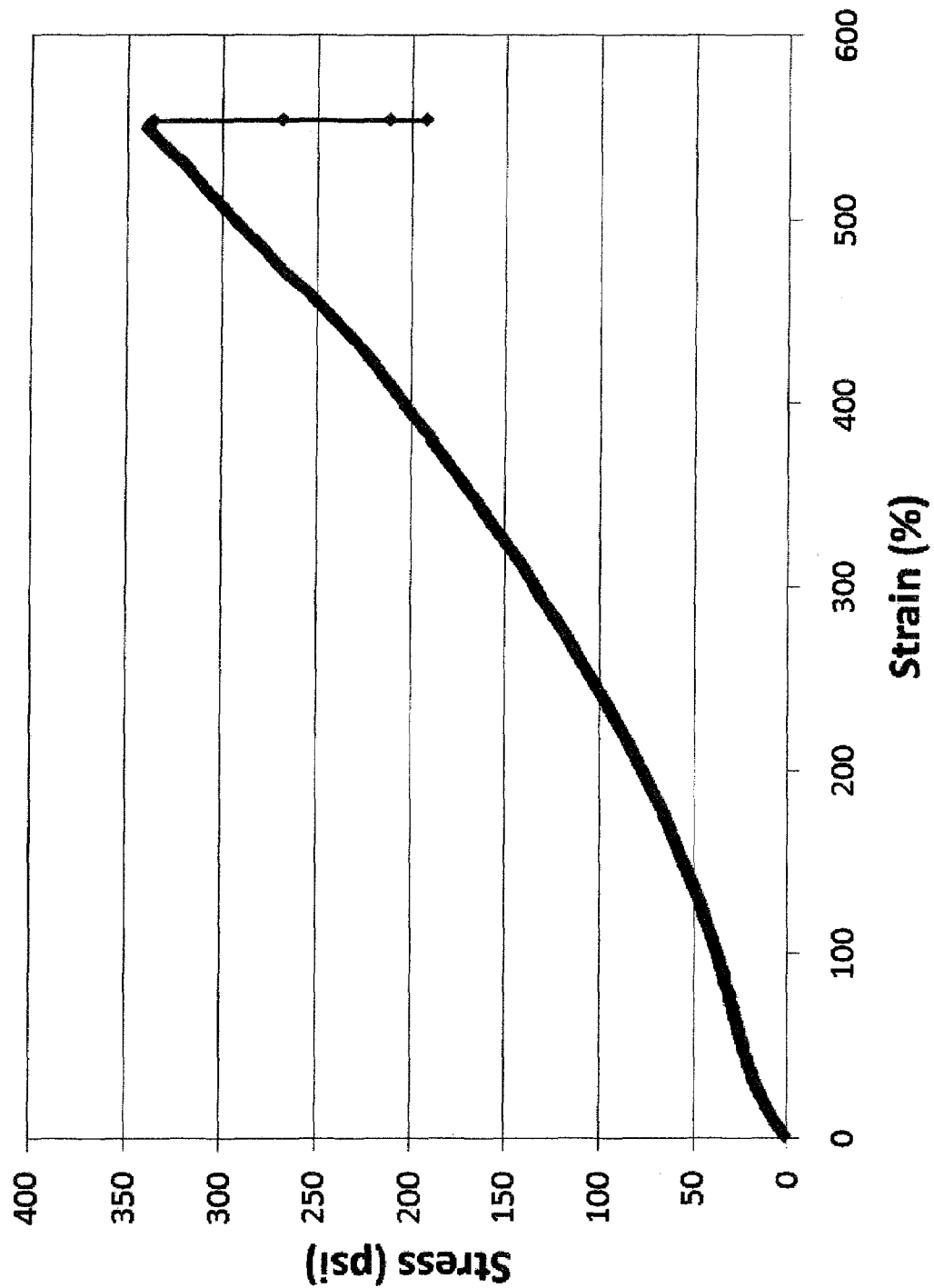
FIG. 37 depicts tensile test results of Example 5.

The tensile test results of the purified Example 5 are shown in FIG. 37. The tensile strength of the purified Example 5 was measured by a tensile test. Example 5 was soft and readily yielded. As shown in FIG. 37, the elongation at break of the purified Example 5 was found to be about 550% with a maximum tensile strength of about 340 psi. The modulus of the purified Example 5 was calculated to be about 65.9 kpsi. Stress at 300% elongation of the purified Example 5 was found to be about 133 psi.

Figure 38:
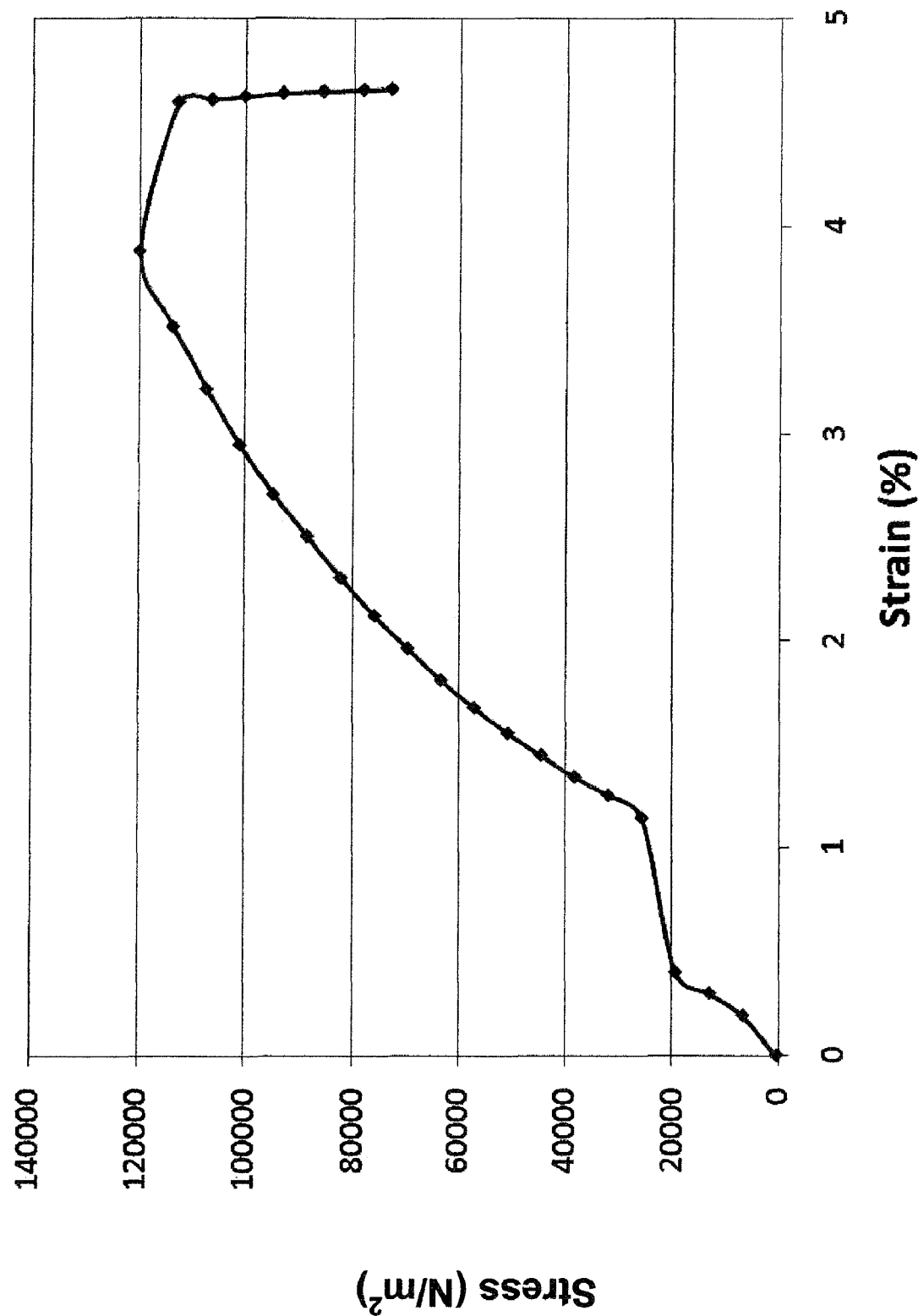
FIG. 38 depicts lap test results of Example 5.

The purified Example 5 was observed to be highly tacky. The lap test results of the purified Example 5, due to an adhesive failure, are shown in FIG. 38. The adhesive capability of the purified Example 5 was measured by a lap test. The adhesive energy of the purified Example 5 was found to be about 1,787,000 J/m$^2$ with a peak stress of about 120,000 N/m$^2$.

Example 6

Example 6 was formed by the vulcanization of Example 1. To formulate the reaction mixture, 62.7 g of Example 1 was mixed with 3.20 g zinc oxide, 1.25 g stearic acid, 0.94 g Rubbermakers Sulfur MC-98, 0.13 g Accelerator TMTD (tetramethylthiuram disulfide ), and 0.63 g Accelerator OBTS (N-oxydiethylene-2-benzothiazole sulfenamide). Zinc oxide, stearic acid, Rubbermakers Sulfur MC-98, Accelerator TMTD, and Accelerator OBTS were obtained from Akrochem Corporation, Akron, Ohio. The mixture was then placed in a vulcanization mold and degassed at about 140° C. for about 30 minutes. After degassing, the mixture was cured at about 170° C. for about 15 minutes. After de-molding, Example 6, an elastic solid, was collected at 70.4 g (yield 81%).

Figure 39:
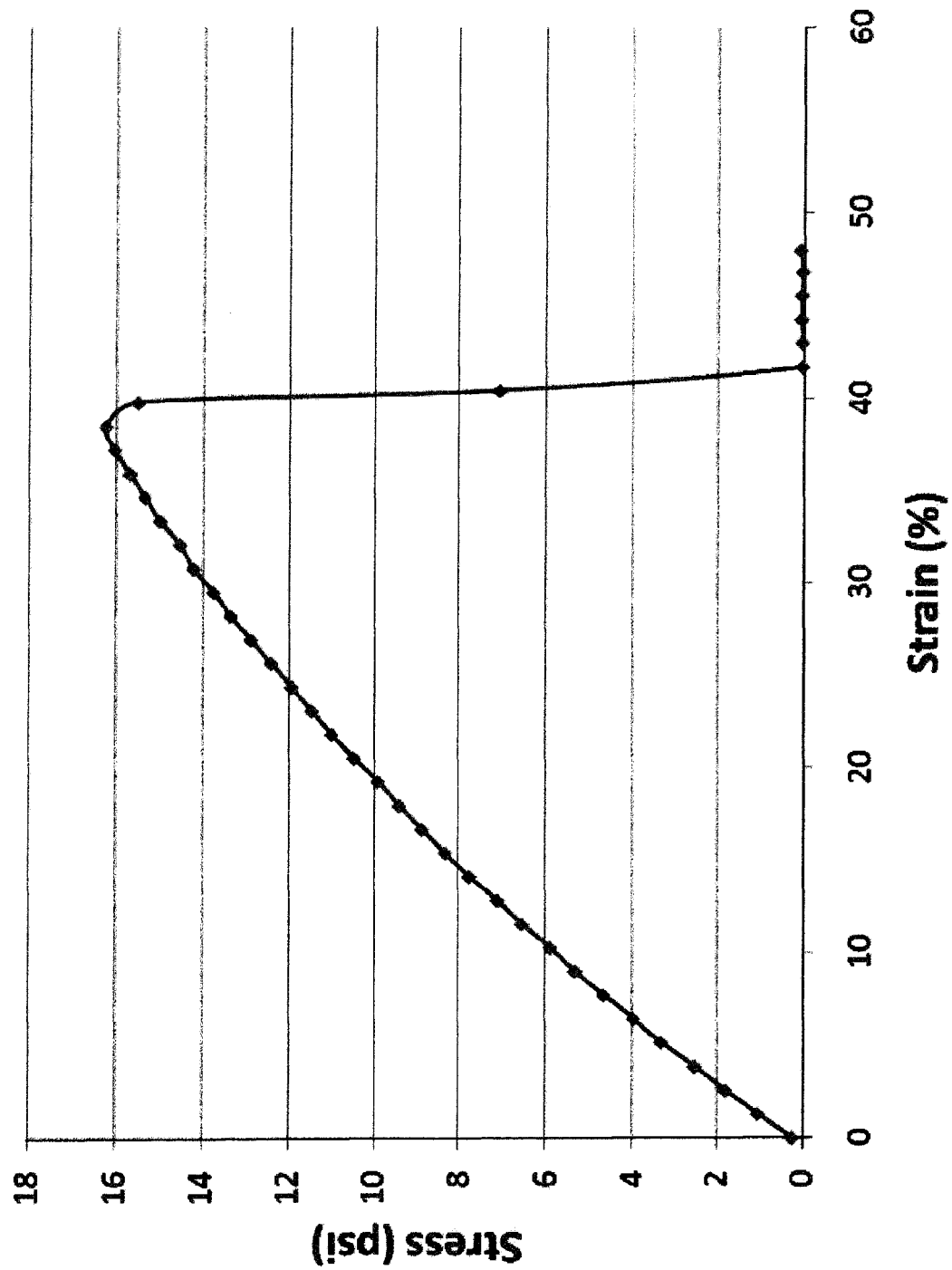
FIG. 39 depicts tensile test results of Example 6.

The tensile test results of Example 6 are shown in FIG. 39. The tensile strength of Example 6 was measured by a tensile test. As shown in FIG. 39, the elongation at break of Example 6 was about 38% with a maximum tensile strength of about 16 psi. The modulus of Example 6 was calculated to be about 58 psi.

Example 7

Example 7 was formed by the vulcanization of Example 2. Example 7 was synthesized similarly according to the procedure for Example 6 except that Example 1 was replaced by 60.3 g Example 2. The net weight of Example 7 was found to be 68.1 g (yield 78%).

Figure 40:
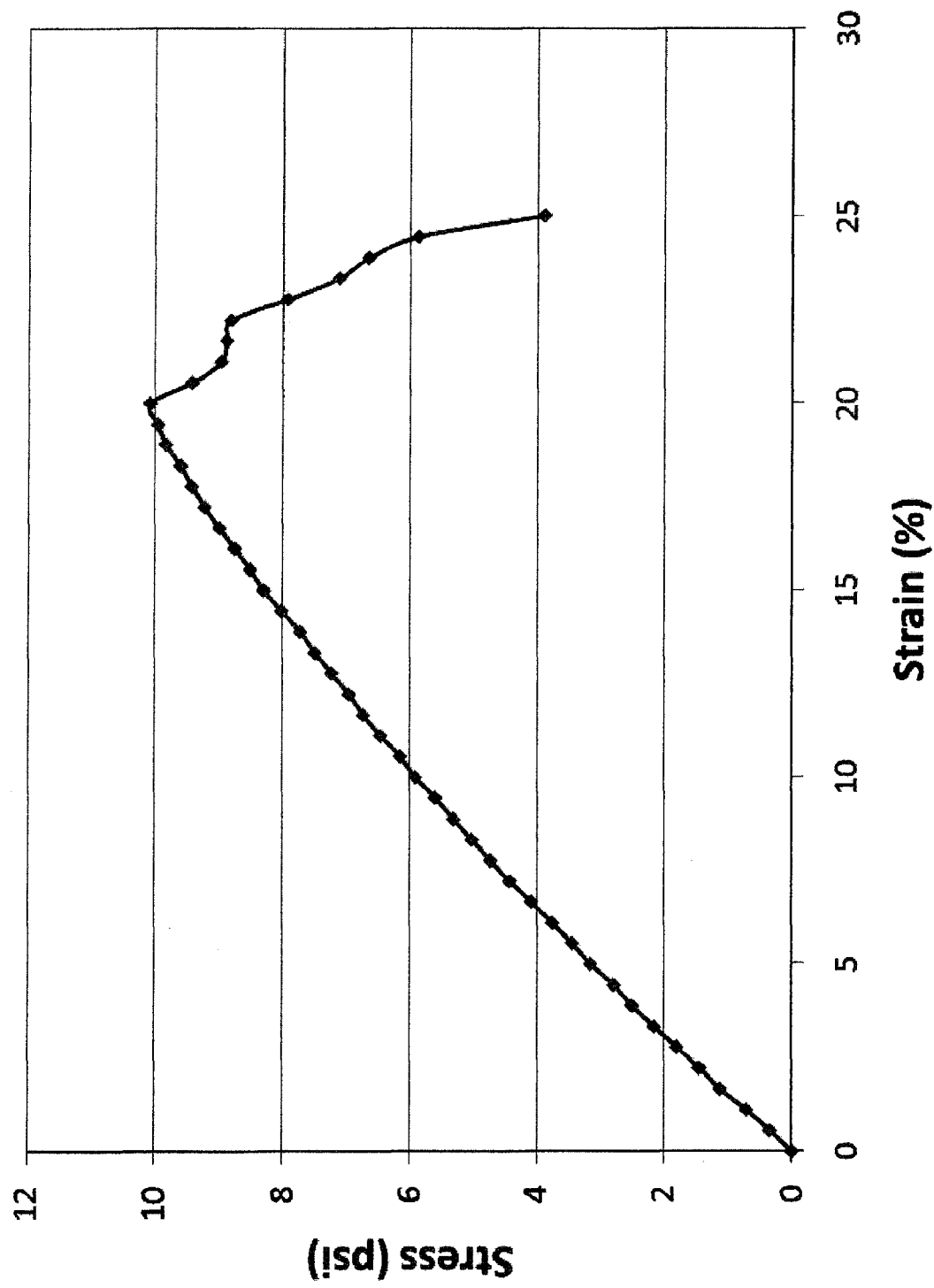
FIG. 40 depicts tensile test results of Example 7.

The tensile test results of Example 7 are shown in FIG. 40. The tensile strength of Example 7 was measured by a tensile test. As shown in FIG. 40, the elongation at break of Example 7 was found to be about 25% with a maximum tensile strength of about 10 psi. The modulus of Example 7 was calculated to be about 66 psi.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A polyfarnesene comprising one or more units having formula (I) and one or more units having formula (IV):

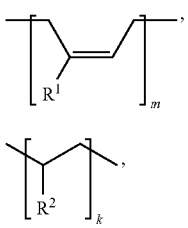

wherein R¹ has formula (XI):

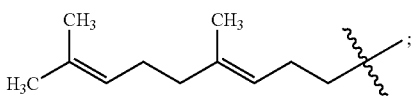

and R² has formula (XII):

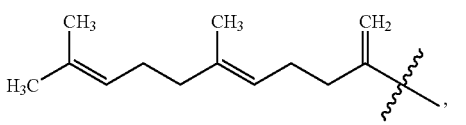

wherein each of m and k is an integer from 1 to 100,000; and wherein an amount of formula (I) is at most about 80 wt. %, based on a total weight of the polyfarnesene.

2. The polyfarnesene of claim 1 further comprising one or more units having formula (IX):

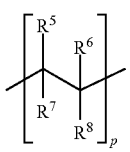

wherein p is an integer from 1 to 100,000; and each of $R^5$, $R^6$, $R^7$ and $R^8$ is independently H, alkyl, cycloalkyl, aryl, alkenyl, cycloalkenyl, alkynyl, heterocyclyl, alkoxy, aryloxy, carboxy, alkoxycarbonyl, aminocarbonyl, alkylaminocarbonyl, dialkylaminocarbonyl, acyloxy, nitrile or halo.

3. The polyfarnesene of claim 2, wherein the polyfarnesene is a random interpolymer.

4. The polyfarnesene of claim 2, wherein $R^5$ is aryl; and each of $R^6$, $R^7$ and $R^8$ is H.

5. The polyfarnesene of claim 4, wherein $R^5$ is phenyl.

6. The polyfarnesene of claim 2, wherein the polyfarnesene further comprises formula (II):

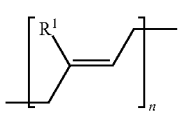

wherein n is an integer from 1 to 100,000.

7. The polyfarnesene of claim 6, wherein the polyfarnesene further comprises formula (III):

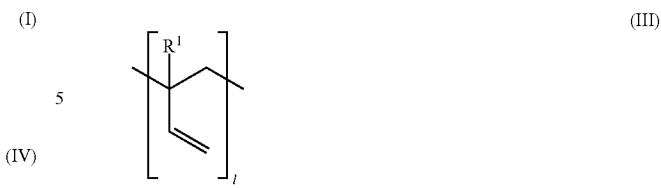

wherein l is an integer from 1 to 100,000.

8. The polyfarnesene of claim 7, wherein the polyfarnesene is a block interpolymer having one or more first blocks and one or more second blocks, wherein each of the one or more first blocks comprises the one or more units having formula (I), (II), (III), (IV) or a combination thereof and wherein each of the one or more second blocks comprises the unit having formula (IX).

9. The polyfarnesene of claim 8, wherein the block interpolymer comprises one first block and two second blocks and wherein the first block is between the two second blocks.

10. The polyfarnesene of claim 1, wherein the $M_n$ of the polyfarnesene is greater than about 100,000 daltons.

11. The polyfarnesene of claim 1, wherein the polyfarnesene has at least one $T_g$ of less than about −55° C.

12. The polyfarnesene of claim 1, wherein the polyfarnesene further comprises formula (II):

wherein n is an integer from 1 to 100,000.

13. The polyfarnesene of claim 12, wherein the polyfarnesene further comprises formula (III):

wherein l is an integer from 1 to 100,000.

14. The polyfarnesene of claim 13, wherein an amount of formula (III) is at least about 20 wt. %, based on a total weight of the polyfarnesene.

15. The polyfarnesene of claim 13, wherein a sum of m, n and l is greater than about 300.

16. The polyfarnesene of claim 13, wherein a sum of m, n and l is greater than about 500.

17. The polyfarnesene of claim 13, wherein a sum of m, n and l is greater than about 1000.

18. A polyfarnesene prepared by polymerizing a β-farnesene in the presence of a catalyst, wherein an amount of a cis-1,4-microstructure in the polyfarnesene is at most about 80 wt. %, based on a total weight of the polyfarnesene.

19. The polyfarnesene of claim 18, wherein the β-farnesene is copolymerized with a vinyl monomer to form a farnesene copolymer.

20. The polyfarnesene of claim 19, wherein the vinyl monomer is styrene.

21. The polyfarnesene of claim 20, wherein the polyfarnesene is a block copolymer.

22. The polyfarnesene of claim 18, wherein the β-farnesene is prepared by a microorganism.

23. The polyfarnesene of claim 18, wherein the β-farnesene is derived from a simple sugar.

24. The polyfarnesene of claim 18, wherein the catalyst comprises an organolithium reagent.

25. The polyfarnesene of claim 24, wherein the catalyst further comprises 1,2-bis(dimethylamino)ethane.

26. The polyfarnesene of claim 24, wherein the organolithium reagent is n-butyl lithium or sec-butyl lithium.

* * * * *